US012779900B2

(12) United States Patent
Song et al.

(10) Patent No.: US 12,779,900 B2
(45) Date of Patent: Nov. 3, 2026

(54) WHEEL UNIT FOR OVERCOMING OBSTACLE

(71) Applicant: KOREA INSTITUTE OF MACHINERY & MATERIALS, Daejeon (KR)

(72) Inventors: Sung Hyuk Song, Daejeon (KR); Chanhun Park, Daejeon (KR); Byung In Kim, Sejong (KR); Jeong Ae Bak, Daejeon (KR); Dong Il Park, Daejeon (KR); Jong Woo Park, Sejong (KR); Hwi Su Kim, Daejeon (KR); Hyun Uk Seo, Seoul (KR); Jae Young Lee, Daejeon (KR); Yong Sin Seo, Daejeon (KR); Hyun Mok Jung, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 574 days.

(21) Appl. No.: 18/258,035

(22) PCT Filed: Jan. 12, 2022

(86) PCT No.: PCT/KR2022/000537

§ 371 (c)(1),
(2) Date: Jun. 16, 2023

(87) PCT Pub. No.: WO2022/154461

PCT Pub. Date: Jul. 21, 2022

(65) Prior Publication Data

US 2024/0001709 A1 Jan. 4, 2024

(30) Foreign Application Priority Data

Jan. 12, 2021 (KR) ........................ 10-2021-0004080
May 4, 2021 (KR) ........................ 10-2021-0057861
(Continued)

(51) Int. Cl.
*B60B 9/26* (2006.01)

(52) U.S. Cl.
CPC ..................................... *B60B 9/26* (2013.01)

(58) Field of Classification Search
CPC ............ B60B 9/26; B60B 19/04; A61G 5/061
See application file for complete search history.

(56) References Cited

U.S. PATENT DOCUMENTS 1,057,047 A * 3/1913 Engert ...................... B60B 9/26 152/12
3,226,129 A 12/1965 Mckinley
(Continued)

FOREIGN PATENT DOCUMENTS

CN 106904047 A 6/2017
CN 207128491 U 3/2018
(Continued)

OTHER PUBLICATIONS

International Search Report for corresponding International Application No. PCT/KR2022/000537 mailed Apr. 28, 2022.
(Continued)

*Primary Examiner* — Kip T Kotter
(74) *Attorney, Agent, or Firm* — Hauptman Ham, LLP

(57) ABSTRACT

A wheel unit for overcoming an obstacle includes a hub, a plurality of unit blocks and a supporting body. The hub rotates by receiving a rotating force. The plurality of unit blocks is spaced apart from the hub and forms an outer shape of the wheel unit. The supporting body is configured to connect the hub with the unit blocks, or is filled between the hub and the unit blocks. The supporting body applies a tension to the unit blocks along a direction toward the hub, to close up the unit blocks with each other, when the wheel unit passes through a ground. The unit blocks adjacent to each other are relatively rotated or moved, when the wheel unit overcomes an obstacle.

19 Claims, 30 Drawing Sheets

(30) Foreign Application Priority Data

May 25, 2021 (KR) ........................ 10-2021-0067144
Aug. 5, 2021 (KR) ........................ 10-2021-0103214

(56) References Cited

U.S. PATENT DOCUMENTS

| | | | | |
|---|---|---|---|---|
| 3,942,839 | A | 3/1976 | Chalk | |
| 2009/0211675 | A1* | 8/2009 | Louden | B60B 9/02 152/80 |
| 2022/0185011 | A1* | 6/2022 | Papantoniou | B60C 7/18 |

FOREIGN PATENT DOCUMENTS

| | | | | | |
|---|---|---|---|---|---|
| CN | 109624602 | A | * | 4/2019 | B60B 19/00 |
| FR | 370202 | A | | 2/1907 | |
| FR | 630264 | A | | 11/1927 | |
| FR | 1035867 | A | * | 9/1953 | |
| JP | 2010-143344 | A | | 7/2010 | |
| JP | 2015-202721 | A | | 11/2015 | |
| KR | 10-0931217 | B1 | | 12/2009 | |
| KR | 10-2014-0125166 | A | | 10/2014 | |
| KR | 10-2016-0120920 | A | | 10/2016 | |
| KR | 20160120920 | A | * | 10/2016 | B60C 7/18 |
| KR | 10-2020-0062695 | A | | 6/2020 | |
| KR | 10-2174498 | B1 | | 11/2020 | |

OTHER PUBLICATIONS

Written Opinion for corresponding International Application No. PCT/KR2022/000537 mailed Apr. 28, 2022.

Office Action issued on Aug. 8, 2025 for corresponding Chinese Patent Application No. 202280009912.8, along with 1 an English machine translation (11 pages).

Extended European Search Report issued on Nov. 7, 2024, in connection with corresponding European Patent Application No. 22739656.1 (7 pages).

Japanese Patent Application 2023-537321 Office Action Dated Feb. 20, 2024.

* cited by examiner

WHEEL UNIT FOR OVERCOMING OBSTACLE

This is a National Stage application of PCT international application PCT/KR2022/000537, filed on Jan. 12, 2022, which claims the priorities of Korean Patent Application No. 10-2021-0004080 filed Jan. 12, 2021, Korean Patent Application No. 10-2021-0057861 filed May 4, 2021, Korean Patent Application No. 10-2021-0067144 filed May 25, 2021, and Korean Patent Application No. 10-2021-0103214 filed Aug. 5, 2021, all of which are incorporated herein by reference in their entirety.

BACKGROUND OF THE INVENTION

Technical Field

Exemplary embodiments of the present invention relate to a wheel unit for overcoming an obstacle. More particularly, exemplary embodiments of the present invention relate to a wheel unit for overcoming an obstacle. A deformation structure using the surface tension mechanism of water droplets is applied in the wheel unit, and the wheel unit includes a plurality of unit blocks capable of relative rotation and movement between the unit blocks adjacent to each other to drive on level ground and to overcome the obstacle such as stairs easily. In particularly, the wheel unit is stably deformed in overcoming the obstacle.

Discussion of the Related Art

Recently, a large number of technologies related to wheels that can be driven while freely passing through obstacles or stairs have been developed.

In case of such an obstacle overcoming wheel, a variable stiffness structure in which the rigidity of the wheel is changed to overcome the obstacle or a variable shape structure in which the structure of the wheel is greatly changed to overcome the obstacle when facing an obstacle is representative. Here, the variable stiffness structure and the variable shape structure may be designed in complex association with each other.

In particular, in relation to the variable shape structure of the latter, as in Korean Patent No. 10-2174498, it is disclosed that upon contact with the obstacle, the shape of some structures constituting the wheel is deformed or compressed to overcome the obstacle through shape deformation.

Further, as in Korean laid-open Patent No. 10-2014-0125166, a structure that passes through the ground through shape deformation in which a part is compressed according to the reaction force received from the ground in passing through the ground is also disclosed.

However, the conventional wheels for overcoming the obstacle of such a variable shape structure have a problem in that the structure of the wheel performing the variable shape is designed to be very complicated. In addition, in reality, various obstacles cannot be effectively overcome, or considerable time is required to transform and return the wheel structure during the overcoming the obstacle, in the conventional wheels.

Further, as continuous obstacle overcoming is performed, stable deformation and structure recovery of the wheel structure are very important, but in a form in which a part of the wheel structure is deformed in the conventional integrated structure of the wheel, there is limitation to implement such stable deformation and structural recovery.

SUMMARY

Exemplary embodiments of the present invention provide a wheel unit for overcoming an obstacle. In the wheel unit, a deformation structure using the surface tension mechanism of water droplets is applied, and the wheel unit includes a plurality of unit blocks capable of relative rotation and movement between the unit blocks adjacent to each other to drive on level ground and to overcome the obstacle such as stairs easily. In particularly, the wheel unit is stably deformed in overcoming the obstacle.

According to one aspect of the present invention, the wheel unit includes a hub, a plurality of unit blocks and a supporting body. The hub rotates by receiving a rotating force. The plurality of unit blocks is spaced apart from the hub and forms an outer shape of the wheel unit. The supporting body is configured to connect the hub with the unit blocks, or is filled between the hub and the unit blocks. The supporting body applies a tension to the unit blocks along a direction toward the hub, to close up the unit blocks with each other, when the wheel unit passes through a ground. The unit blocks adjacent to each other are relatively rotated or moved, when the wheel unit overcomes an obstacle.

In an exemplary embodiment, a surface tension of a water droplet may be simulated by an adhesion force between the unit blocks and a tension applied by the supporting body.

In an exemplary embodiment, the unit blocks adjacent to each other making contact with the obstacle may rotate relatively radially outward, and at least some of the unit blocks adjacent to each other not making contact with the obstacle may rotate relatively radially inward, when the wheel unit overcomes the obstacle.

In an exemplary embodiment, outer surfaces of the unit blocks adjacent to each other making contact with the obstacle may form an angle substantially same as an outer angle of the obstacle, when the wheel unit overcomes the obstacle.

In an exemplary embodiment, the unit blocks adjacent to each other may remain close to each other when the unit blocks adjacent to each other rotate relatively radially outward, and the close state of the unit blocks adjacent to each other may be released and the distance between the unit blocks adjacent to each other may be increased when the unit blocks adjacent to each other rotate relatively radially inward.

In an exemplary embodiment, each of the unit blocks may include a body, a rotating portion disposed at a first side of the body, a combining portion disposed at a second side of the body and rotatably combined with the rotating portion of an adjacent unit block, and a pin combining the combining portion with the rotating portion of the adjacent unit block to be rotated and moved within a predetermined range.

In an exemplary embodiment, a central opening portion extending along a direction is formed through the rotating portion, and a combining opening portion extending along a direction is formed through the combining portion. The pin may pass through the combining opening portion and the central opening portion of the adjacent unit block at the same time.

In an exemplary embodiment, the body may include an inner surface heading for the hub, an outer surface heading for an outside, a contact surface formed between the inner and outer surfaces, with a concaved shape, an end portion extending from the outer surface and protruded from an outer end of the contact surface, and an inclined protrusion portion extending from the inner surface toward the second side of the body and obliquely protruded along a direction toward the hub.

In an exemplary embodiment, each of the unit blocks may further include a groove portion formed between the combining portion and the outer surface of the body. The end portion of the body of a first unit block may be inserted into the groove portion of a second unit block, with the combining portion of the second unit block closing up to the contact surface of the body of the first unit block, when the first and second unit blocks adjacent to each other rotate relatively radially outward.

In an exemplary embodiment, the rotating portion may include a rotating block disposed at the contact surface of the body, and a protrusion portion protruded from the rotating block toward a radially inner side. A distance between a central point of the combining portion of a first unit block and a central point of the combining portion of a second unit block adjacent to the first unit block may increase, and a movement of the protrusion of the rotating portion of the first unit block may be restricted by the inclined protrusion portion of the body of the second unit block, when the first and second unit blocks adjacent to each other rotate relatively radially inward.

In an exemplary embodiment, each of the unit blocks may include a body forming a rounded outer surface, and a connecting portion extending from the body and forming an inserting space into which the body of an adjacent unit block is inserted.

In an exemplary embodiment, the connecting portion may include a first connecting surface extending from a first side of the body, a second connecting surface extending from a second side of the body and forming the inserting space with the first connecting surface, and a contact surface connecting the first surface with the second surface, and having a concaved rounded surface to make contact with an outer surface of the body of the adjacent unit block.

In an exemplary embodiment, each of the unit blocks may include a groove portion formed concavely between the body and the second connecting surface of the connecting portion. The second connecting surface of the connecting portion of a first unit block may be inserted into the groove portion of a second unit block, with the body of the second unit block adjacent to the first unit block closing up to the contact surface of the connecting portion of the first unit block, when the first and second unit blocks adjacent to each other rotate relatively radially outward.

In an exemplary embodiment, the body of the first unit block may be spaced apart and rotated from the contact surface of the combining portion of the second unit block adjacent to the first unit block and thus a distance between a central point of the body of the first unit block and a central point of the body of the second unit block may increase, when the first and second unit blocks adjacent to each other rotate relatively radially inward.

In an exemplary embodiment, the wheel unit may further include an elastic wire fixed and extended by a fixing portion formed on a side surface of each of the unit blocks, and configured to apply an adhesion force between the unit blocks.

In an exemplary embodiment, the close state of the unit blocks adjacent to each other may be released and the distance between the unit blocks adjacent to each other may be increased when the unit blocks adjacent to each other rotate relatively radially outward and the unit blocks adjacent to each other rotate relatively radially inward.

In an exemplary embodiment, each of the unit blocks may include a body having a protruded front portion, and a concaved rear portion combined with the protruded front portion of an adjacent unit block, a fixing portion extending at an upper portion of the body, and a supporting portion protruding at a lower portion of the body.

In an exemplary embodiment, the supporting portion may include a supporting frame extending parallel with the lower portion of the body, and a supporting protrusion protruded perpendicular to the supporting frame.

In an exemplary embodiment, the supporting protrusion of a first unit block may be formed as a first supporting protrusion protruded from a center of the supporting frame, and the supporting protrusion of a second unit block adjacent to the first unit block may be formed as a pair of second supporting protrusions protruded from both sides of the supporting frame to form an inserting space into which the first supporting protrusion is inserted.

In an exemplary embodiment, the unit blocks adjacent to each other making contact with the obstacle may rotate relatively radially outward so that the supporting protrusions make contact with the obstacle and the bodies of the unit blocks are spaced apart from each other, when the wheel unit overcomes the obstacle.

In an exemplary embodiment, the fixing portion may include a contact surface configured to slide along an upper surface of the body of the adjacent unit block and an end portion formed at an end of the contact surface. The upper surface of the body and the fixing portion may form a stepped portion. A movement of the end portion of the fixing portion of a first unit block may be restricted by the stepped portion of a second unit block adjacent to the first unit block, when the first and second unit blocks adjacent to each other rotate relatively radially inward.

In an exemplary embodiment, each of the unit blocks may include a groove portion formed at a front portion of the body by a predetermined length, and a protrusion portion protruded from a rear portion of the body. A movement of the protrusion portion of a first unit block may be restricted by the groove portion of a second unit block adjacent to the first unit block, when the first and second unit blocks adjacent to each other rotate relatively radially inward.

In an exemplary embodiment, the hub may include a first hub unit and a second hub unit which are spaced apart from each other along an axial direction. The supporting body may include a plurality of wires connected between the unit blocks and the first and second hub units. The tension applied by the wires may be controlled as the distance between the first and second hub units is changed.

In an exemplary embodiment, the wheel unit may further include a rotational driving part configured to provide the rotating force, a rotating unit rotated and connected to the rotational driving part, a tension control part configured to provide a sliding force along the axial direction, and a distance change unit configured to provide the sliding force to at least one of the first and second hub units, to control a distance between the first and second hub units. The first and second hub units may be positioned on an outer surface of the rotating unit and may be rotated integrally.

In an exemplary embodiment, the first hub unit may include a first hub portion equipped at the outer surface of the rotating unit, and a first fixing portion formed along a first end circumferential surface of the first hub portion and having the wires fixed to the first fixing portion. The second hub unit may include a second hub portion equipped at the outer surface of the rotating unit, and a second fixing portion formed along a second end circumferential surface of the second hub portion and having the wires fixed to the second fixing portion.

In an exemplary embodiment, each of the wires may extend from a first unit block of the unit blocks, may pass through the first and second fixing portions, and then may extend to the first unit block of the unit blocks again.

In an exemplary embodiment, the rotating unit may include a central frame connected to the rotational driving part and rotated, a main rotating part fixed to an outside of the central frame, and a stepped frame protruded from an outer surface of the main rotating part and forming a stepped portion with the main rotating part.

In an exemplary embodiment, the distance change unit may provide the sliding force to the first hub unit, and the first hub unit may slide along the axial direction on the main rotating part. A position of the second hub unit may be fixed by the stepped frame.

In an exemplary embodiment, the distance change unit may include a distance change frame configured to receive the sliding force through the tension controller, and at least one extending bar extending from the distance change frame along the axial direction, and connected to the first hub unit or the second hub unit.

In an exemplary embodiment, the at least one extending bar may extend passing through the second hub unit and an end of the at least one extending bar may be fixed at the first hub unit. The distance change frame, the at least one extending bar and the first hub unit may slide along the axial direction, due to the sliding force.

In an exemplary embodiment, the wheel unit may further include a distance maintaining unit disposed between the tension controller and the distance change unit, to maintain a distance between the rotational driving part and the rotating unit.

In an exemplary embodiment, the distance maintaining unit may include a transfer frame sliding via receiving the sliding force from the tension controller, and a connecting frame fixed and spaced apart from the transfer frame, and connected to the distance change frame.

In an exemplary embodiment, the distance change unit may further include a rotating bearing disposed between the connecting frame and the distance change frame. The distance change frame may relatively rotate with respect to the connecting frame due to the rotating bearing.

In an exemplary embodiment, the rotating bearing may rotate at an inner groove which is formed along an inner surface of the distance change frame, and the distance change frame may move along the axial direction integrally with the connecting frame.

In an exemplary embodiment, the tension controller may include a tension control motor configured to generate a rotating force or a linear force, a decelerating part configured to decelerate a driving force generated from the tension control motor and to increase a rotating torque, and a sliding bar connected to the transfer frame, and configured to convert the increased rotating torque to the sliding force along the axial direction to provide the sliding force to the transfer frame.

In an exemplary embodiment, the tension controller may further include a fixing frame extending radially outward from the decelerating part to be connected to the rotational driving part, and at least one sliding pine fixed to the fixing frame and extending along the axial direction toward the transfer frame.

In an exemplary embodiment, the distance between the first and second hub units may increase and the tension of the wires increase when the wheel unit passes through the ground. The distance between the first and second hub units may decrease and the tension of the wires may decrease when the wheel unit overcomes the obstacle.

In an exemplary embodiment, the wheel unit may further include a controller configured to control the tension of the wires. The controller may decrease the distance between the first hub unit and the second hub unit to decrease the tension of the wires, when the obstacle appears in front of the wheel unit.

According to some exemplary embodiments of the present invention, based on the principle that a water droplet maintains its appearance through surface tension, a force similar to the surface tension of the water droplet is simulated through the tension applied by the supporting body and the adhesion force between the unit blocks, so that the wheel unit may maintain its overall shape and may effectively pass through the ground.

By applying the principle that the shape collapses when the force exceeding the deformation critical angle acts on the water droplet, effective overcoming of the obstacle may be possible through the relative rotation and the movement between the unit blocks adjacent to each other, when the wheel unit contacts the obstacle.

Here, the collapsed part of the wheel unit may be easily restored through the structure of the unit blocks and the tension applied by the supporting body after passing through the obstacle, so that the original shape of the wheel unit may be maintained again. Accordingly, the wheel unit may smoothly overcome the obstacle and run on the ground.

The overall degree of the deformation of the wheel unit may be controlled by adjusting the tension applied to the unit blocks, and thus the degree of the deformation of the wheel unit may be controlled according to whether the wheel unit passes through the flat ground or the obstacle, so that the effective ground driving may be possible. Accordingly, optimized driving of the wheel unit may be implemented for various driving environments.

Here, the distance between the first and second hub units may be controlled, so that the tension applied to the unit blocks may be controlled. Thus, the structural deformation of the wheel unit for controlling the tension may be omitted, and the tension may be adjusted easily and quickly while the running speed is maintained.

It is further noted that it is readily apparent to those of reasonable skill in the art that various modifications may be made without departing from the spirit and scope of the invention which is defined by the metes and bounds of the appended claims.

DETAILED DESCRIPTION OF THE INVENTION

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
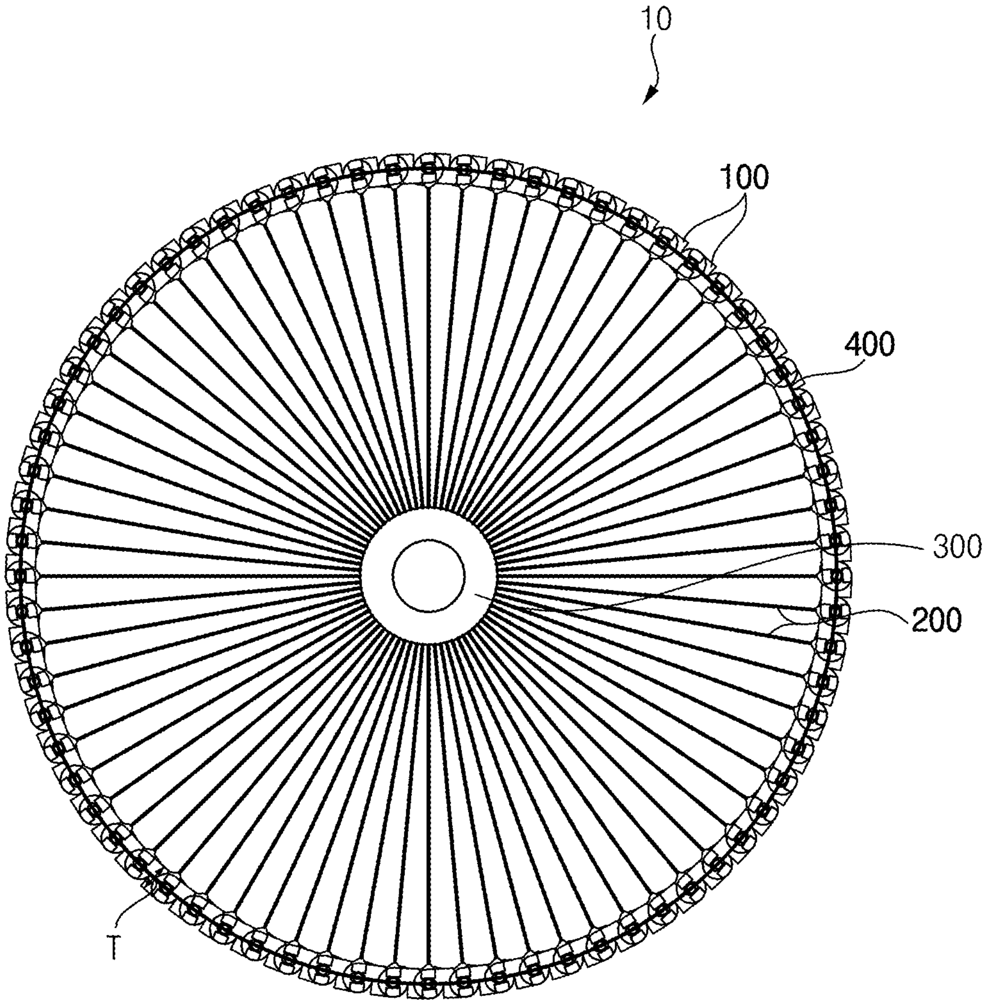
FIG. 1 is a front view illustrating a wheel unit for overcoming an obstacle according to an example embodiment of the present invention.

FIG. 1 is a front view illustrating a wheel unit for overcoming an obstacle according to an example embodiment of the present invention. Referring to FIG. 1, the wheel unit for overcoming the obstacle 10 (hereinafter, the wheel unit) includes a plurality of unit blocks 100, a supporting body 200, a hub 300 and an elastic wire 400.

The hub 300 is positioned at a center of the wheel unit 10, and rotates by receiving a rotating force from a rotational driving part explained below. The hub 300 rotates with respect to a central axis of the wheel unit 300. Here, the hub 300 may be a cylindrical shape.

The plurality of the unit blocks 100 is spaced apart from the hub 300 by a predetermined distance, and is arranged along a circumferential direction. The unit blocks 100 form a circular shape in overall, and the unit blocks are close up to each other to form an outer shape of the wheel unit 10. The unit blocks adjacent to each other are relatively rotated and moved with each other. Thus the unit blocks adjacent to each other may be close up or adhered to each other, or the close or adhered state of the unit blocks adjacent to each other may be released.

Each of the unit blocks 100 may have a predetermined thickness T, and may have a predetermined width along a vertical direction in FIG. 1. Here, the thickness and the width of the unit block 100 may be changed variously. However, the thickness T of the unit block 100 should be a minimum thickness sufficient to maintain the outer shape of the wheel unit through the surface tension mechanism of water molecules described below.

Each of the unit blocks 100 has the same shape, and further detailed shape will be explained below.

In the present example embodiment, the elastic wire 400 extends an outside of the unit blocks 100, and provides the adhesion force to the unit blocks 100 to be close up to each other. Here, the elastic wire 400 is an elastic body having a predetermined tension, and the tensional force of the elastic wire 400 may be changed variously. In addition, the elastic wire 400 may be not essential and may be omitted according to the example embodiments.

In addition, as explained below, the elastic wire 400 extends along a side surface 114 and 115 of the unit blocks and thus the elastic wire 400 is connected with a circular shape in overall. The elastic wire 400 fixes the unit blocks 100 with each other with the circular shape in overall, so that the unit blocks 100 receive the force toward the hub 300 and the unit blocks 100 may be provided with the adhesion force to each other.

The elastic wire 400 provides a predetermined elastic force to form the overall circular shape, but the shape of the elastic wire 400 may be deformed in a variable state as the relative combined state between the unit blocks 100 is changed. Although the elastic wire 400 provides a predetermined elastic force, it does not necessarily provide the elastic force sufficient to maintain the overall adhesion force of the unit blocks 100, and thus the extension state of the elastic wire 400 may be changed when the combined state between the unit blocks 100 is changed to overcome the obstacle.

The supporting body 200 connects the hub with the unit blocks 100, and in the present example embodiment, the supporting body 200 may be a plurality of wires having a predetermined tension. However, the supporting body 200 may be not limited to the wire, and the supporting body 200 may be anything that may connect the hub with the unit blocks 100 and apply the tension.

The supporting body 200 may be connected one by one to each of the unit blocks 100, and thus apply the tension to each of the unit blocks 100, but not limited thereto. Alternatively, the supporting body 200 may be connected only to unit blocks 100 spaced apart at regular intervals among the plurality of the unit blocks 100.

The supporting body 200 has a predetermined tension, and thus applies the tension between the hub 300 and the unit blocks 100. Thus, the positions of the unit blocks 100 may be maintained, and the unit blocks 100 may be prevented from being escaped or deviated to the outside.

In the present example embodiment, the supporting body 200 applies a constant tension to all of the unit blocks 100 as a whole, except when the wheel unit 10 passes through the obstacle, so that the attractive force inside of the wheel unit 10 is formed by simulating the attractive force between the water molecules inside of the water droplet when the water droplet maintains its external shape.

Accordingly, by adjusting the tension provided from the supporting body 200 in various ways, the state of maintaining the outer shape of the wheel unit 10 may be changed. When a relatively larger tension is applied to the supporting body 200, a state in which the surface tension of the water molecules is high is simulated between the unit blocks 100, and thus a state in which the wheel unit 10 maintains its circular shape as a whole is reinforced. Alternatively, as the tension relatively decreases, a state in which the surface tension decreases is simulated, and thus the wheel unit 10 may be implemented in a state in which the surface is deformed according to the shape of the ground or the obstacle as a whole.

Figure 2:
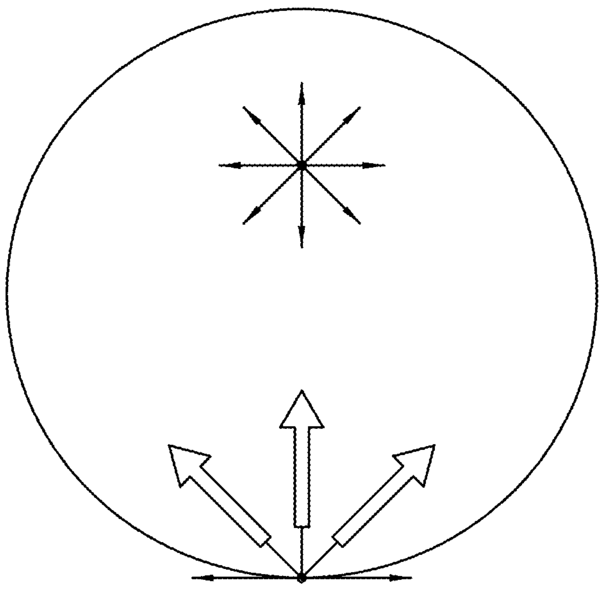
FIG. 2 is a schematic view showing a water droplet to which the surface tension is applied.

Hereinafter, how the wheel unit 10 simulates the surface tension of the water droplet will be described in detail, referring to FIG. 2 and FIG. 3. FIG. 2 is a schematic view showing a water droplet to which the surface tension is applied, and FIG. 3 is a schematic view showing changes of the contact angle of the water droplet according to the surface tension.

When the water droplet maintains a spherical state due to the surface tension while in contact with the surface, the water molecules receive the same force from the surrounding molecules inside of the water droplet, but the water molecules on the surface receive the force only in a specific direction. The equilibrium state of the force inside of and on the surface of the water molecules is as shown in FIG. 2. When the attraction between the water molecules increases, the inward pulling force increases, and as the surface tension increases, the stable spherical shape of the water molecules is maintained more stably.

Figure 3:
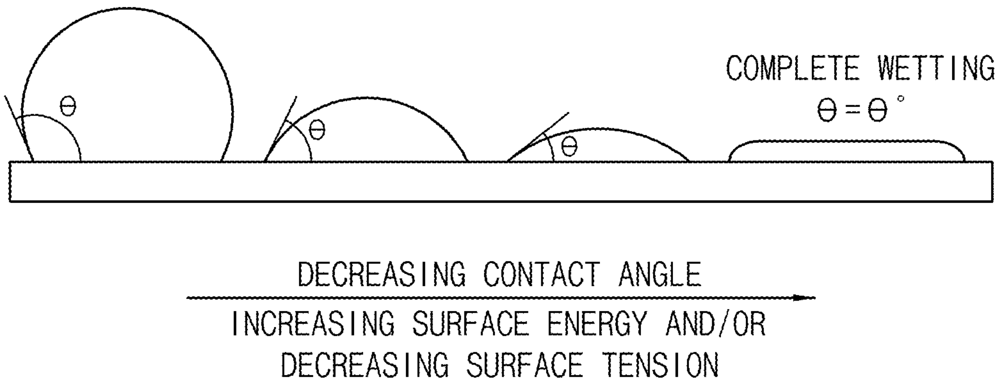
FIG. 3 is a schematic view showing changes of the contact angle of the water droplet according to the surface tension.

As illustrated in FIG. 3, as the attraction between the water molecules decreases, the surface tension with the surface decreases, and accordingly, the contact angle θ of the water droplet decreases. In other words, the surface tension increases as the attraction between the water molecules of the water droplet increases, and thus, the contact angle of the water droplet increases and the water droplet is formed in a more spherical shape.

Accordingly, in the case of the wheel unit 10 of the present example embodiment, the generation of the surface tension according to the application of the attraction between the water molecules is simulated. Here, through the tension provided by the supporting body 200 and the adhesion force between the unit blocks 100 by the elastic wire 400, the surface tension may be effectively simulated when the water droplet maintains its outer shape.

Finally, the wheel unit 10 simulates the external surface of the water droplet maintaining the appearance of the water droplet by applying the surface tension mechanism by locating molecules that are incompressible or difficult to compress beyond a certain level. Thus, the surface tension mechanism may be applied through the previously described connection structure of the unit blocks 100 and the supporting body 200.

Figure 4:
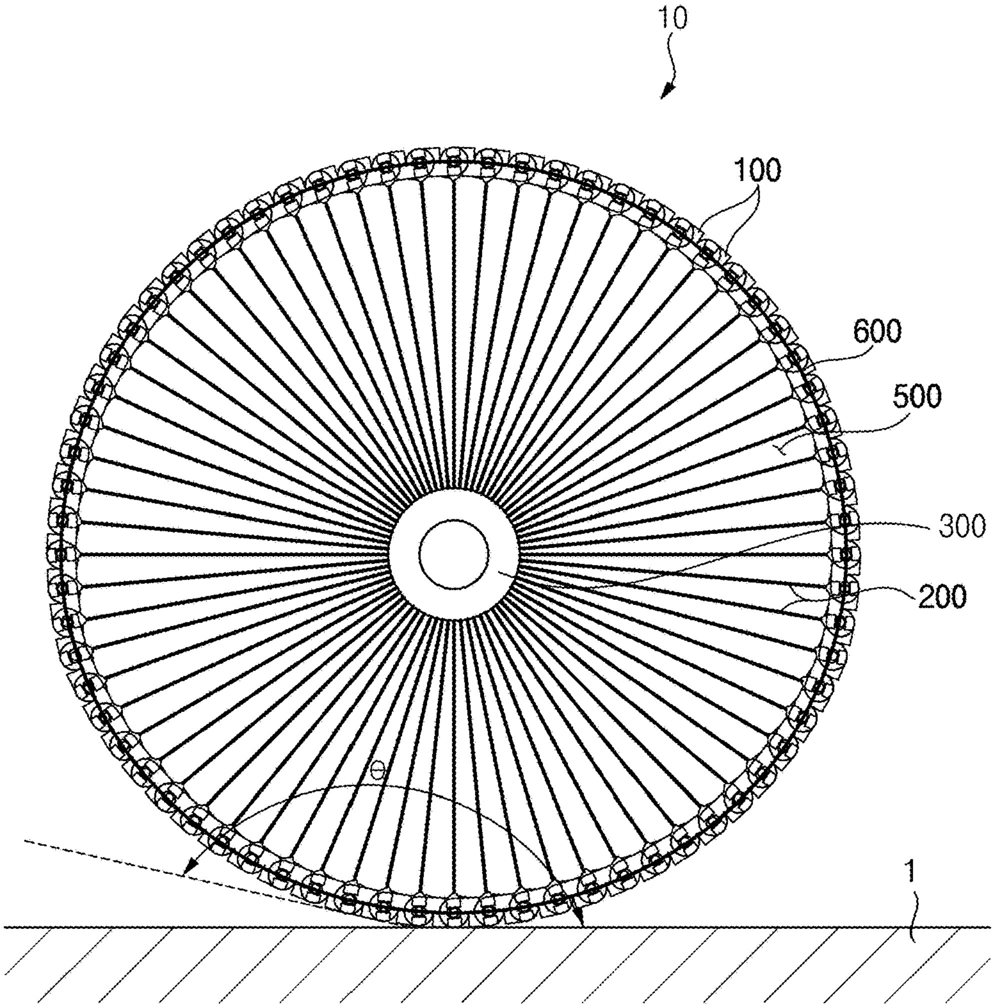
FIG. 4 is a front view illustrating the wheel unit of FIG. 1 passing through a ground.

Hereinafter, referring to FIG. 4 and FIG. 5, how the shape maintenance state according to the surface tension of the water droplet is applied to the wheel unit 10 of the present example embodiment will be describe. FIG. 4 is a front view illustrating the wheel unit of FIG. 1 passing through a ground, and FIG. 5 is a schematic view comparing the state of passing through the ground in FIG. 4 with the state of the water droplet.

Referring to FIG. 4, when the wheel unit 10 passes through the ground 1, the unit blocks 100 are combined with each other tightly and closely due to the structure of the unit block mentioned below, and the supporting body 200 applies the tension to the unit blocks 100 toward the hub 300 at the same time. In addition, the elastic wire 400 applies the tension to the unit blocks 100 toward the hub 300, as explained above.

In this state, when the wheel unit 10 passes through the ground 1, as illustrated in FIG. 4, the overall appearance of the wheel unit 10 may be maintained although a lower side of the wheel unit 10 making contact with the ground 1 may be deformed in a somewhat compressed form. Here, the degree of the compression may be adjusted according to the magnitude of the tension applied by the supporting body 200 as explained above in FIG. 3.

Figure 5:
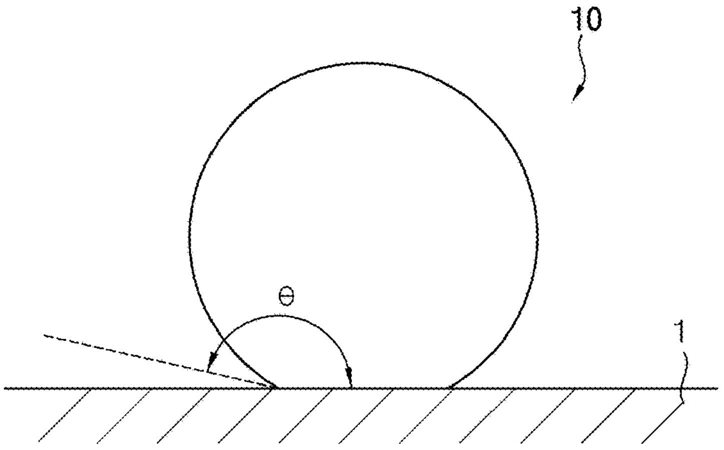
FIG. 5 is a schematic view comparing the state of passing through the ground in FIG. 4 with the state of the water droplet.

As illustrated in FIG. 5, the state of the wheel unit 10 passing through the ground 1 may be simulated as a case where the water droplet makes contact with the ground. Here, if the entire wheel unit 10 is simulated as the water droplet, it may be interpreted that the wheel unit 10 passes through the ground 1 while maintaining a contact state while having a predetermined contact angle θ with the ground 1. Here, the contact angle θ should be maintained as an obtuse angle, and as the contact angle increases, the wheel unit 10 may have a shape closer to the circular or spherical shape.

Figure 6:
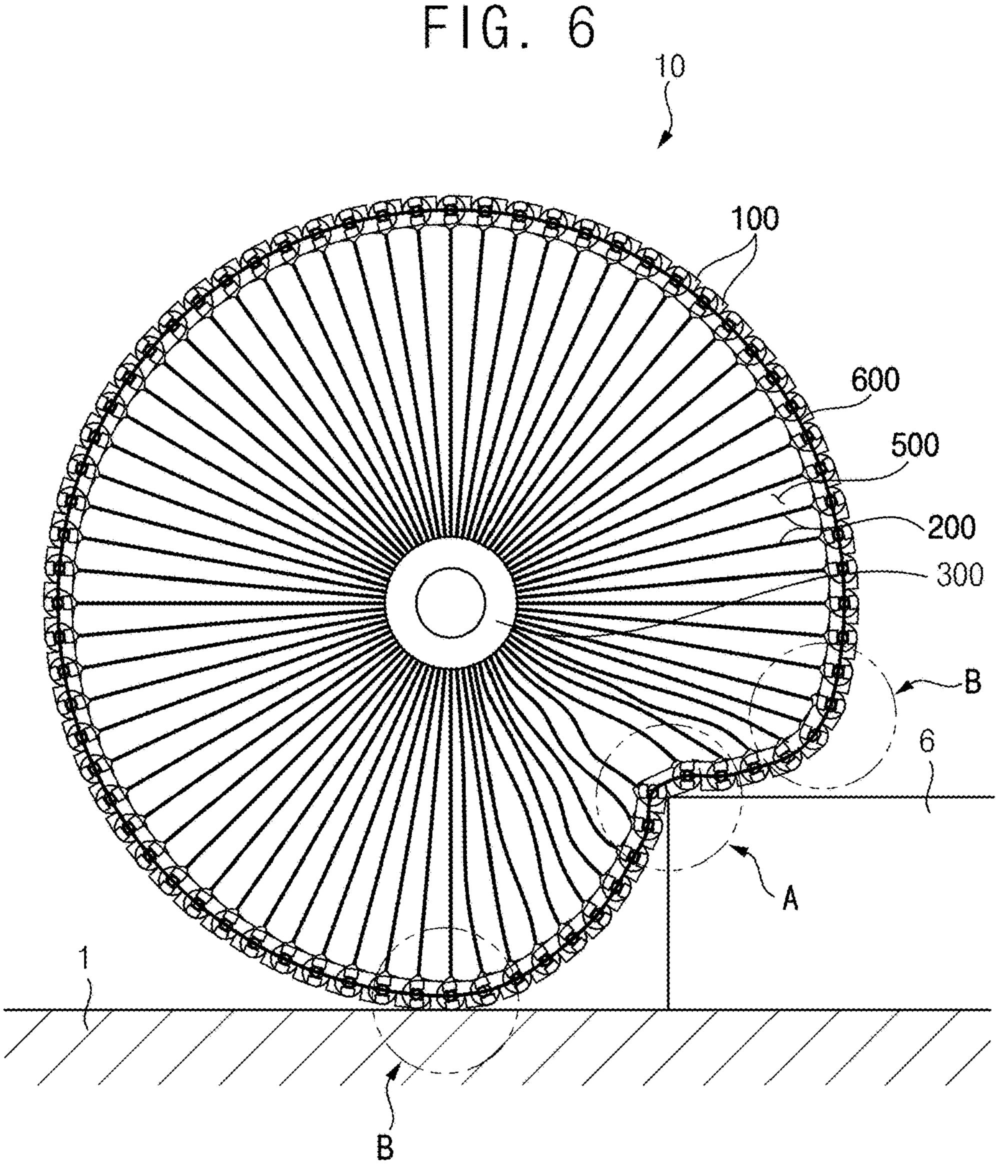
FIG. 6 is a front view illustrating the wheel unit of FIG. 1 overcoming the obstacle.
Figure 7:
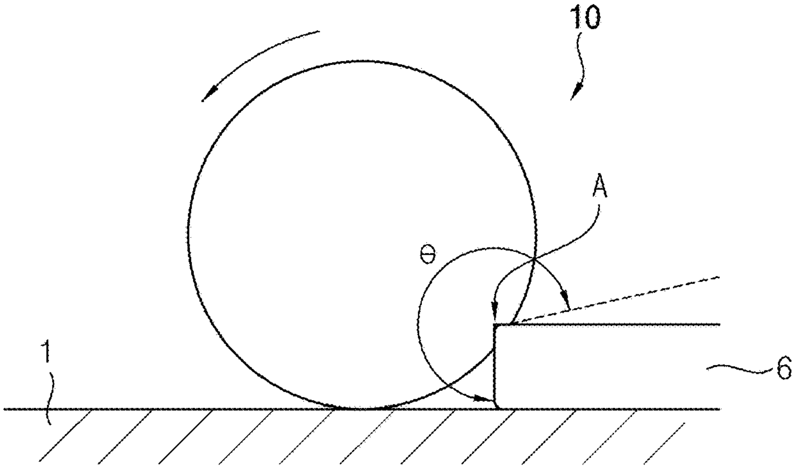
FIG. 7 is a schematic view comparing the state of overcoming the obstacle in FIG. 6 with the state of the water droplet.

Then, referring to FIG. 6 and FIG. 7, how the state in which the surface tension of the water droplet collapses and the water droplet loses its shape is applied to the wheel unit of the present example embodiment will be explained. FIG. 6 is a front view illustrating the wheel unit of FIG. 1 overcoming the obstacle, and FIG. 7 is a schematic view comparing the state of overcoming the obstacle in FIG. 6 with the state of the water droplet.

Referring to FIG. 6, when a side of the wheel unit 10 collides with the obstacle 6 such as stairs located on the ground 1, the wheel unit 10 starts to deform at the collision position. Referring to the simulation of the collision situation as the collision state of the water droplet as shown in FIG. 7, the contact angle θ of the outer shape of the wheel unit 10 at the contact portion A with the obstacle 6 abruptly exceeds a so-called deformation critical angle (e.g., 180°).

Accordingly, at the moment of exceeding the deformation critical angle, the shape of the wheel unit 10 also collapses while reflecting the shape of the obstacle 6 at the contact portion A, similar to rapid collapse of the shape of the water droplet due to a large deformation of the water droplet. The combined state is changed through the relative rotation and movement between the unit blocks 100 adjacent to each other. Here, since the hub 300 continuously rotates, the wheel unit 10 overcomes the obstacle 6 while the hub 300 rotates around the contact portion A even if the shape of the unit blocks 100 is in the collapse state.

Accordingly, the wheel unit 10 according to the present example embodiment passes through the ground 1 with maintaining the circular or spherical shape as a whole as in the same way that the water droplet maintains its shape through the surface tension, if the wheel unit 10 simply passes through the flat ground 1. However, in the case of the collision with the obstacle 6, the combined state of the unit blocks 100 is deformed in a local area while the external shape of the obstacle 6 is reflected around the collision location, and then the wheel unit 10 overcomes the obstacle 6.

Here, since the unit blocks 100 adjacent to each other at the contact portion A maintains the outer surface in contact with the outer surface of the obstacle 6 and the obstacle 6 is overcome, the unit blocks 100 adjacent to each other are deformed into a state of being relatively rotated and bent in a direction toward the obstacle 6, for example an outward in a radial direction.

Alternatively, at a proximal portion B located a certain distance forward or backward from the contact portion A, the distance between the outer surfaces of the unit blocks 100 adjacent to each other increases and the distance between the inner surfaces of the unit blocks 100 adjacent to each other decreases, to compensate for the large deformation of the positions of the outer surfaces of the unit blocks 100 adjacent to each other at the contact portion A. Thus, at the proximal portion B, unlike the contact portion A, the unit blocks 100 adjacent to each other rotate relatively inward in the direction toward the hub 300, for example, in the radial direction, and are deformed into a bent state.

That is, the relative deformation state between the unit blocks 100 adjacent to each other at the contact portion A and the proximal portion B is implemented in a different pattern, and in this regard, the detailed structure of the individual unit block 100 will be explained below in detail.

Figure 8:
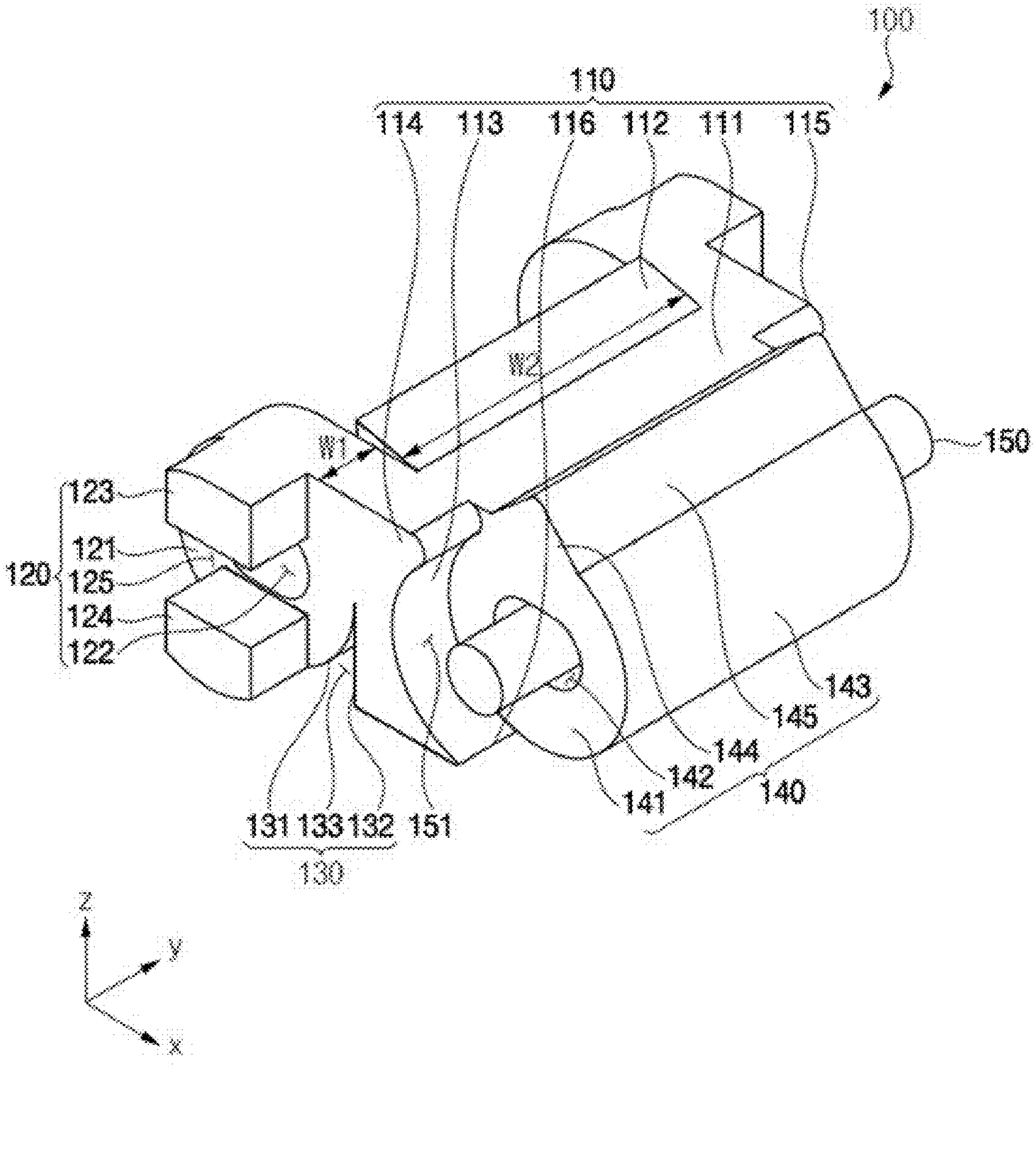
FIG. 8 and FIG. 9 are perspective views illustrating a unit block of the wheel unit of FIG. 1.
Figure 9:
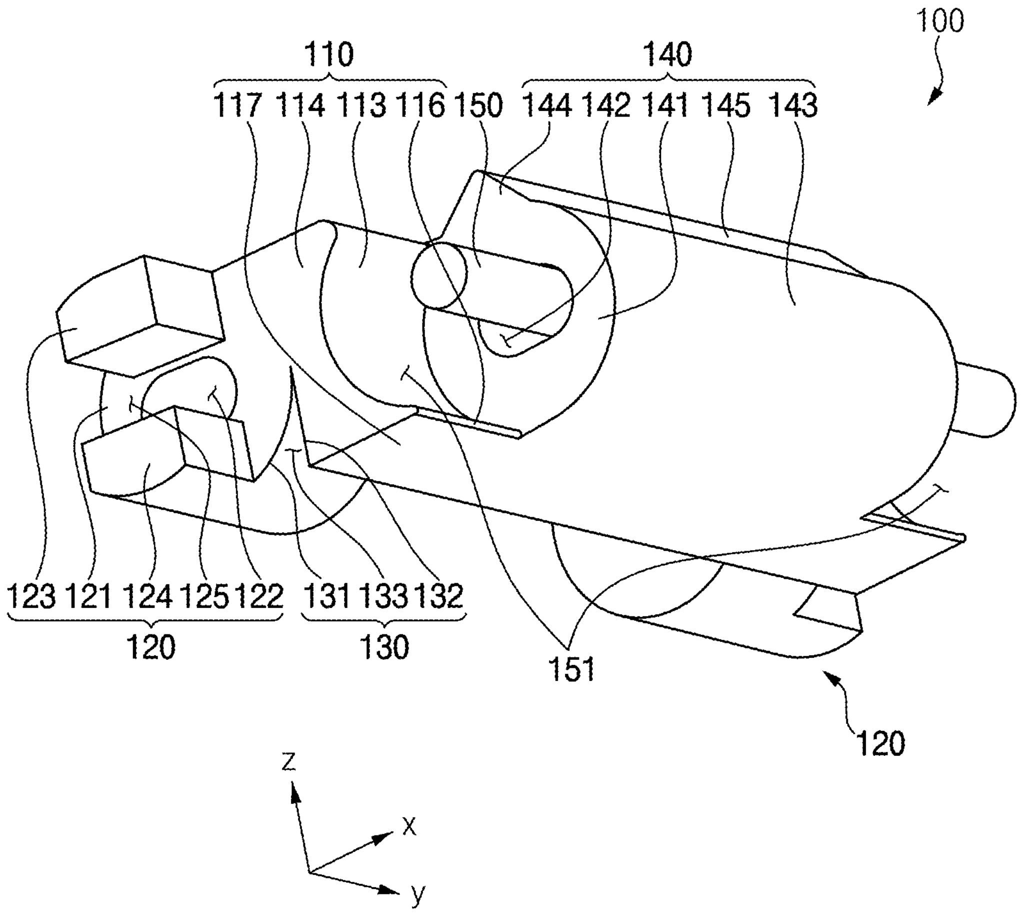

Hereinafter, referring to FIG. 8 and FIG. 9, detailed structures of each of the unit blocks 100 and connection states between the unit blocks 100 adjacent to each other are explained. FIG. 8 and FIG. 9 are perspective views illustrating a unit block of the wheel unit of FIG. 1.

Each of the unit blocks 100 includes a body 110, a combining portion 120, a groove portion 130, a rotating portion 140 and a pin 150.

The body 110 forms a main body of the unit block 100, and may have a rectangular block shape in a whole. The rotating portion 140 is combined with a front side of the body 110, and a pair of the combining portions 120 is combined with a rear side of the body 110. Here, for convenience of the explanation, the right direction of the body 110 in the figure is referred to as the front side (or a first side), and the left direction of the body 110 in the figure is referred to as the rear side (or a second side), but not limited thereto. The body 110 has a predetermined width (a length along a Y direction in the figure), and the width of the body 110 may be changed variously.

For example, the body 110 includes an inner surface 111 toward the hub 300, an outer surface 117 toward the obstacle 6 or the ground 1 opposite to the inner surface 111, and a pair of side surfaces 114 and 115 connecting the outer surface 117 with the inner surface 111.

The body 110 includes an inclined protrusion portion 112, a contact surface 113 and an end portion 116. The inclined protrusion portion 112 extends backward from the inner surface 111, and forms a surface inclined and protruded toward the hub 300. Compared to the inner surface 111, the inclined protrusion portion 112 is more protruded toward the hub 300, and a protruding state may gradually protrude in an inclined shape as the distance from the inner surface 111 increases. The contact surface 113 is a surface extending between the inner surface 111 and the outer surface 117, and has a concaved curved shape concaved corresponding to an outer surface of the rotating portion 140 having the cylindrical shape explained below. The end portion 116 is formed at an outmost end portion of the contact surface 113 where the contact surface 113 is connected with the outer surface 117, and the end portion 116 has a sharp protruding shape as illustrated in the figure.

The combining portion 120 extends from both sides of the rear end of the body portion 110 respectively, and is formed as a pair. The pair of the combining portions 120 is formed into a symmetrical shape, and thus the combining portion 120 at one side is explained as illustrated in FIG. 8 and FIG. 9.

The combining portion 120 at one side extends from the side surface 114 of the body 110 toward the rear end in a whole, and the combining portion 120 and the body 110 are formed integrally. Here, the combining portion 120 has a predetermined width W1 in a whole, and the width W1 of the combining portion 120 may be smaller than a width W2 of the inclined protrusion portion 112. Here, the sum of the pair of the combining portions 120 2*W1 may be smaller than the width W2 of the inclined protrusion portion 112.

The combining portion 120 includes a combining block 121 having a cylindrical shape with a width W1 and extending from a side of the body 110, and upper and lower fixing portions 123 and 124. A combining opening portion 122 is formed at a center of the combining block 121 and the pin 150 is inserted into the combining opening portion 122. A length of the combining opening portion 122 opened along a vertical direction (Z direction) may be substantially same as a diameter of the pin 150 (here, the length thereof may be larger than the diameter of the pin 150 by a predetermined amount, so as for the pin 150 inserted into the combining opening portion 122 to be rotated relative to the combining opening portion 122), and a length of the combining opening portion 122 opened along a longitudinal direction (X direction, L1 in FIG. 10) is larger than the diameter of the pin 15. Thus, in the state where the pin 150 is inserted into the combining opening portion 122, the position of the pin 150 may be restricted in the vertical direction, but may be freely movable within a predetermined range along the longitudinal direction.

The upper and lower fixing portions 123 and 124 are protruded from the side surface of the combining block 121. The upper fixing portion 123 is disposed at an upper side of the combining opening portion 122 and is protruded with a block shape, and the lower fixing portion 124 is disposed at a lower side of the combining opening portion 122 and is protruded with a block shape. A fixing space 125 is formed between the upper and lower fixing portions 123 and 124, and the elastic wire 400 is extended and fixed in the fixing space 125. The size of the fixing space 125 may be formed variously considering a thickness of the elastic wire 400 and so on. Accordingly, the elastic wire 400 is fixed at the fixing space 125 and is extended all over the unit blocks 100, and thus the elastic force of the elastic wire 400 may be provided between the hub 300 and the unit blocks 100, and the unit blocks 100 may be adhered or close up to each other due to the elastic force.

The groove portion 130 is formed at a lower side where the combining portion 120 and the body 110 are connected, and for example, the groove portion 130 corresponds to a portion where the outer surface of the combining portion 121 and the outer surface 117 of the body 110 are connected to each other. Here, for the convenience of explanation, it is explained as ‘lower side’ based on the figure, but the unit blocks are located in a state where the top and the bottom are switched as a whole and thus the ‘lower side’ may correspond to ‘upper side’ in same cases. However, hereinafter, for the convenience of explanation, it is explained as ‘lower side’ based on the figure, and further ‘the lower side’ may be substantially the same as ‘the outer side, or the outside’ facing the obstacle or the ground.

For example, the groove portion 130 includes an extending curve surface 131 and an extending vertical surface 132. The extending curve surface 131 extends from an outer surface (a circumferential surface of the cylinder) of the combining block 121 with the same curvature as that of the outer surface of the combining block 121. The extending vertical surface 132 extends from an edge of the outer surface 117 of the body 110 with forming a flat surface. Here, the extending vertical surface 132 may extend while intersecting with the outer surface 117 and the intersection angle may vary but may be perpendicular to each other. Accordingly, as the extending curve surface 131 and the extending vertical surface 132 extend with different curvatures, a supporting groove 133 is formed between the extending curve surface 131 and the extending vertical surface 132, and a concaved shape of the supporting groove 133 may be a sharp or pointed shape.

The rotating portion 140 is formed at a front side of the body 110 and is integrally formed with the body 110. The rotating portion 140 includes a rotating block 141 and a protrusion portion 144.

The rotating block 141 has a cylindrical shape in a whole, and a width of the rotating block 141 is substantially same as the width W2 of the inclined protrusion portion 112 in a whole. The rotating block 141 has a rotating outer surface 143 having a curvature substantially same as that of the contact surface 113, and thus the rotating outer surface 143 of the rotating block 141 is partially adhered to the contact surface 113.

Here, the width W2 of the rotating block 141 is smaller than an entire width W1+W1+W2 of the body 110, and thus the rotating block 141 has the width omitted by the width of the combining portion 120 at both sides from the entire width of the body 110. Thus, side spaces 151 in which the contact surface 113 is exposed to the outside are formed on both sides of the rotating block 141, and the combining portion 120 of the adjacent unit block is positioned on the side surfaces 151.

A central opening portion 142 is formed at a center of the rotating block 141, and the pin 150 is inserted into the central opening portion 142. Here, the shape of the central opening portion 142 is substantial same as that of the combining opening portion 122. That is, a length of the central opening portion 142 opened along a vertical direction (Z direction) may be substantially same as a diameter of the pin 150 (here, the length thereof may be larger than the diameter of the pin 150 by a predetermined amount, so as for the pin 150 inserted into the central opening portion 142 to be rotated relative to central opening portion 142), and a length of the central opening portion 142 opened along a longitudinal direction (X direction, L2 in FIG. 10) is larger than the diameter of the pin 15. Thus, in the state where the pin 150 is inserted into the central opening portion 142, the position of the pin 150 may be restricted in the vertical direction, but may be freely movable within a predetermined range along the longitudinal direction.

The protrusion portion 144 is protruded radially inward from the rotating block 141, for example, along a direction toward the hub 300, and the protrusion portion 144 extends from the inner surface 111 of the body 110. Here, the protrusion portion 144 has the width substantially same as that of the rotating block 141, and the protrusion portion 144 has a cross-section whose width decreases inward in the radial direction. The cross-sectional shape of the protrusion portion 144, which is a cross-sectional shape along a XZ plane, may have a triangular shape in a whole.

In case of the surface formed by the protrusion portion 144, the surface extending from the inner surface 111 may have a flat shape, but the opposite surface, that is, the supporting surface 145 as a surface connected to the outer rotating outer surface 143 may be a curved surface concaved inwardly. The supporting surface 145 may be the curved surface extending with a concaved shape and a predetermined curvature.

The pin 150 has a pin shape extending along Y direction with a predetermined diameter. The pin 150, as explained below, passes through the central opening portion 142 and the combining opening portions 122 of the pair of the combining portions 120 of the adjacent unit block. Thus, the pair of the unit blocks 100 adjacent to each other is combined with each other via the pin 150.

Figure 10:
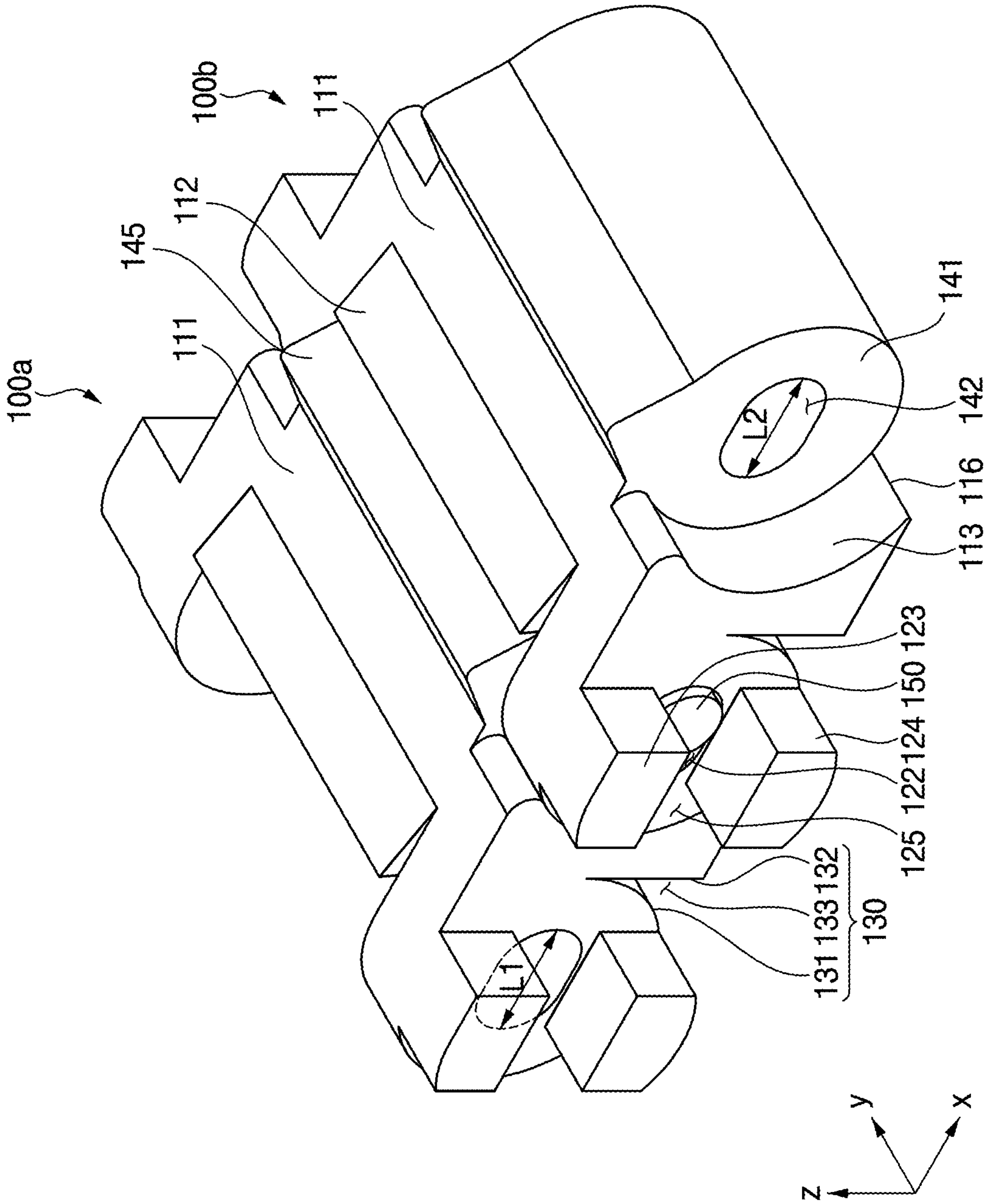
FIG. 10 is a perspective view illustrating a pair of unit blocks combined with each other.

The unit block 100 (a first unit block) is combined with the adjacent unit block (a second unit block), and the combining mechanism of the pair of the unit blocks adjacent to each other is explained referring to FIG. 10. FIG. 10 is a perspective view illustrating a pair of unit blocks combined with each other.

Referring to FIG. 10, the unit blocks 100 adjacent to each other extend along X direction and are combined with each other. In the present example embodiment, the unit blocks 100 adjacent to each other maintains the combined state basically as shown in the figure and the unit blocks 100 overcome the obstacle via the relative rotation and movement, so that the stably combining state may be maintained in overcoming the obstacle.

For example, the pin 150 passing through the central opening portion 142 of a first unit block 100*a* (for the convenience of explanation, the pair of the unit blocks are explained as the first and second unit blocks 100*a* and 100*b*), also passes through the combining opening portions 122 formed at the pair of the combining portions 120 respectively of a second unit block 100*b*). In addition, the pair of the combining portions 120 of the second unit block 100*b* is positioned in the pair of the side surfaces 151 formed at the first unit block 100*a*. Thus, the pair of the unit blocks 100*a* and 100*b* adjacent to each other are combined with each other via the pin 150, while the rotating portion 140 is positioned at the center and the pair of the combining portions 120 is positioned at both sides.

Further, although not shown in the figure, the unit block may be combined at the other side of the first unit block 100*a* with the same combination state mentioned above, and the unit block may be combined at the other side of the second unit block 100*b* with the same combination state mentioned above, and thus the plurality of the unit blocks are combined with each other serially.

As illustrated in FIG. 10, when the first and second unit blocks 100*a* and 100*b* are combined with each other horizontally, the pin 150 may be freely moved along the X direction within a predetermined distance, due to the shape of the central opening portion 142 and the shape of the combining opening portion 122. Thus, the first and second unit blocks 100*a* and 100*b* may be freely moved with each other within the range in which the pin 150 is moved, and thus the moving mechanism performs an effective operation in overcoming the obstacle 6 as explained below.

Figure 11:
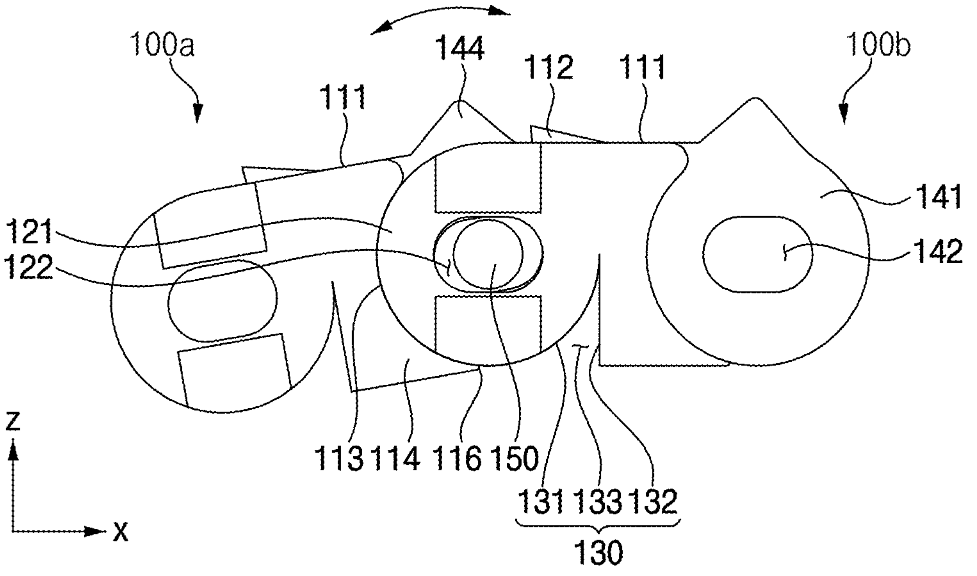
FIG. 11, FIG. 12 and FIG. 13 are front views illustrating a change of the unit block at a contact portion A when the wheel unit of FIG. 1 overcomes the obstacle.
Figure 12:
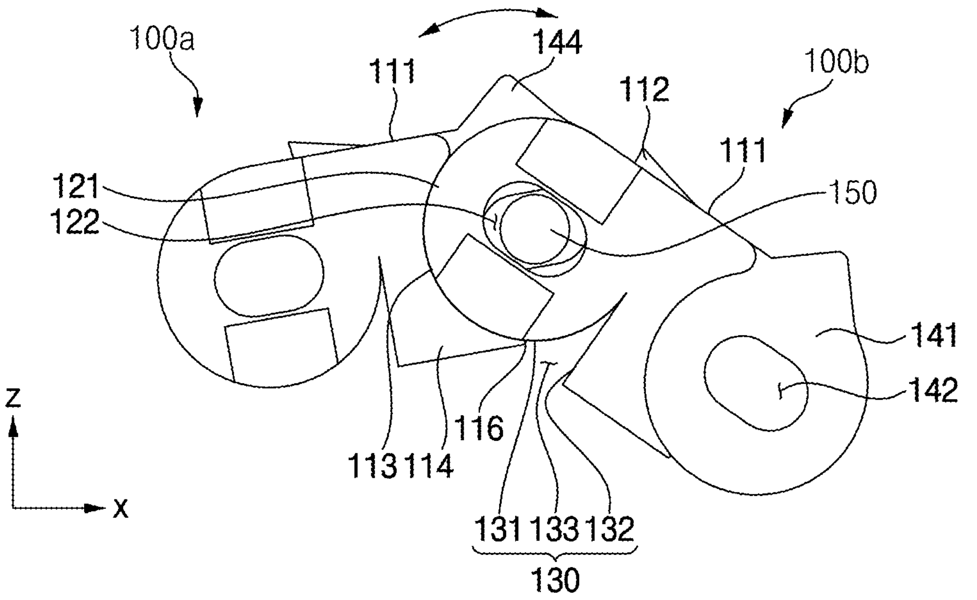
Figure 13:
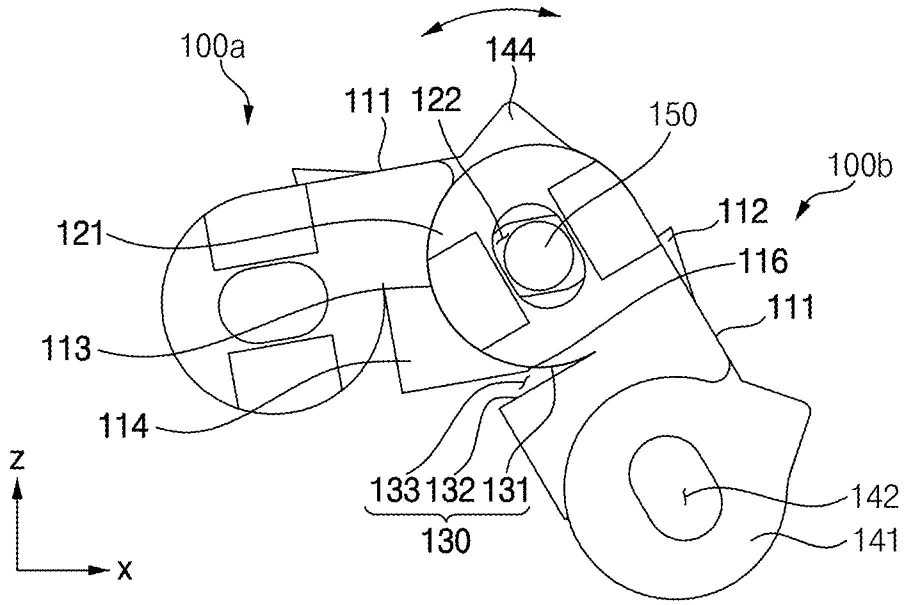

FIG. 11, FIG. 12 and FIG. 13 are front views illustrating a change of the unit block at a contact portion A when the wheel unit of FIG. 1 overcomes the obstacle. Here, although not shown in the figure, the obstacle 6 makes contact with the lower sides of the first and second unit blocks 100*a* and 100*b*.

Referring to FIG. 11, FIG. 12 and FIG. 13, when the wheel unit 10 overcomes the obstacle 6, the combining state is changed so that the unit blocks 100 adjacent to each other are combined while being bent radially outward, that is, in a direction in which the outer surfaces 117 approach each other, in the contact portion A. Here, the outer surfaces 117 of the unit blocks 100 adjacent to each other in contact with the obstacle 6 may be close to each other with forming the same angle as the angle of the outer surface formed by the obstacle 6 and Accordingly to the change of the combining state, the end portion 116 of the first unit block 100*a* moves along the extending curve surface 131 and then is inserted into the supporting groove 133, with the outer surface of the combining block 121 of the second unit block 100*b* making contact with the contact surface 113 of the first unit block 100*a*. Here, the curvature of the extending curve surface 131 is substantially same as that of each of the combining block 121 and the contact surface 113, so that the end portion 116 which is an outermost end of the contact surface 113 is smoothly inserted into the supporting groove 133.

Here, since the position of the pin 150 is freely changed within a predetermined range, the relative position of the first and second unit blocks 100*a* and 100*b* adjacent to each other also changes. Thus, the optimal relative position according to the shape of the obstacle 6 may be secured through the above relative position change between the first and second unit blocks 100*a* and 100*b*. Here, as the extending angle of the first and second unit blocks 100*a* and 100*b* decreases (i.e., from 180° to 90°), in case that the first and second unit blocks 100*a* and 100*b* adjacent to each other are extended horizontally, the angle between the longitudinal direction of the central opening portion 142 and the longitudinal direction of the combining opening portion 122 decreases too, and thus the relatively movable range of the pin 150 may be decreased. Thus, when the first and second unit blocks 100*a* and 100*b* form a right angle (90°), the movement of the pin 150 is restricted, and the pin 150 is fixed at the central opening portion 142 and the combining opening portion 122 in a state where the pin 150 cannot be moved. The fixed state of the pin 150 is illustrated in FIG. 14.

Hereinafter, the state of the unit blocks 100 adjacent to each other at the contact portion A in a state in which the wheel unit 10 overcomes the obstacle 6 will be explained referring to FIG. 14. FIG. 14 is a perspective view illustrating a final change state of the unit block at the contact portion A when the wheel unit of FIG. 1 overcomes the obstacle.

Generally, to overcome the obstacle 6, the unit blocks 100 are fixed at the contact position P making contact with the obstacle 6, and the unit blocks 100 rotate with respect to the contact position P. Then, the obstacle 6 may be easily overcome.

Figure 14:
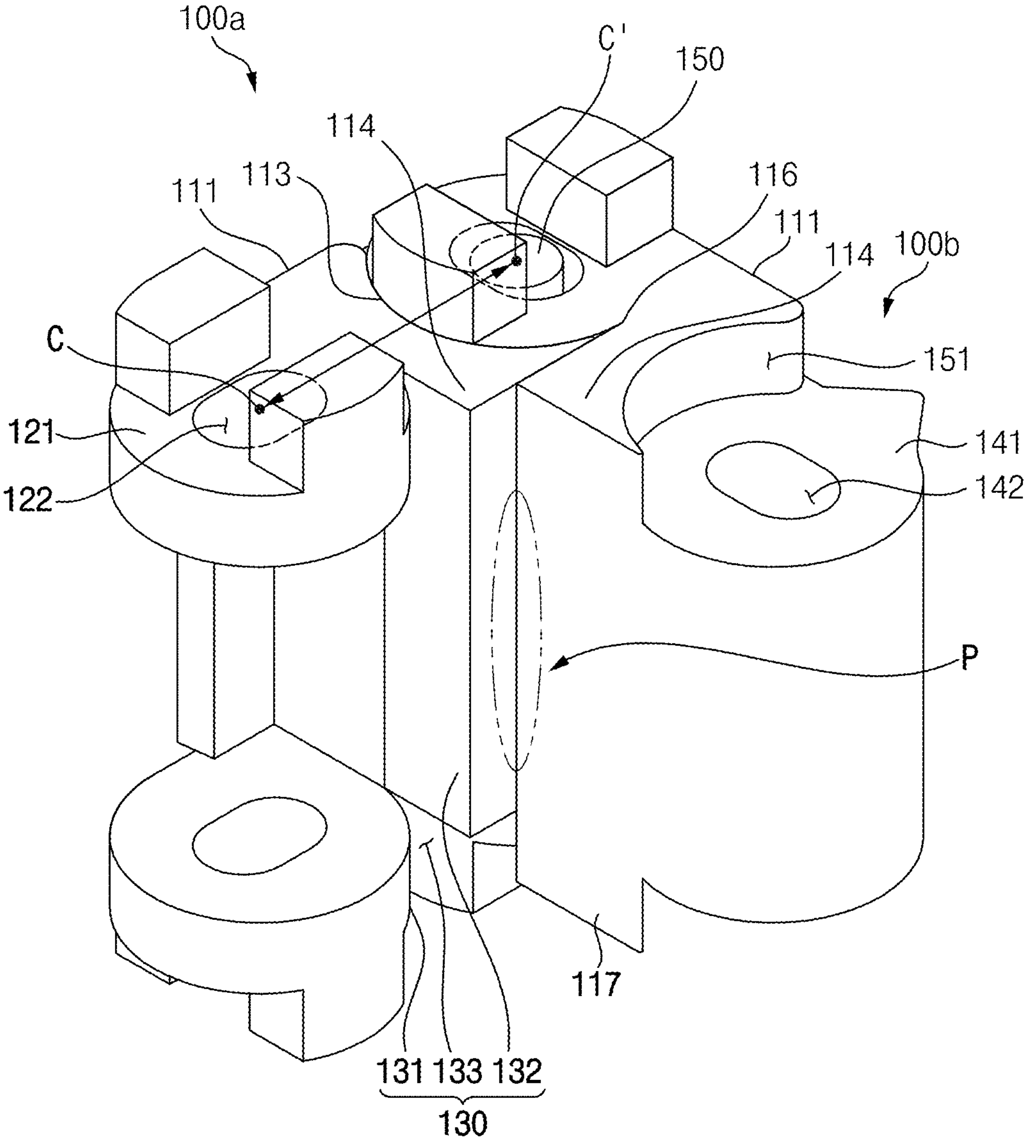
FIG. 14 is a perspective view illustrating a final change state of the unit block at the contact portion A when the wheel unit of FIG. 1 overcomes the obstacle.

In this respect, as explained above referring to FIG. 11, FIG. 12 and FIG. 13, the first and second unit blocks 100*a* and 100*b* adjacent to each other relatively rotates in a radially outward bending direction when contacting with the obstacle 6, and then the first and second unit blocks 100*a* and 100*b* are positioned as illustrated in FIG. 14. The end portion 116 of the first unit block 100*a* moves along the extending surface 131 of the second unit block 100*b*, and then is inserted into the supporting groove 133. Thus, the outer surface 117 of the first unit block 100*a* and the outer surface 117 of the second unit block 100*b* are perpendicular to each other, and the outer surfaces 117 make contact with the outer surface of the obstacle 6. For example, when the obstacle 6 includes the surfaces forming verticality like stairs, the outer surfaces 117 of the first and second unit blocks 100*a* and 100*b* are positioned and fixed on the surfaces forming the verticality, respectively, and then the outer surfaces 117 provide the contact point at which the wheel unit 10 rotates. However, it is not necessary to keep the outer surfaces 117 of the first and second unit blocks adjacent to each other in contact with both vertical surfaces of the vertical obstacle 6, and the contact state may be variable changed, such as sequentially contacting in consideration of the state of the two vertical surfaces of the obstacle 6. Further, when the two surfaces of the obstacle 6 are not perpendicular to each other, the outer surfaces 117 of the unit blocks 100 may not be perpendicular to each other and in this case, the end portion 116 of the first unit block 100*a* may be positioned into the supporting groove 133 of the second unit block 100*b* with an inserted state only to an appropriate extent.

Since the outer surfaces 117 of the unit blocks 100 adjacent to each other are maintained to be contacted at the contact position P with the obstacle 6 under any circumstances, the unit blocks 100 adjacent to each other rotate around the contact position P to overcome the obstacle 6, if the rotating force is applied to the wheel unit 10 in a direction.

To overcome the obstacle 6 with respect to the contact position P as explained above, the inner side of the unit blocks 100 making contact with the obstacle 6 should be deformed freely. In the present example embodiment, as illustrated in the figure, the first and second unit blocks 100*a* and 100*b* adjacent to each other may freely rotate relative to each other in a direction in which the inner surfaces 111 move away from each other, until the end portion 116 of the first unit block 100*a* is restricted from further movement by the supporting groove 113 of the second unit block 100*b*. Thus, the free deformation of the inner side of the unit blocks 100 making contact with the obstacle 6 may be implemented.

When the first and second unit blocks 100*a* and 100*b* are adhered or close to each other tightly, the distance between a center C of the combining portion 120 of the first unit block 100*a* and a center C' of the combining portion 120 of the second unit block 100*b* is maintained constantly and is not changed. As explained above, this is because the combining opening portion 122 and the central opening portion 142 extend in directions crossing each other, thereby limiting the movement range of the pin 150 located therein. Thus, the unit blocks 100 in contact with the obstacle 6 maintain a relative stable posture, and the external force generated in contacting the obstacle 6 may be stably absorbed and the obstacle 6 may be easily overcome.

Here, the adhesion between the unit blocks may be maintained by the elastic wire 400 passing through the fixing spaces 125 and connecting the unit blocks 100 adjacent to each other, and thus the obstacle 6 may be stably overcome.

Accordingly, when the unit blocks combined with each other makes contact with the obstacle, the inner sides of the unit blocks freely rotate but the outer sides thereof are fixed to be rotated with respect to the contact position P. Thus, problem such as the wheel unit 10 coming into contact with the obstacle and bouncing off may be prevented, and the external force due to the contact with the obstacle may be sufficiently absorbed and then the obstacle may be effectively overcome.

Figure 15:
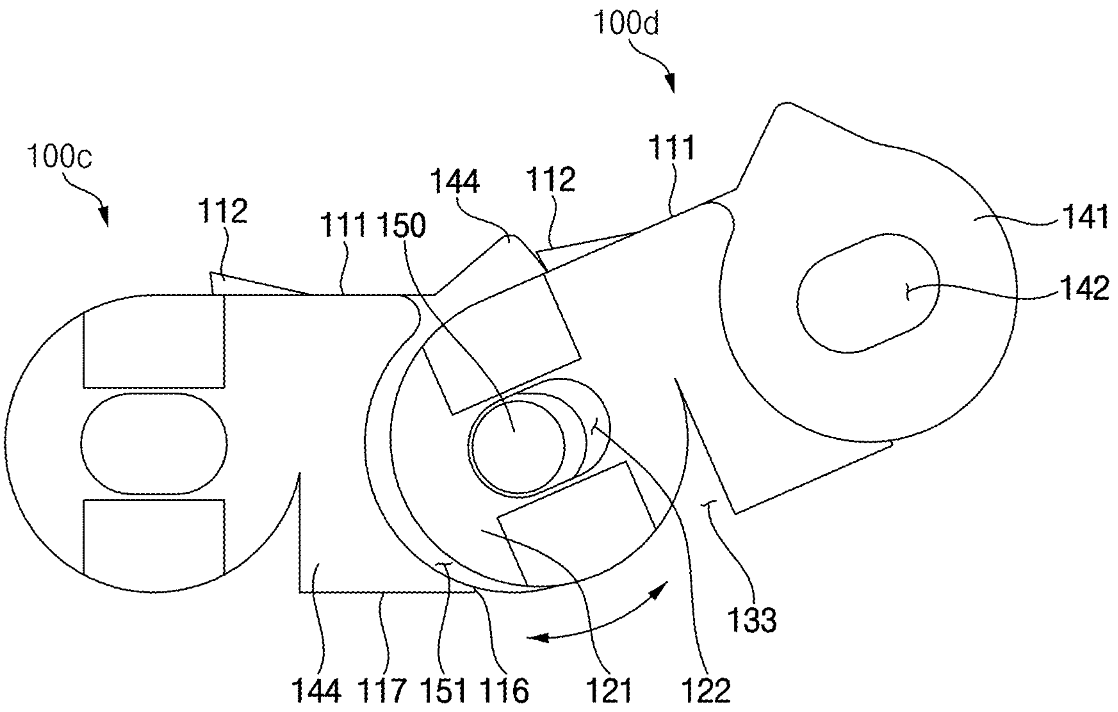
FIG. 15 is a front view illustrating a final change state of the unit block at the proximal portion B when the wheel unit of FIG. 1 overcomes the obstacle.

Then, FIG. 15 is a front view illustrating a final change state of the unit block at the proximal portion B when the wheel unit of FIG. 1 overcomes the obstacle. When the wheel unit 10 overcomes the obstacle 6, the relative positions of the unit blocks 100 adjacent to each other are changed in a different way in the proximal portion B, unlike the close contact and relative rotation of the unit blocks 100 adjacent to each other in the contact portion A.

Referring to FIG. 15, an outer portion of third and fourth unit blocks 100*c* and 100*d* adjacent to each other at the proximal portion B, is deformed to be far apart from each other due to a tensile force, but an inner portion thereof is deformed to be close to each other due to a compressive force. Thus, the third and fourth unit blocks 100*c* and 100*d* adhered to each other may relatively rotate in an opposite direction to the rotation in the contact portion A.

The third and fourth unit blocks 100*c* and 100*d* adjacent to each other relatively rotate inward in the radial direction, that is, in a direction toward the hub 300, and thus the end portion 116 of the third unit block 100*c* moves along the circumferential surface of the combining block 121 in a direction away from the supporting groove 133 of the fourth unit block 100*d* adjacent to the third unit block 100*c*. In addition, the supporting surface 145 of the third unit block 100*c* moves toward the inclined protrusion portion 112 of the fourth unit block 100*d*.

Here, the third and fourth unit blocks 100*c* and 100*d* adjacent to each other are released from being in close contact with each other, and the distance between the center of the combining portion 120 of the third unit block 100*c* and the center of the combining portion 120 of the fourth unit block 100*d* increases. The distance between the rotating portion 140 and the combining portion 120 of the third and fourth unit blocks 100*c* and 100*d* adjacent to each other increases to the maximum. However, the rotating portion 140 and the combining portion 120 of the third and fourth unit blocks 100*c* and 100*d* are combined with each other due to the pin 150, so that the pin 150 is positioned at a right end of the central opening portion 142 of the third unit block 100*c* and the pin 150 is positioned at a left end of the combining opening portion 122 of the fourth unit block 100*d*. Then, the distance between the third and fourth unit blocks 100*c* and 100*d* may be prevented from being increased.

In addition, even though the third and fourth unit blocks 100*c* and 100*d* adjacent to each other rotate inward in the radial direction, the supporting surface 145 of the third unit block 100*c* is prevented from being additionally moved due to the inclined protrusion portion 112 of the fourth unit block 100*d*. Thus, the amount of the rotation of the third and fourth unit blocks 100*c* and 100*d* adjacent to each other may be restricted. Then, imbalance or unstable uncoupling between the unit blocks may not occur due to excessive segmentation and rotation.

Thus, even though the outer surfaces 117 of the third and fourth unit blocks 100*c* are spaced apart from each other and segmented, the segmentation to a completely separated state of the contact may be prevented. In the present example embodiment, since the elastic wire 400 maintains the adhesion force between the unit blocks adjacent to each other, a state in which the surfaces 117 of the third and fourth unit blocks 100*c* and 100*d* adjacent to each other are completely separated with each other so that the outer appearance of the wheel unit 10 collapse as a whole may be prevented.

Accordingly, in the proximal portion B, the tensile force applied to the outer portions of the unit blocks 100 is absorbed through the elastic wire 400, and the compressive force applied to the inner portion of the unit blocks 100 is absorbed through the supporting surface 145 and the inclined protrusion portion 112. In addition, in the process, the combination state between the unit blocks 100 may be stably maintained by the pin 150. Thus, the unit blocks 100 are not displaced or the relative positions between the unit blocks 100 are not irregularly changed, and the shape of the wheel unit 10 as a whole may be maintained constantly.

Accordingly, when the wheel unit 10 overcomes the obstacle 6, the unit blocks adjacent to each other maintain different combination relationship in each of the contact portion A and the proximal portion B and change their relative positions, but stable overcoming of the obstacle may be performed without the shape of the wheel unit 10 collapsing.

Due to the specific structure of the unit block 100 according to the present example embodiment, in the process of overcoming the obstacle, the stable coupling relationship may be maintained regardless of the position of the unit blocks 100 in the contact portion A or in the proximal portion B, the unit blocks 100 adjacent to each other are in close contact with each other or are freely segmented, and further the relative position change may be restricted. Thus, the obstacle may be effectively overcome by the wheel unit 10.

According to the example embodiment explained above, based on the principle that a water droplet maintains its appearance through surface tension, a force similar to the surface tension of the water droplet is simulated through the tension applied by the supporting body and the adhesion force between the unit blocks, so that the wheel unit may maintain its overall shape and may effectively pass through the ground.

By applying the principle that the shape collapses when the force exceeding the deformation critical angle acts on the water droplet, effective overcoming of the obstacle may be possible through the relative rotation and the movement between the unit blocks adjacent to each other, when the wheel unit contacts the obstacle.

Here, even though the adhesion between the unit blocks is released and collapsed in the proximal portion, the unit blocks adjacent to each other are combined with each other via the pin, and thus the obstacle may be stably overcome, the stable combination between the unit blocks may be maintained and the overall shape of the wheel unit may be maintained stably.

Thus, even though the adhesion between the unit blocks is released in the proximal portion, the stable coupling relationship of the unit blocks may be maintained, and the state of the unit blocks released from the close contact may be easily restored by the elastic force provided through the elastic wire, so that the original shape of the wheel unit may be maintained again. Thus, the overcoming of the obstacle and the movement on the ground may be easily implemented.

Each of the unit blocks includes the rotating portion having the central opening portion and the combining portion having the combining opening portion, which are stably combined through the pin, and thus stable and effective driving may be maintained in overcoming the obstacle or the driving on the ground.

Further, the elastic wire fixes the unit blocks adjacent to each other with a predetermined elastic force, so that the force may be distributed as a whole even if the force is concentrated in a specific unit block and the degree of segmentation between the unit blocks segmented from each other may be limited within a certain range. Thus, the obstacle may be effectively overcome with maintain a stable wheel structure.

In the present example embodiment, the wheel unit 10 may further include a tension controller configured to control the tension applied by the supporting body 200.

Figure 16:
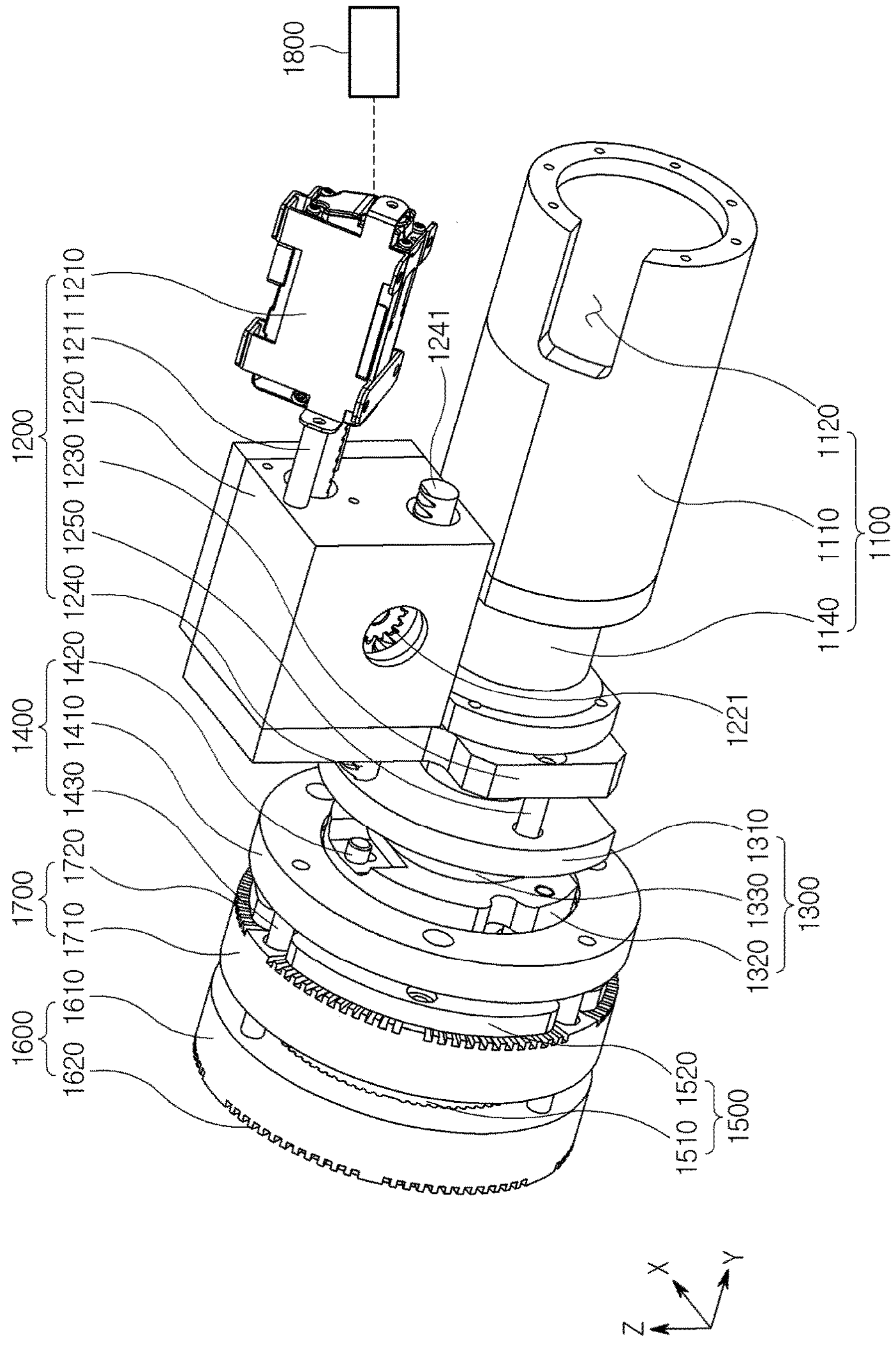
FIG. 16 is a perspective view illustrating a tension controller and first and second hub units of the wheel unit of FIG. 1.
Figure 17:
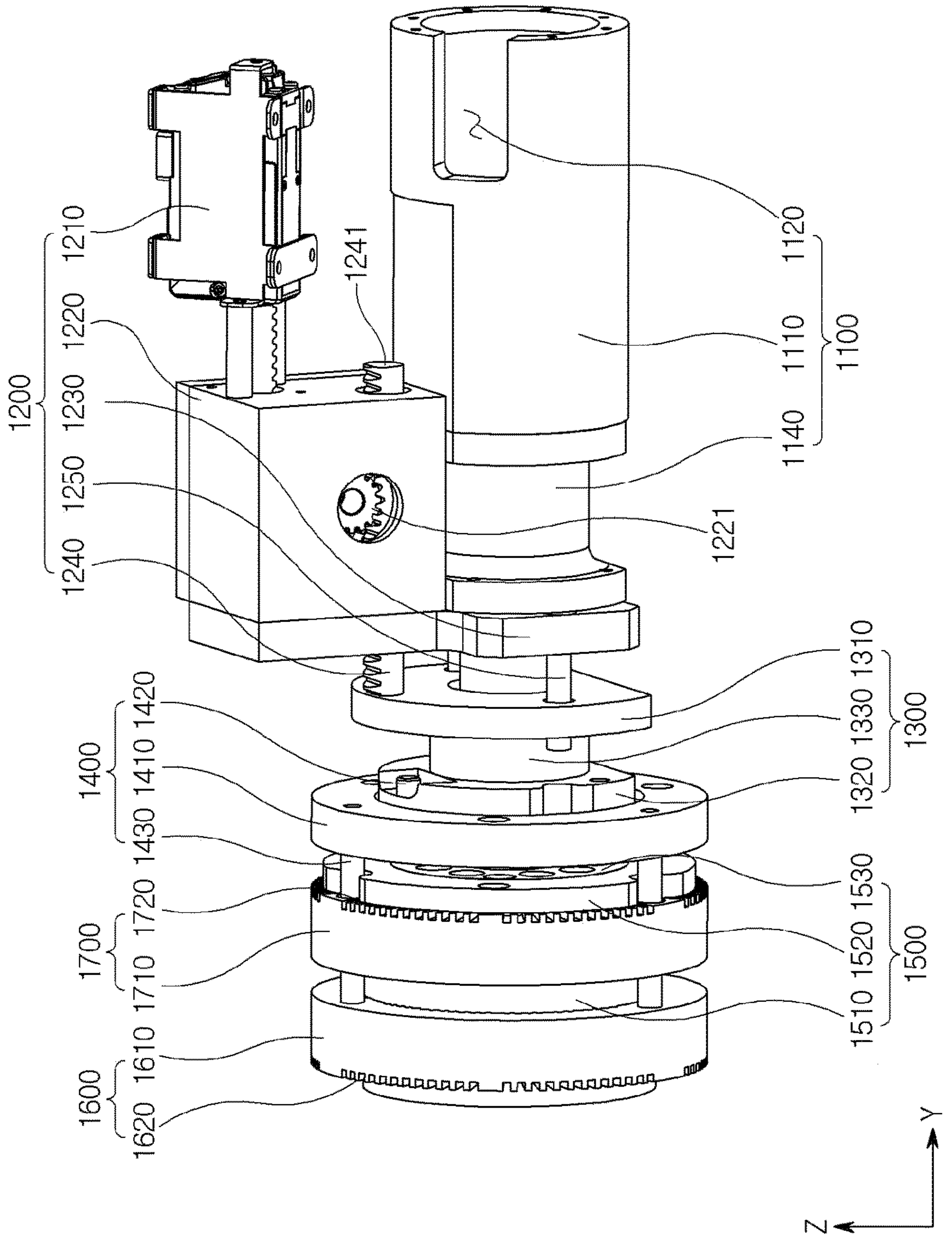
FIG. 17 is a side view illustrating the tension controller and the first and second hub units of FIG. 16.

FIG. 16 is a perspective view illustrating a tension controller and first and second hub units of the wheel unit of FIG. 1. FIG. 17 is a side view illustrating the tension controller and the first and second hub units of FIG. 16.

Referring to FIG. 16 and FIG. 17, the wheel unit 10 according to the present example embodiment further includes a rotational driving part 1100, a tension control part 1200, a distance maintaining unit 1300, a distance change unit 1400 and a rotating unit 1500. Here, the hub 300 includes a first hub unit 1600 and a second hub unit 1700 spaced apart from each other along an axial direction which is the Y direction. Here, the distance between the first and second hub units 1600 and 1700 is adjusted to control the tension applied by the supporting body 200.

The rotating driving part 1100 generates and provides a rotating force, and includes a rotating motor space 1120, a rotating axis 1130 and a rotating axis housing 1140.

The rotating axis housing 1140 forms the rotating motor space 1120 inside of the rotating axis housing 1140 and a rotating motor (not shown) generating the rotating force may be disposed in the rotating motor space 1120. Here, the rotating motor generates the rotating force with respect to the Y axis, and the generated rotating force is provided to the rotating axis 1130. The rotating axis 1130 rotates with respect to the Y axis, and provides the rotating force to the rotating unit 1500.

The rotating axis housing 1140 is disposed outside of the rotating axis 1130, and the rotating axis 1130 is disposed inside of the rotating axis housing 1140. The rotating motor housing 1110 and the rotating axis housing 1140 are sufficient for receiving the rotating motor and the rotating axis 1130, respectively, and the shapes or the structures of the rotating motor housing 1110 and the rotating axis housing 1140 are not limited to the figure illustrated.

The rotating axis 1130 passes through a fixing frame 1230, the distance maintaining unit 1300 and the distance change unit 1400, and then is connected to the rotating unit 1500. Each of the fixing frame 1230, the distance maintaining unit 1300 and the distance change unit 1400 includes an opening portion through which the rotating axis 1130 passes, not to constrain or limit the rotation of the rotating axis 1130.

The tension control part 1200 provides a sliding force such as a sliding driving force or a sliding feeding force along the Y direction, and include a tension control motor 1210, a decelerating part 1220, a fixing part 1230, a sliding bar 1240 and a sliding pin 1250.

The sliding control motor 1210 generates the driving force to provide the sliding force along the Y direction, and may be a rotating motor generating the rotating force. Thus, the rotating force generated by the tension control motor 1210 is provided to the decelerating part 1220 through the driving transfer axis 1211.

Alternatively, the tension control motor 1210 may be a linear motor generating a linear driving force along the Y axis. When the tension control motor 1210 is the linear motor, the driving transfer axis 1211 may provide the driving force along the Y direction to the decelerating part 1220.

The decelerating part 1220 has a decelerating gear 1221 inside, and decelerates the rotating force or the linear force provided by the driving transfer axis 1211 to increase a torque. The rotating torque increased by the decelerating gear 1221 is provided to the sliding bar 1240 connected to the decelerating gear 1221 through a gear coupling. Here, gear teeth 1241 are formed on the sliding bar 1240, and the decelerating gear 1221 is coupled with the gear teeth 1241 to perform a gear coupling like a worm gear. Thus, the rotating force of the decelerating gear 1221 having a relatively high torque may be converted to the sliding feed force of the sliding bar 1240 along the Y direction.

Accordingly, due to the tension control part 1220, the rotating force or the linear feed force generated in the tension control motor 1210 is converted to the relatively high torque in the decelerating part 1220, and thus the sliding bar 1240 may move linearly along the Y direction.

The fixing frame 1230 connecting the decelerating part 1220 with the rotating axis housing 1140 may be configured to the end portion of the decelerating part 1220. Here, the central opening portion is formed inside of the fixing frame 1230, and the rotating axis 1130 is extended with passing through the central opening portion. Here, an inner surface of the fixing frame 1230 is not interfered with or does not contact with the rotating axis 1130, and the fixing frame 1230 is not rotated and the position of the fixing frame 1230 is fixed regardless of the rotation of the rotating axis 1130.

The sliding pin 1250 is fixed to the fixing frame 1230, and a plurality of the sliding pins 1250 may extend along the Y direction. An end of the sliding pin 1250 is connected to a transfer frame 1310 of a distance maintaining unit 1310 explained below, and the transfer frame 1310 may slide along the Y direction on the sliding pin 1250. Here, the sliding pin 1250 may let the transfer frame 1310 transfer along the Y direction with respect to the fixing frame 1230, but may restrict the transfer frame 1310 from rotating with respect to the Y direction and with respect to the fixing frame 1230. Thus, the distance maintaining unit 1300 may perform the sliding transfer or the linear feeding along the Y direction with respect to the tension control part 1200. Here, the number or the position of the sliding pins 1250 may be changed variously and not limited to the figure illustrated.

The sliding bar 1240 may be fixed at a side of the transfer frame 1310, for example, at an upper side of the transfer frame 1310 as illustrated. Here, the sliding bar 1240 and the transfer frame 1310 are fixed with each other and thus any rotation or sliding may be impossible. Thus, when the sliding bar 1240 moves along the Y direction, the transfer frame 1310 moves along the Y direction with the same length.

Accordingly, with the decelerating part 120, the fixing frame 130 and the sliding pin 1250 fixed, the driving force generated from the tension control motor 1210 is converted enough to slide the sliding bar 1240 along the Y direction, and thus the sliding bar 1240 and the transfer frame 1310 moves linearly along the Y direction.

The distance maintaining unit 1300 includes the transfer frame 1310, the connecting frame 1320 and the distance maintaining frame 1330, and maintains the distance between the rotational driving part 1100 and the rotating unit 1500.

As explained above, the transfer frame 1310 is connected to the sliding bar 1240, and receives the sliding feed force of the sliding bar 1240 along the Y direction. Thus, the transfer frame 1310 moves linearly on the sliding pin 1250, with the sliding pin 1250 as the transfer guide.

The connecting frame 1320 is spaced apart from the transfer frame 1310 along the Y direction. Here, the distance maintaining frame 1330 maintains the distance between the connecting frame 1320 and the transfer frame 1310, and the distance between the connecting frame 1320 and the transfer frame 1310 may be changed variously according to an extending length of the distance maintaining frame 1330 along the Y direction.

The connecting frame 1320, the distance maintaining frame 1330 and the transfer frame 1310 are integrally formed with each other. Thus, as the transfer frame 1310 moves linearly along the Y direction, the connecting frame 1320 and the distance maintaining frame 1330 move along the Y direction at the same time. A central opening portion is formed through the transfer frame 1310, the connecting frame 1320 and the distance maintaining frame 1330 in common, and the rotating axis 1130 passes through the central opening portion.

Here, the inner surfaces of the transfer frame 1310, the connecting frame 1320 and the distance maintaining frame 1330 do not make contact with an outer surface of the rotating axis 1130, and thus, the rotating force of the rotating axis 1130 is not transmitted to the transfer frame 1310, the connecting frame 1320 and the distance maintaining frame 1330. That is, the distance maintaining unit 1300 is not driven by the rotating force of the rotating axis 1130.

Figure 20:
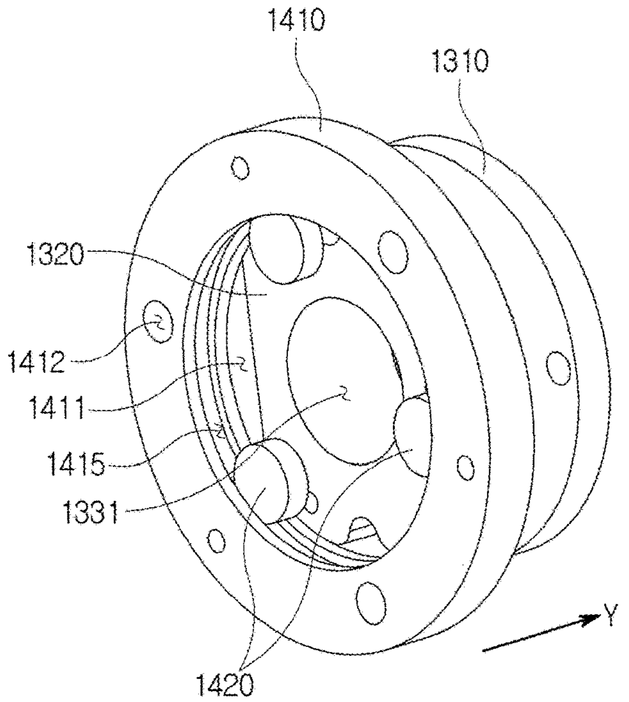
FIG. 20 is a perspective view illustrating a connection between a distance change unit and a distance unit of the tension controller of FIG. 16.

Hereinafter, the distance change unit 1400 is explained referring to FIG. 20, additionally. FIG. 20 is a perspective view illustrating a connection between a distance change unit and a distance unit of the tension controller of FIG. 16.

A first side of the distance change unit 1400 is connected to the distance maintaining unit 1300, and a second side of the distance change unit 1400 is connected to at least one of the first and second hub units 1600 and 1700. Thus, the sliding force along the Y direction provided from the distance maintaining unit 1300 is transferred to at least one of the first and second hub units 1600 and 1700.

For example, the distance change unit 1400 includes a distance change frame 1410, a rotating bearing 1420 and an extending bar 1430.

The distance change frame 1410 has a doughnut shape, and a central opening portion 1411 is formed inside of the distance change frame 1410. The distance change frame 1410 connects the connecting frame 1320 of the distance maintaining unit 1300 to at least one of the first and second hub units 1600 and 1700. The distance change frame 1410 is connected to the connecting frame 1320, and thus the distance change frame 1410 moves slidably. In addition, the distance change frame 1410 is connected to at least one of the first and second hub units 1600 and 1700, and thus the distance change frame 1410 is rotated with respect to the Y direction. Thus, as illustrated in FIG. 20, the rotating bearing 1420 is disposed between the connecting frame 1320 and the distance change frame 1410, and the distance change frame 1410 may be rotated and slidably moved.

For example, a first side of the rotating bearing 1420 is fixed to the connecting frame 1320, and a second side of the rotating veering 1420 is disposed on an inner surface of the distance change frame 1410. The rotating bearing 1420 rotates for itself, and as illustrated in the figure, three rotating bearings 1420 are disposed with a constant space by 120°.

The central opening portion 1411 is formed at the center of the distance change frame 1410, and an inner groove 1415 is formed at an inner surface of the distance change frame 1410. Thus, an outer surface of the second side of the rotating bearing 1420 is disposed at the inner groove 1415. Accordingly, each outer surface of the rotating bearings 1420 is disposed at the inner groove 1415 and the inner surface of the distance change frame 1410 makes contact with the outer surface of the rotating bearings 1420, so that the distance change frame 1410 rotates with respect to the rotating bearings 1420 with respect to the Y direction. Thus, the distance change frame 1410 rotates with respect to the Y direction in connection with the first and second hub units 1600 and 1700.

In addition, the inner groove 1415 formed at the distance change frame 1410 is the groove formed inside and concavely, and the second side of the rotating bearing 1420 is mounted on the inner groove 1415. Thus, the outer surface of the rotating bearing 1420 is partially inserted into the inner groove 1415. Accordingly, when the rotating bearing 1420 is disposed at the inner groove 1415, the inner groove 1415 restricts the linear movement of the rotating bearing 1420 along the Y direction. That is, the rotating bearing 1420 cannot move along the Y direction with respect to the inner groove 1415, and then the rotating bearing 1420, the connecting frame 1320 at which the first side of the rotating bearing 1420 is fixed, and the distance change frame 1410 move along the Y direction at the same time. Then, the distance change frame 1410 may move slidably along the Y direction, by connecting the connecting frame 1320.

Accordingly, the distance change frame 1410 and the distance change unit 1400 having the distance change frame 1410 rotate with respect to the Y direction due to the rotational driving part 1100, and also move slidably along the Y direction due to the sliding force transmitted by the tension control part 1200.

Figure 19:
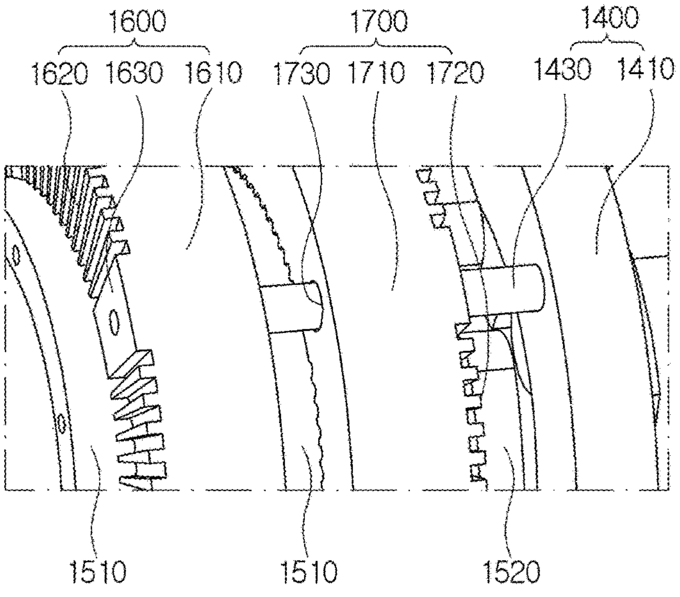
FIG. 19 is a perspective view illustrating a connection between the tension controller and the first and second hub units of FIG. 16.

The extending bar 1430 extends from the distance change unit 1410 along the Y direction to the first and second hub units 1600 and 1700, and this is explained in detail referring to FIG. 19. FIG. 19 is a perspective view illustrating a connection between the tension controller and the first and second hub units of FIG. 16.

A first end of the extending bar 1430 is fixed to the distance change unit 1410, and thus the extending bar 1430 linearly moves along the Y direction at the same time when the distance change unit 1410 linearly moves along the Y direction. For example, three extending bars 1430 may be disposed with a constant space by 120°, but the number of the extending bars is not limited thereto.

The extending bar 1430 passes through a second hub portion 1710 of the second hub unit 1700 disposed adjacent to the distance change unit 1410, and finally is fixed to a first hub portion 1610 of the first hub unit 1600. Here, the first hub unit 1600 may further include a fixing portion 1630 configured to fix a second end of the extending bar 1430 to inside of the first hub unit 1600. The extending bar 1430 extending from the distance change unit 1410 passes through the second hub portion 1710 and then is fixed to the first hub portion 1610. Here, the movement of the extending bar 1430 along the Y direction is not restricted or interfered by the second hub portion 1710, and thus the second hub portion 1710 may be fixed regardless of the linear movement of the extending bar 1430. However, the first hub portion 1610 moves linearly along the Y direction, due to the linear movement of the distance change unit 1410 along the Y direction.

Due to the linear movement of the first hub portion 1610 along the Y direction, the distance between the first and second hub portions 1610 and 1710 may be decreased or increased relatively.

Figure 18:
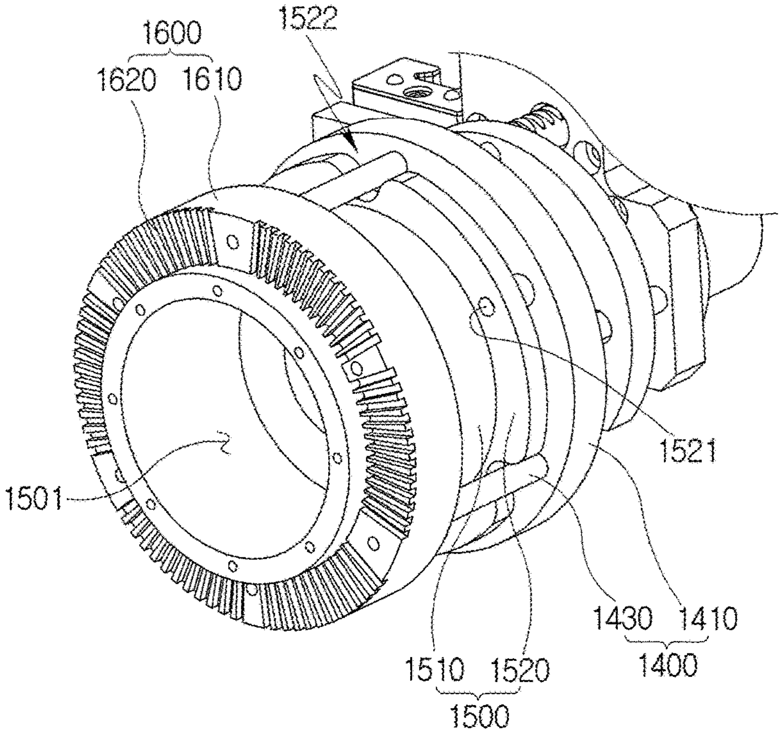
FIG. 18 is a perspective view illustrating the tension controller and the first hub unit of FIG. 16, in which the second hub unit is removed.

Referring to FIG. 18, the rotating unit 1500 and the first and second hub units 1600 and 1700 are explained. FIG. 18 is a perspective view illustrating the tension controller and the first hub unit of FIG. 16, in which the second hub unit is removed.

The rotating unit 1500 includes a main rotating part 1510, a stepped frame 1520 and a central frame 1530.

The main rotating part 1510 has a hollow cylindrical shape, and a central opening portion 1501 is formed at a center of the main rotating part 1510. The central frame 1530 is inserted and fixed to the central opening portion 1501. The central frame 1530 is connected to an end of the rotating axis 1130, and the central frame 1530 receives the rotating force provided by the central axis 1130 and then rotates with respect to the Y direction. Accordingly, the central frame 1530 rotates with respect to the Y direction, and thus the main rotating part also rotates with respect to the Y direction.

The first and second hub units 1600 and 1700 are fixed to an outer surface of the main rotating part 1510, and as explained above, the extending bar 1430 is connected. Here, the first and second hub units 1600 and 1700 are fixed to the main rotating part 1510 and are rotated with the main rotating part 1510. At the same time, the first hub unit 1600 is slidably driven on the outer surface of the main rotating part 1510 along the Y direction.

Thus, the first hub unit 1600 should have a predetermined adhesion without sliding when the main rotating part 1510 rotates with respect to the Y direction, but the first hub unit 1600 should be slidably contacted along the Y direction. As for the Y directional sliding, as explained above, the first hub unit 1600 is slidably moved by the sliding feed force transmitted by the extending bars 1430, and that is, the first hub unit 1600 is slidably moved by the predetermined force transmitted along the Y direction. Thus, the first hub unit 1600 maintains the combined state with a predetermined frictional force on the outer surface of the main rotating part 1510, and thus, the first hub unit 1600 rotates with the rotation of the main rotating part 1510 by the predetermined frictional force. In addition, the sliding feed force transmitted to the first hub unit 1600 by the extending bars 1430 should be larger than the frictional force between the first hub unit 1600 and the main rotating part 1510, and shut the first hub unit 1600 move linearly along the Y direction.

Alternatively, the second hub unit 1700 is fixed to the outer surface of the main rotating part 1510 without slidably movement. For example, the second hub unit 1700 is stably fixed to the main rotating part 1510 through the stepped frame 1520. As illustrated in FIG. 18, the stepped frame 1520 is protruded from the outer surface of the main rotating part 1510 from a first side end of the main rotating part 1510 by a predetermined length. Here, the height of the protrusion of the stepped frame 1520 should be smaller than the thickness of the second hub unit 1700. The stepped frame 1520 is positioned to fix a lower portion of the second hub portion 1710 at the second hub unit 1700.

In addition, a plurality of fixing holes 1521 at the stepped frame 1520, and although not shown in the figure, a plurality of fixing holes are also formed at the second hub portion 1710 aligned with the fixing holes 1521. Thus, the fixing holes 1521 of the stepped frame 1520 and the fixing holes of the second hub portion 1710 are combined through a combining element, for example a pin, and thus the second hub unit 1700 is combined and fixed to the stepped frame 1520.

Thus, even though the second hub unit 1700 receives the sliding force along the Y direction through the extending bar 1430, the second hub unit 1700 is fixed with the stepped frame 1520 and is not moved linearly.

In addition, since the plurality of the extending bars 1430 is extended at the outer side of the main rotating part 1510, the extending state of the extending bar 1430 may be interfered by the stepped frame 1520 due to the protrusion of the stepped frame 1520 from the main rotating part 1510. Thus, in the present example embodiment, the grooves 1522 are formed in the stepped frame 1520 at the extending position of the extending bar 1430, to prevent the extending bar 1430 from being interfered with the stepped frame 1520, and to perform the sliding movement of the extending bar 1430 smoothly.

The first hub unit 1600 includes a first hub portion 1610 and a first fixing portion 1620. The first hub portion 1610 is positioned on the main rotating part 1510, with an inner surface of the first hub portion 1610 making contact with an outer surface of the main rotating part 1510. The first fixing portion 1620 is formed on an outer surface of a first side end of the first hub portion 1610, with a constant interval.

A plurality of the first fixing portions 1620 may be formed along a first side circumferential surface of the first hub by a constant interval, and each of the first fixing portions 1620 may be a groove having a predetermined depth. Here, the number of the first fixing portions 1620 may be variously changed. A plurality of wires which is the supporting body 200 may be fixed at each of the first fixing portions 1620, and this will be explained below in detail.

Likewise, the second hub unit 1700 includes a second hub portion 1710 and a second fixing portion 1720. The second hub portion 1710 is disposed on the main rotating part 1510 with an inner surface of the second hub portion 1710 making contact with an outer surface of the main rotating part 1510. The second fixing part 1720 is formed on an outer surface of a second side end of the second hub portion 1710, with a constant interval.

A plurality of the second fixing portions 1720 may be formed along a second side circumferential surface of the second hub 1710 by a constant interval, and each of the second fixing portions 1720 may be a groove having a predetermined depth. Here, the number of the second fixing portions 1720 may be variously changed. Here, the second side circumferential surface of the second hub 1710 at which the second fixing part 1720 is formed is an opposite circumferential surface of the circumferential surface toward the first hub portion 1610, and thus, the first and second fixing portions 1620 and 1720 are formed at the opposite end at the pair of the hub units 1600 and 1700. A plurality of wires which is the supporting body 200 may be fixed at each of the second fixing portions 1720.

Figure 21:
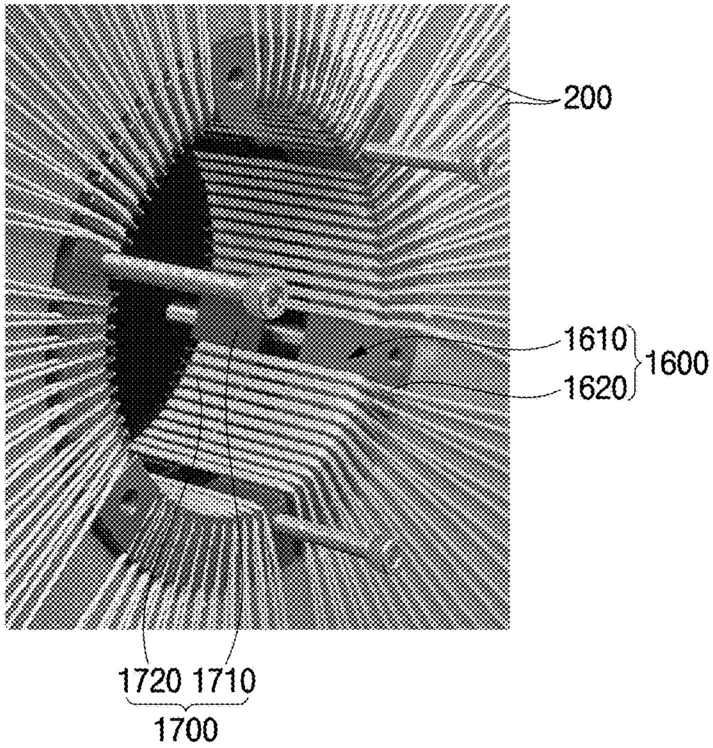
FIG. 21 is a perspective view illustrating the first and second hub units at which a plurality of wires is configured.

Hereinafter, the connection of the plurality wires with the first and second hub units 1600 and 1700 are explained referring to FIG. 21. FIG. 21 is a perspective view illustrating the first and second hub units at which a plurality of wires is configured. In FIG. 21, for the convenience of explanation, the tension controller is omitted.

Each of the wires is connected between one unit block of the unit blocks 100 and the first and second hub hunts 1600 and 1700. Each of the wires extends from the one unit block of the unit blocks 100, passes through the first and second fixing portions 1620 and 1720, and then extends to the one unit block again.

For example, the wire radially extends toward the first and second hub units 1600 and 1700 from the one unit block and is fixed to the groove of the first fixing portion 1620, and then the extending direction of the wire is changed. Then, the wire extends along the Y direction, and passes through the inner surface of the first hub 1610 and the inner surface of the second hub 1710, and then the extending direction of the wire is changed toward the one unit block. Further, the wire is fixed to the groove of the second fixing portion 1720, and is extended to the one unit block. Here, the wire is fixed to the first and second fixing portions 1620 and 1720 positioned in a line along the Y direction. Here, a single wire forms a closed loop along the one unit block and the first and second fixing portions 1620 and 1720, and extends without cutting off.

Figure 22:
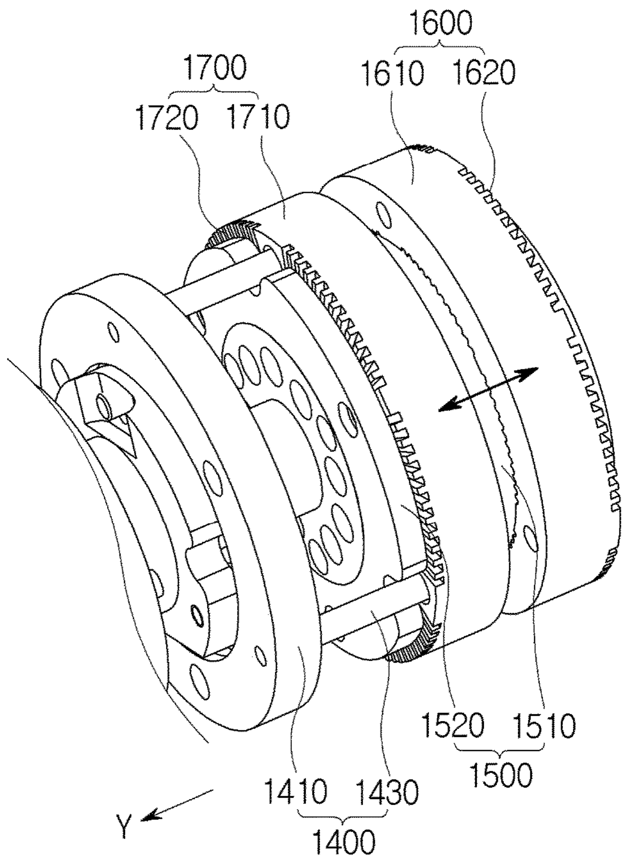
FIG. 22 is a perspective view illustrating a distanced state between the first and second hub units due to the tension controller of FIG. 16.
Figure 23:
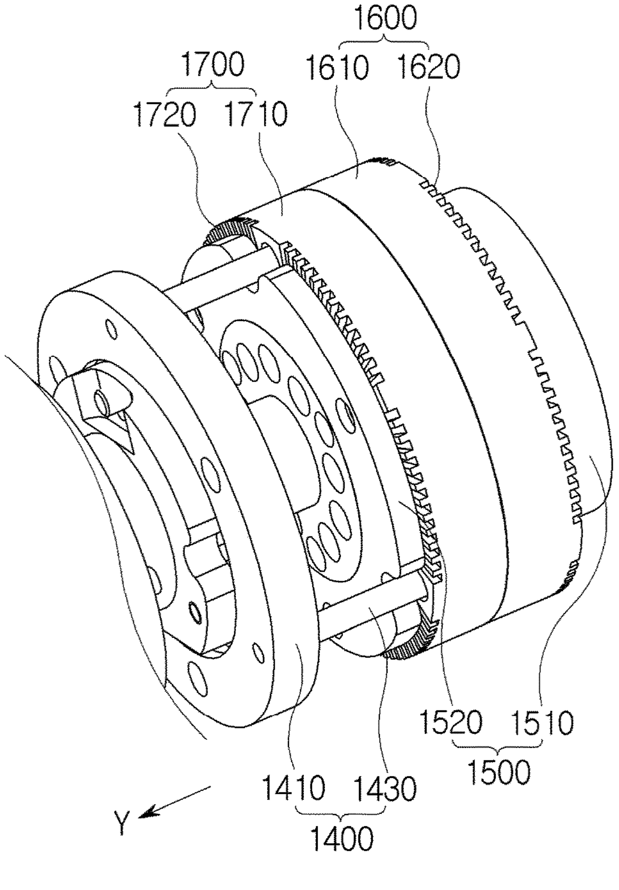
FIG. 23 is a perspective view illustrating a proximal state between the first and second hub units due to the tension controller of FIG. 16.

FIG. 22 is a perspective view illustrating a distanced state between the first and second hub units due to the tension controller of FIG. 16, and FIG. 23 is a perspective view illustrating a proximal state between the first and second hub units due to the tension controller of FIG. 16.

As explained above, since the wires extend with fixed to the first and second hub units 1600 and 1700, the tension applied to the wire may be changed due to the change of the distance between the first and second hub units 1600 and 1700.

As illustrated in FIG. 22, as the distance between the first and second hub units 1600 and 1700 increases, the tension applied to the wire which is connected between the unit blocks 100 and the first and second hub units 1600 and 1700 with a closed loop is increased.

Alternatively, as illustrated in FIG. 23, as the distance between the first and second hub units 1600 and 1700 decreases, the tension applied to the wire may be decreased. As the first and second hub units 1600 and 1700 approach each other for the contacting, the tension applied to the wires may be minimized.

Accordingly, the tension applied to the supporting body 200 which corresponds to a spoke of the wheel unit 10 may be controlled, by changing the distance between the first and second hub units 1600 and 1700. Thus, a proper tension may be applied for various driving circumstances.

For example, for the flat ground without a curve, the wheel unit 10 is driven with increasing the tension of the supporting body 200 so that the wheel unit 10 may be maintained to be a circular shape and may be driven with a relatively faster speed. Further, a height of the wheel unit 10 may be easily adjusted using the control of the contact angle with the ground based on the control of the tension on the ground (referring to FIG. 3).

Alternatively, for the ground having a large curve, the wheel unit 10 is driven with decreasing the tension of the supporting body 200 so that the wheel unit 10 may absorb an impact due to the curve of the ground and may be driven with better stability and directionality regardless of the change of the curve. Further, in passing through the obstacle such as the stairs, the wheel unit 10 is driven with decreasing the tension as in passing the curved ground, and thus the impact in passing the obstacle may be effectively absorbed and the stable overcoming on the obstacle may be performed.

As illustrated in FIG. 16, the wheel unit 10 according to the present example embodiment may further include a controller 1800 configured to control the tension applied by the supporting body 200.

The controller 1800 may increase the tension of the supporting body 200 when the wheel unit 10 passes through the flat ground without the curve. Here, in the flat ground without the curve, the force applied to the wheel unit 10 from the ground is constant and thus the stable driving is possible even when the relative deformation of the wheel unit 10 is minimized.

Alternatively, the controller 1800 may decrease the tension of the supporting body 200 when the wheel unit 10 passes through the ground having a relatively larger curve or the obstacle. Here, the distance between the first and second hub units 1600 and 1700 is decreased to decrease the tension applied by the supporting body 200. In the ground having the curve or in passing the obstacle, the force applied to the wheel unit 100 from the ground is irregular and thus it is advantageous for the wheel unit 10 to absorb and pass through the impact effectively with slight deformation of the wheel unit 10.

The controller 1800 is connected to the tension controller to adjust the distance between the first hub unit 1600 and the second hub unit 1700. Further, the controller 1800 may control the tension of the wire, too.

Thus, with maintaining the speed of the wheel unit for the various driving circumstances, the tension of the wheel unit is easily adjusted by controlling the distance of the hub units, so that the structural deformation of the wheel unit to control the tension may be omitted and the easy and fast tension control may be performed.

The elements of the tension controller are optimized to perform sliding movement while maintaining transmission of the rotational force, so that the manufacture may be easily performed and the driving may be also easily controlled.

Due to the tension control of the supporting body, the wheel unit may optimally adjust the tension so that it is suitable for various driving circumstances, that is, the ground with constant or large curves. Further, in overcoming the obstacle, the tension may be optimally controlled to meet the overcoming situation.

Figure 24:
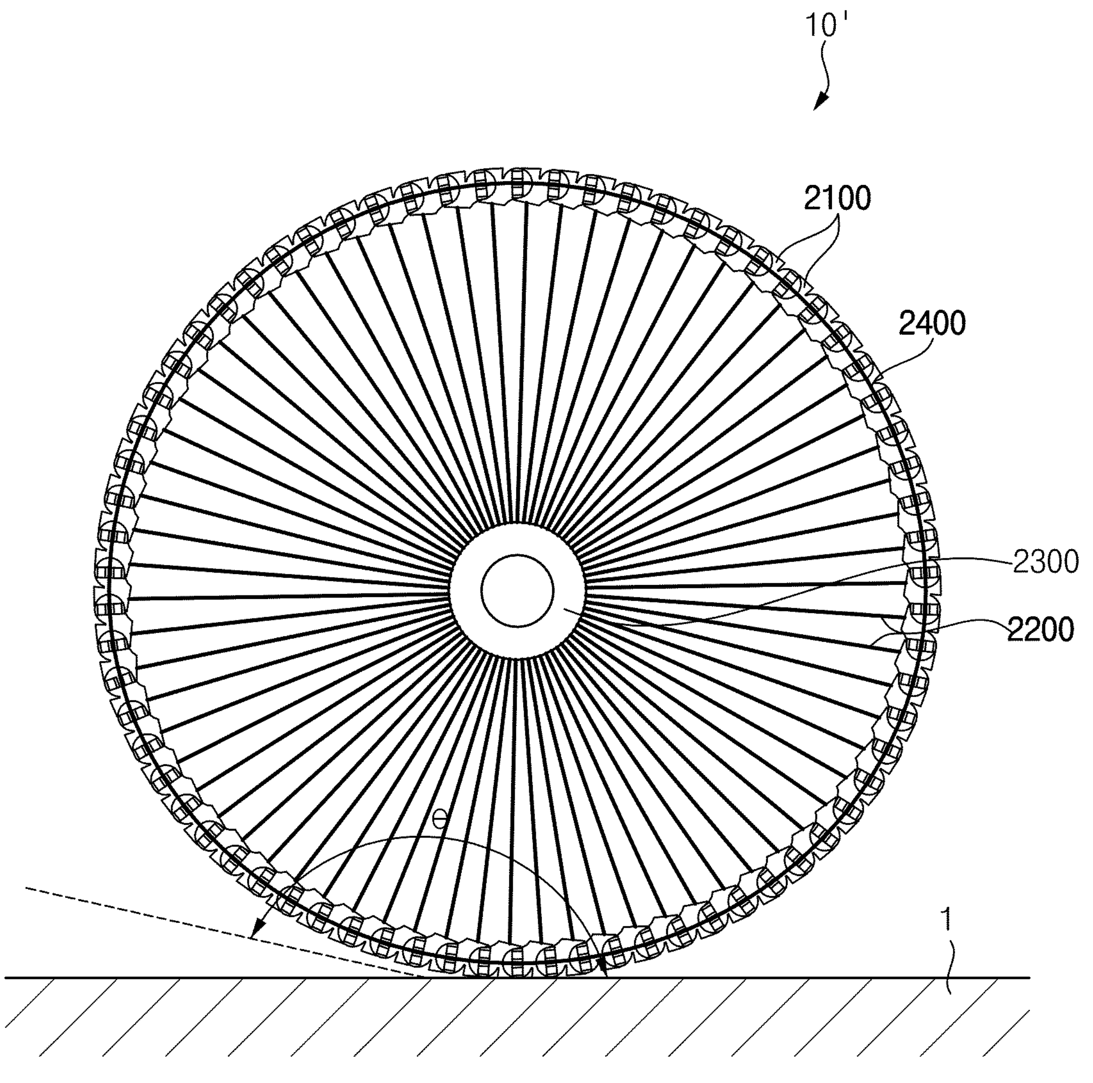
FIG. 24 is a front view illustrating a wheel unit for overcoming an obstacle passing through the ground according to another example embodiment of the present invention.
Figure 25:
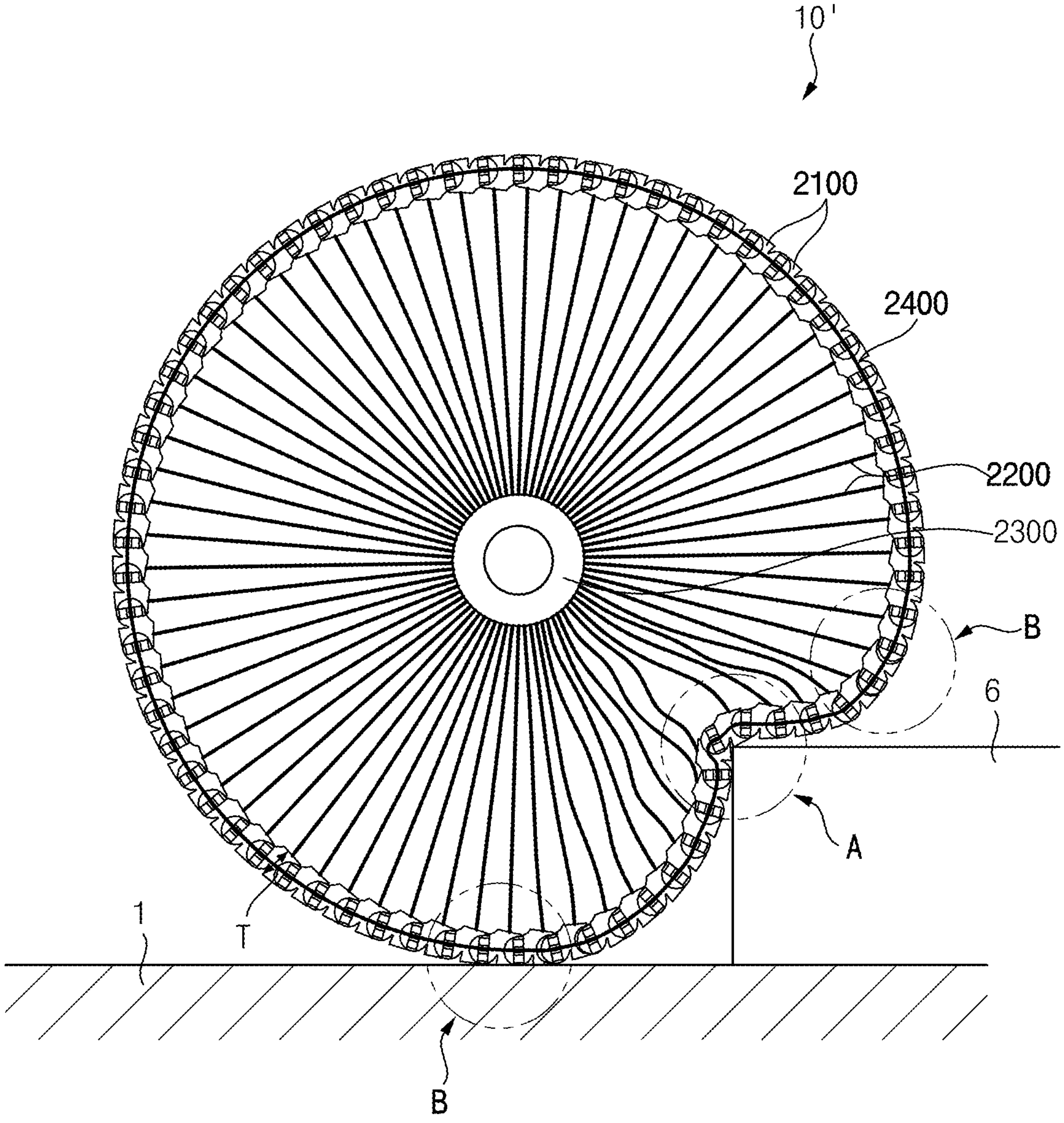
FIG. 25 is a front view illustrating the wheel unit of FIG. 24 overcoming the obstacle.

Then, a wheel unit 10' for overcoming the obstacle according to another example embodiment will be explained referring to FIG. 24 and FIG. 25. FIG. 24 is a front view illustrating a wheel unit for overcoming an obstacle passing through the ground according to another example embodiment of the present invention. FIG. 25 is a front view illustrating the wheel unit of FIG. 24 overcoming the obstacle.

Referring to FIG. 24 and FIG. 25, the wheel unit 10' according to the present example embodiment includes a plurality of unit blocks 2100, a supporting body 2200, a hub 2300 and an elastic wire 2400. The wheel unit 10' according to the present example embodiment is substantially same as the wheel unit 10 according to the previous example embodiment except for a shape of the unit block and a combination structure of the unit blocks, and thus any repetitive explanation will be omitted.

The plurality of unit blocks 2100 is spaced apart from the hub 2300 by a predetermined distance, and is arranged along a circumferential direction. The unit blocks 2100 are close up to or adhered to each other to form a circular shape in a whole, and form the outer shape of the wheel unit 10'. The unit blocks 2100 adjacent to each other are relatively rotated and moved with each other. Thus, the unit blocks 2100 adjacent to each other may be close up or adhered to each other, or the close or adhered state of the unit blocks adjacent to each other may be released.

Referring to FIG. 24, when the wheel unit 10' passes through the ground which is flat, the unit blocks 2100 are close up or adhered to each other explained below, and the supporting body 2200 applies the tension to the unit blocks 2100 toward the hub 2300 at the same time. Further, the elastic wire 2400 may apply the tension to the unit blocks 2100 toward the hub 2300, too.

Referring to FIG. 25, when the wheel unit 10' collides with the obstacle 6 such as the stairs on the ground 1, the wheel unit 10' starts to deform at the collision position. At the contact portion A, the shape of the wheel unit 10' is collapsed with reflecting the shape of the obstacle 6, and the combination state of the wheel unit 10' is changed due to the relative rotation and movement between the unit blocks. Here, since the hub continuously rotates, the wheel unit 10' overcomes the obstacle 6 while the hub 2300 rotates with respect to the contact portion A, even though the shape of the unit blocks 2100 is collapsed.

Figure 26:
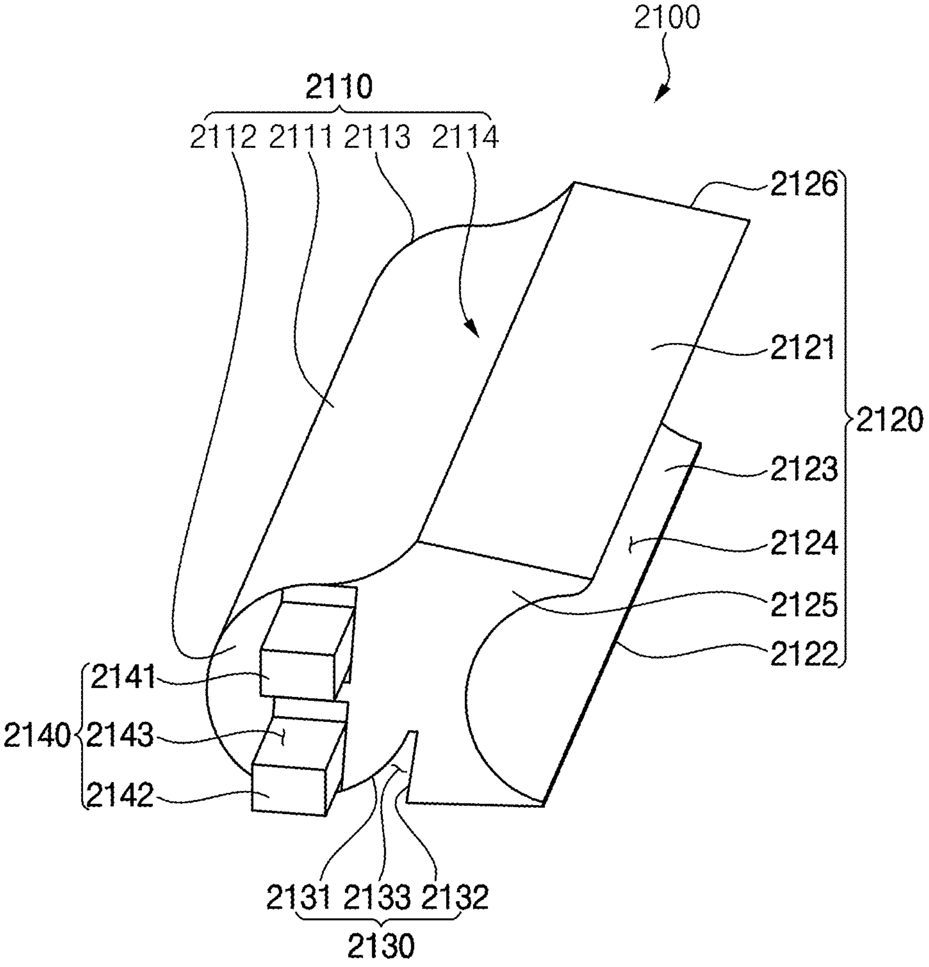
FIG. 26 is a perspective view illustrating a unit block of the wheel unit of FIG. 24.
Figure 27:
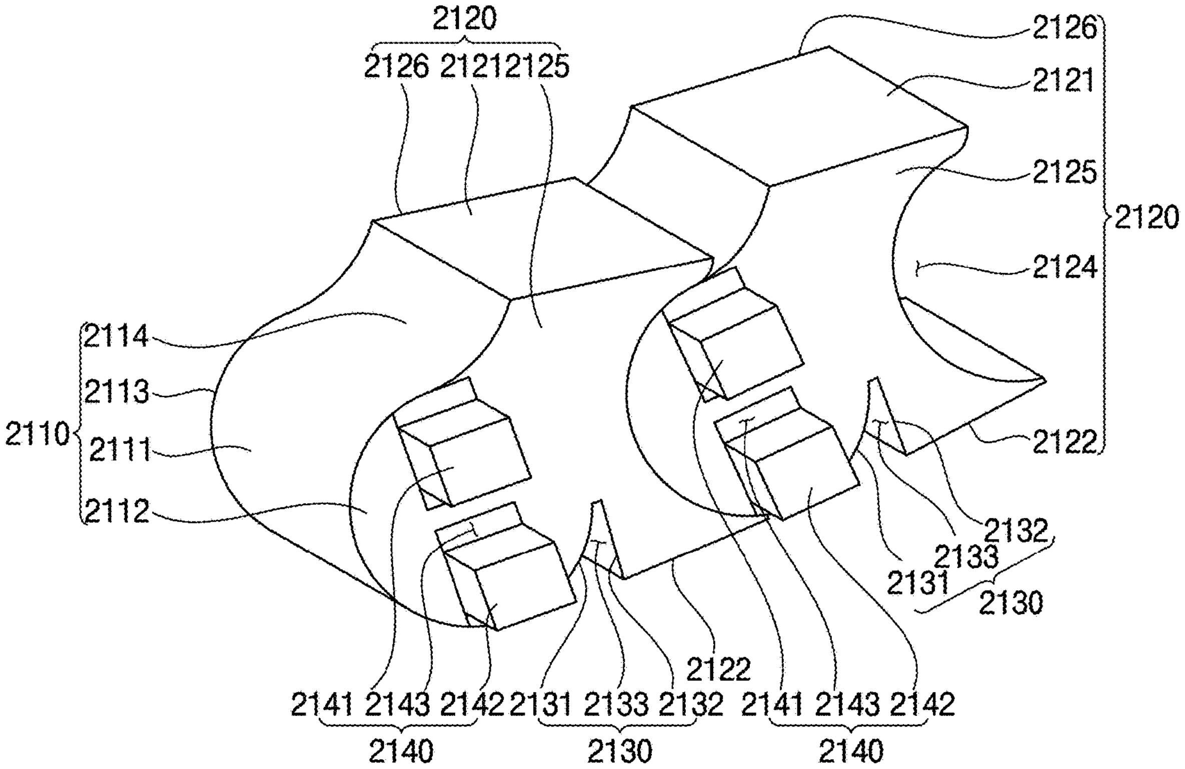
FIG. 27 is a perspective view illustrating a pair of unit blocks combined with each other.

Referring to FIG. 26 and FIG. 27, the detailed structure of each of the unit blocks 2100 and the connection state between the unit blocks 2100 are explained. FIG. 26 is a perspective view illustrating a unit block of the wheel unit of FIG. 24, and FIG. 27 is a perspective view illustrating a pair of unit blocks combined with each other.

Each of the unit blocks 2100 includes a body 2110, a connecting portion 2120, a groove portion 2130 and a fixing portion 2140.

The body 2110 forms a main body of the unit block 2100, and as illustrated in the figure, has the cylindrical shape as a whole. The connecting portion 2120 is extended from a first side of the body 2110. The body 2110 has a predetermined width, and the width of the body 2110 may be changed variously.

For example, the body 2110 includes a rotating body 2111 having an outer surface which is a rounded curved shape, first and second side surfaces 2112 and 2113 forming both surfaces of the rotating body 2111, and an extended surface 2114.

The rotating body 2111 has a cylindrical shape in a whole, and the connecting portion 2120 extends from the first side of the rotating body 2111. Here, an upper side of the rotating body 2111 extends upward to be the extended surface 2114 having an outer surface forming a curved surface. Here, for the convenience of explanation, it is explained as ‘upper side’ with reference to FIG. 26, but it may be substantially ‘lower side’, and this may be ‘upper side’ similarly to ‘lower side’ explained later. Here, the outer surface of the rotating body 2111 has a cylindrical outer shape of protruding shape, but on the contrary, the extended surface 2114 is extended with a concave curved surface.

A pair of the fixing portions 2140 is protruded from each of the first and second side surfaces 2112 and 2113. The upper fixing portion 2141 and the lower fixing portion 2142 are protruded from the first side surface 2111. The upper and lower fixing portions 2141 and 2142 are spaced apart from each other, and a predetermined fixing space 2143 is formed between the upper and lower fixing portions 2141 and 2142. Likewise, although not shown in the figure, the upper and lower fixing portions are protruded from the second side surface 2113 and are spaced apart from each other and forming the fixing space therebetween.

The elastic wire 2400 is extended to the fixing space 2143 and is fixed in the fixing space 2143, and the size of the fixing space 2143 may be changed variously considering a thickness of the elastic wire 2400. The elastic wire 2400 is fixed in the fixing space 2143 and is extended all over the unit blocks 2100, so that the elastic force of the elastic wire 2400 may be provided to the unit blocks 2100 toward the hub 2300 and the adhesion force between the elastic blocks 2100 may be provided.

The connecting portion 2120 extends from the first side of the body 2110 and the connecting portion 2120 forms an inserting space into which the body of the adjacent unit block is inserted so as for the adjacent unit block to be close up or adhered. For example, the connecting portion 2120 includes a first connecting surface 2121, a second connecting surface 2122, a contact surface 2123, a first side surface 2125 and a second side surface 2126.

The first connecting surface 2121 extends from the extended surface 2114. An outer surface of the first connecting surface 2121 forms a flat surface extending flat, and the outer surface of the first connecting surface 2121 becomes sharper and protrudes as it gets farther from the body 2110. The second connecting surface 2122 extends from an opposite side of the extended surface 2114. An outer surface of the second connecting surface 2122 forms a flat surface extending flat, and the outer surface of the second connecting surface 2122 becomes sharper and protrudes as it gets farther from the body 2110. Here, the groove portion 2130 is formed at a lower side of the rotating body 2111 from which the second connecting surface 2122 is extended, so that the second connecting surface 2122 has a shape extending flat after a predetermined groove is formed from the lower side of the rotating body 2111. The second connecting surface 2122 has a flat outer surface like the first connecting surface 2121, but the outer surfaces of the first and second connection surfaces 2121 and 2122 need not be designed to be parallel to each other.

As the first and second connecting surfaces 2121 and 2122 extend to become sharper toward the end, the contact surface 2123 connecting the first and second connecting surfaces 2121 and 2122 is formed to have a concave curved shape. The contact surface 2123 extends from an end of the first connecting surface 2121 to an end of the second connecting surface 2122, and has the concave curved shape corresponding to the outer surface of the cylindrical shape in a whole. Here, the curvature of the concaved shape of the contact surface 2123 is substantially the same as the curvature of the convex shape of the rotating body 2111. Thus, as illustrated in FIG. 24, the outer surface of the rotating body 2111 of the second unit block 2100*b* may be close up to or adhered to the contact surface 2123 of the first unit block 2100*a* adjacent to the second unit block 2100*b*.

That is, the first connecting surface 2121, the second connecting surface 2122 and the contact surface 2123 form the inserting space 2124 inside thereof, and the body 2110 of the adjacent unit block is inserted into and adhered to the inserting space 2124. Thus, the plurality of the unit blocks 2100 are maintained to be close up to or adhered to each other.

The first and second side surfaces 2125 and 2126 of the connecting portion 2120 extend from the first and second side surfaces 2112 and 2113 of the body 2110, respectively. Thus, the first and second side surfaces 2125 and 2126 form both side surfaces of the unit block 2100.

The groove portion 2130 extends from the lower side of the rotating body 2111, and is formed between the rotating body 2111 and the second connecting surface 2122 of the connecting portion 2120. For example, the groove portion 2130 includes an extending curve surface 2131 and an extending vertical surface 2132. The extending curve surface 2131 extends from the lower side of the rotating body 2111 with the same curvature as that of the rotating body 2111. The extending vertical surface 2132 extends from an end of the extending curve surface 2131 toward a lower direction with forming a flat surface. Here, when the groove 2130 is formed at an upper side of the rotating body 2111, the extending vertical surface 2132 may extend upward from the extending curve surface 2131. Accordingly, as the extending curve surface 2131 and the extending vertical surface 2132 extend with different curvatures, a supporting groove 2133 is formed between the extending curve surface 2131 and the extending vertical surface 2132, and a concaved shape of the supporting groove 2133 may be a sharp or pointed shape.

Figure 28:
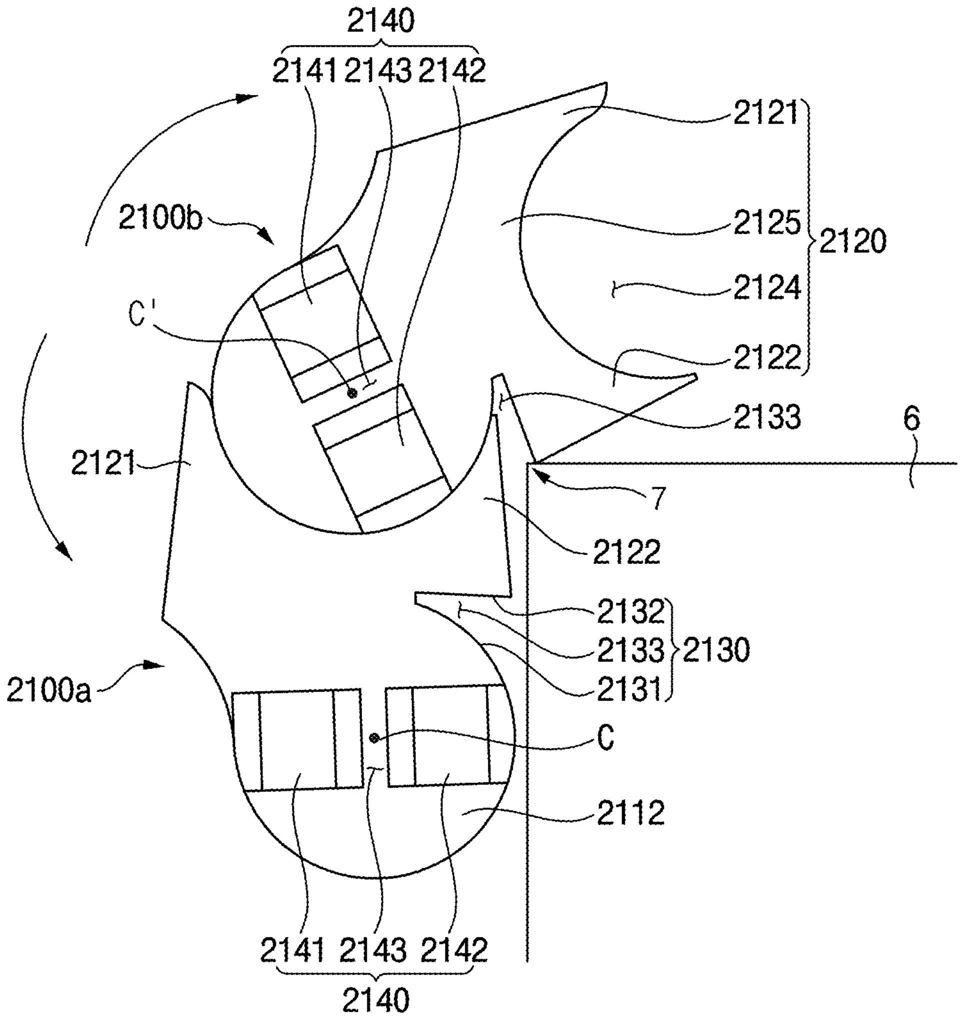
FIG. 28 is a front view illustrating a change of the unit block at a contact portion A when the wheel unit of FIG. 25 overcomes the obstacle.
Figure 29:
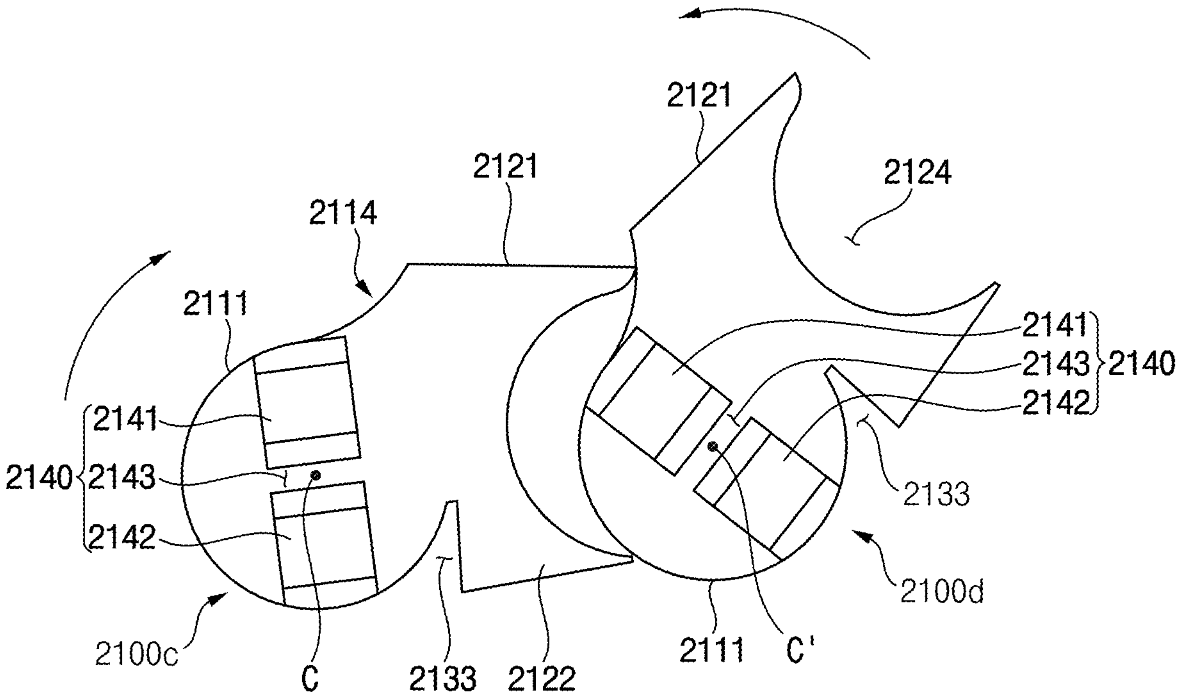
FIG. 29 is a front view illustrating a change of the unit block at a proximal portion B when the wheel unit of FIG. 25 overcomes the obstacle.

Hereinafter, the relative combination relationship of the unit blocks 2100 will be explained referring to FIG. 28 and FIG. 29. FIG. 28 is a front view illustrating a change of the unit block at a contact portion A when the wheel unit of FIG. 25 overcomes the obstacle. FIG. 29 is a front view illustrating a change of the unit block at a proximal portion B when the wheel unit of FIG. 25 overcomes the obstacle Referring to FIG. 28, when the wheel unit 10' overcomes the obstacle 6, at the contact portion A, the unit blocks 2100 adjacent to each other are bent outward in the radial direction, so that the combination or coupling state of the unit blocks 2100 is changed. Generally, to overcome the obstacle 6, the unit blocks 2100 are fixed at the contact position making contact with the obstacle 6, and the unit blocks 100 rotate with respect to the contact position. Here, to perform the rotation above, the inner sides of the unit blocks 2100 should be freely deformed. Then, the obstacle 6 may be easily overcome, while the unit blocks 2100 rotate with respect to the contact position.

In this regard, the combination relationship between the unit blocks 2100 adjacent to each other at the contact portion A is explained referring to FIG. 28. As illustrated in FIG. 27, when the first and second unit blocks 2100*a* and 2100*b* make contact with the obstacle 6 with the first and second unit blocks 2100*a* and 2100*b* close up to or adhered to each other, the first and second unit blocks 2100*a* and 2100*b* adjacent to each other rotate relatively in the direction of bending outward in the radial direction.

Thus, the second connecting surface 2122 of the first unit block 2100*a* moves along the outer surface of the rotating body 2111 of the second unit block 2100*b* and is positioned and inserted into the supporting groove 2133. Here, the curvature of the extending curve surface 2131 is substantially same as the curvature of the rotating body 2111 and the curvature of the contact surface 2123, so that the end of the second connecting surface 2122 of the first unit block 2100*a* may be smoothly inserted into the supporting groove 2133.

Here, the extending vertical surface 2132 of the groove portion 2130 has a flat surface, and thus an additional movement may be prevented due to the extending vertical surface 2132 when the end of the second connecting surface 2122 of the first unit block 2100*a* is inserted into the supporting groove 2133 of the second unit block 2100*b*. Thus, the relative rotation in the unit blocks 2100 adjacent to each other may be restricted.

Finally, the outer surface of the second connecting surface 2122 of the first unit block 2100*a* which is a flat surface makes contact with the vertical surface of the obstacle 6, and the outer surface of the second connecting surface 2122 of the second unit block 2100*b* which is a flat surface makes contact with the flat surface of the obstacle 6. Here, it is not necessary to keep the two adjacent second connecting surfaces 2122 in contact with both vertical surfaces of the obstacle 6, and the contact state may be variably changed such as sequential contact considering the state of the two vertical surfaces of the obstacle 6. However, the supporting groove 2133 and the end of the second connecting surface 2122 inserted into the supporting groove 2133 substantially coincide with the contact point 7 with the obstacle 6, and the wheel unit 10' provides the clockwise rotating force in a whole, and then the first and second unit blocks 2100*a* and 2100*b* adjacent to each other with respect to the contact point 7 are rotated to overcome the obstacle 6.

To overcome the obstacle 6 with respect to the contact point 7, the inner sides of the unit blocks 2100 making contact with the obstacle 6 should be freely deformed. Thus, in the present example embodiment, the rotating body 2111 of the second unit block 2100*b* is inserted into the inserting space 2124 of the first unit block 2100*a* and the free relative rotation is possible in close contact with each other, and thus the inner sides of the unit blocks 2100 may be freely deformed.

When the first and second unit blocks 2100*a* and 2100*b* adjacent to each other rotate with the close contact state, the distance between the center C of the body 2110 of the first unit block 2100*a* and the center C' of the body 2110 of the second unit block 2100*b* is maintained to be constant, and the distance is not changed. Thus, the unit blocks 2100 making contact with the obstacle 6 may maintain a stable posture, and the force generated in making contact with the obstacle 6 may be stably absorbed to overcome the obstacle.

Here, the elastic wire 2400 passing through the fixing spaces 2143 and connecting the unit blocks 2100 maintains the adhesion force between the unit blocks and thus the obstacle may be stably overcome.

Accordingly, when the unit blocks combined with each other makes contact with the obstacle, the inner side is induced to be a free rotation but the outer side is fixed so as to be rotatable around the contact point 7. Thus, there is no problem such as the wheel unit 10' coming into contact with the obstacle and bouncing out, and the force generated in making contact with the obstacle is sufficiently absorbed and then the obstacle may be effectively overcome.

In overcoming the obstacle 6, the relative position of the unit blocks 2100 is changed differently in the proximal portion B, unlike the close contact and relative rotation of the unit blocks 2100 in the contact portion A.

Referring to FIG. 29, as for the third and fourth unit blocks 2100*c* and 2100*d* adjacent to each other in the proximal portion B, the outer side is deformed to be far apart due to a tension force, but the inner side is deformed to be closer to each other due to a compressive force. Thus, the third and fourth unit blocks 2100*c* and 2100*d* are released from being in close contact with each other and become segmented around the inner side.

The fourth unit block 2100*d* adjacent to the third unit block 2100*c* rotates as a whole in a radially inward direction, that is, toward the hub 2300, and thus the body 2110 of the fourth unit block 2100*d* is separated from the inserting space 2124 of the third unit block 2100*c*. Here, the first connecting surface 2121 of the third unit block 2100*c* moves along the extended surface 2114 of the fourth unit block 2100*d*.

Finally, the distance between the center C of the body 2110 of the third unit block 2100*c* and the center C' of the body 2110 of the fourth unit block 2100*d* is increased as the separation. However, since the extended surface 2114 has the concavely recessed curvature, the movement exceeding a predetermined distance is restricted when the first connecting surface 2121 of the third unit block 2100*c* moves along the extended surface 2114 of the fourth unit block 2100*d*. Thus, the third and fourth unit blocks 2100*c* and 2100*d* adjacent to each other maintain a segmented state up to the extent shown in FIG. 29.

Even though the unit blocks 2100 adjacent to each other is segmented, segmentation to a state in which the mutual contact state is completely spaced apart may be prevented. In the present example embodiment, since the elastic wire 2400 maintains the adhesion force between the unit blocks 2100 adjacent to each other, a state in which the unit blocks 2100 are completely spaced apart and the outer shape of the wheel unit 10' entirely collapses may be prevented.

Accordingly, the tensile force applied to the outer side of the unit blocks 2100 in the proximal portion B is absorbed by the elastic wire 2400, and the compressive force applied to the inner side of the unit blocks 2100 is absorbed by the extended surface 2114 and the first connecting surface 2121 fixed to the extended surface 2114. Thus, the unit blocks 2100 adjacent to each other are not displaced or their relative positions are not irregularly changed, and the overall shape of the wheel unit 10' may be maintained constant.

As explained referring to FIG. 28 and FIG. 29, when the wheel unit 10' overcomes the obstacle 6, the unit blocks adjacent to each other maintain the combination relationship differently and change their relative positions in each of the contact portion A and the proximal portion B, but the overall shape of the wheel unit 10' may be maintained and the obstacle may be stably overcome.

Due to the specific structure of the unit block 2100 according to the present example embodiment, in the process of overcoming the obstacle 6, the stable coupling relationship may be maintained regardless of the position of the unit blocks 100 in the contact portion A or in the proximal portion B, the unit blocks 2100 adjacent to each other are in close contact with each other or are freely segmented, and further the relative position change may be restricted. Thus, the obstacle may be effectively overcome by the wheel unit 10'.

According to the example embodiment explained above, based on the principle that a water droplet maintains its appearance through surface tension, a force similar to the surface tension of the water droplet is simulated through the tension applied by the supporting body and the adhesion force between the unit blocks, so that the wheel unit may maintain its overall shape and may effectively pass through the ground.

By applying the principle that the shape collapses when the force exceeding the deformation critical angle acts on the water droplet, effective overcoming of the obstacle may be possible through the relative rotation and the movement between the unit blocks adjacent to each other, when the wheel unit contacts the obstacle.

Here, the collapsed part of the wheel unit may be easily restored through the structure of the unit blocks and the tension applied by the supporting body after passing through the obstacle, so that the original shape of the wheel unit may be maintained again. Accordingly, the wheel unit may smoothly overcome the obstacle and run on the ground.

Each of the unit blocks includes the body having the rounded and protruded outer surface shape, and the connecting portion having the rounded and concaved shape. Thus, the body is inserted into the connecting portion of the adjacent unit block and the relative rotation is possible, so that the stable and effective driving may be maintained in overcoming the obstacle or in driving in the flat ground.

In overcoming the obstacle, the body and the connecting portion are relatively rotated and are closely contacted with each other in the unit block adjacent to each other in the contact portion, and the relative rotation is restricted by the groove portion. Thus, the stable supporting structure may be implemented. Alternatively, in the proximal portion, the body and the connecting portion are segmented in the unit block adjacent to each other, and the relative position change may be possible in a predetermined range. Thus, the applied force is dispersed and the overall shape of the wheel unit may be maintained.

Here, the elastic wire fixes the unit blocks adjacent to each other with a predetermined elastic force, so that the force may be distributed as a whole even if the force is concentrated in a specific unit block and the degree of segmentation between the unit blocks segmented from each other may be limited within a certain range. Thus, the obstacle may be effectively overcome with maintain a stable wheel structure.

As explained above, the wheel unit 10' according to the present example embodiment may also further include the tension controller configured to control the tension applied by the supporting body. Here, the wheel unit 10' may further include the rotational driving part, the tension control part, the distance maintaining unit, the distance change unit, the rotating unit and the controller as the tension controller, and the first and second hub units disposed adjacent to each other along the axial direction may be configured as the hub 2300. Thus, the distance between the first and second hub unit may be controller to adjust the tension applied by the supporting body 2200.

Figure 30:
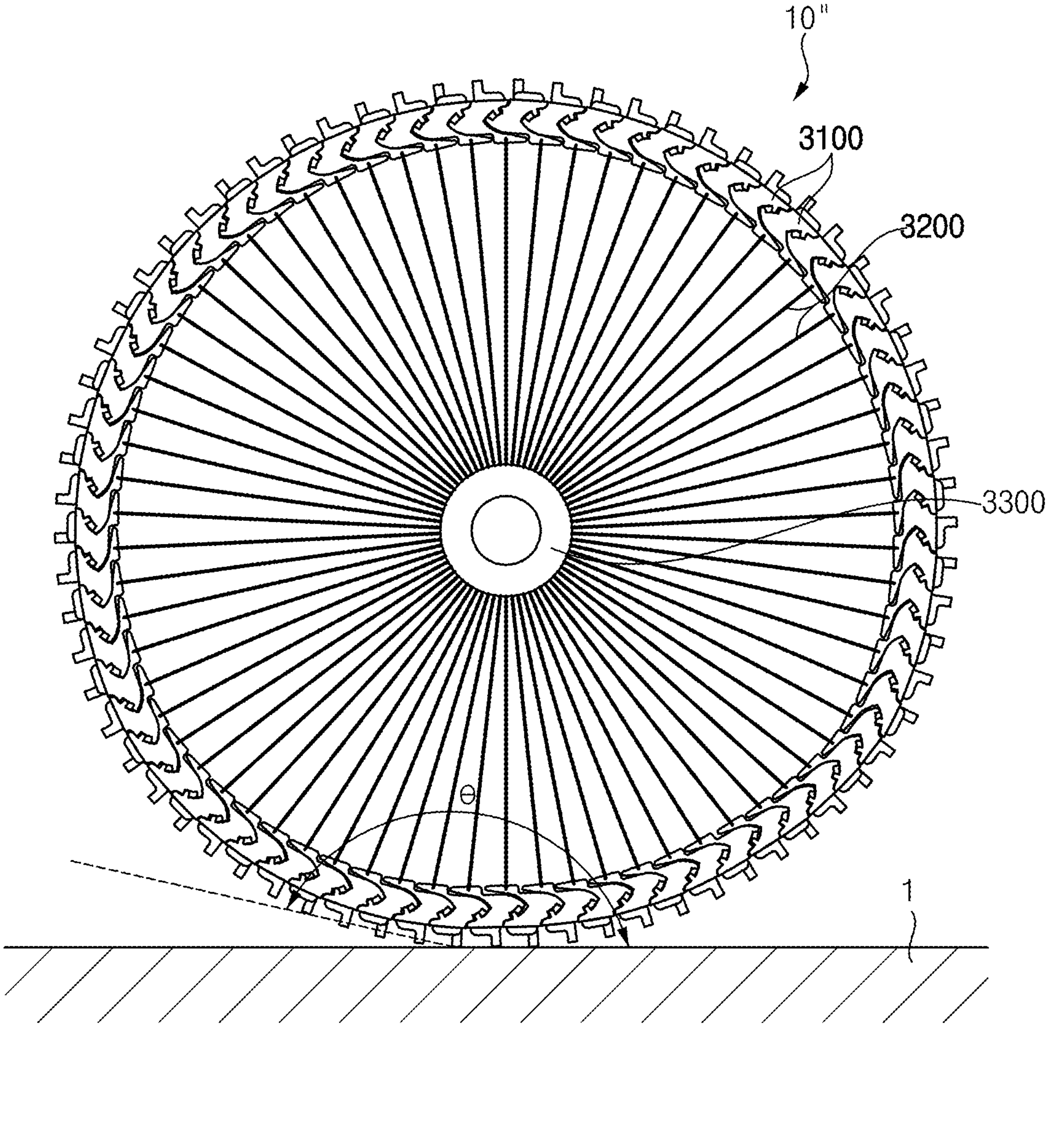
FIG. 30 is a front view illustrating a wheel unit for overcoming an obstacle passing through the ground according to still another example embodiment of the present invention.
Figure 31:
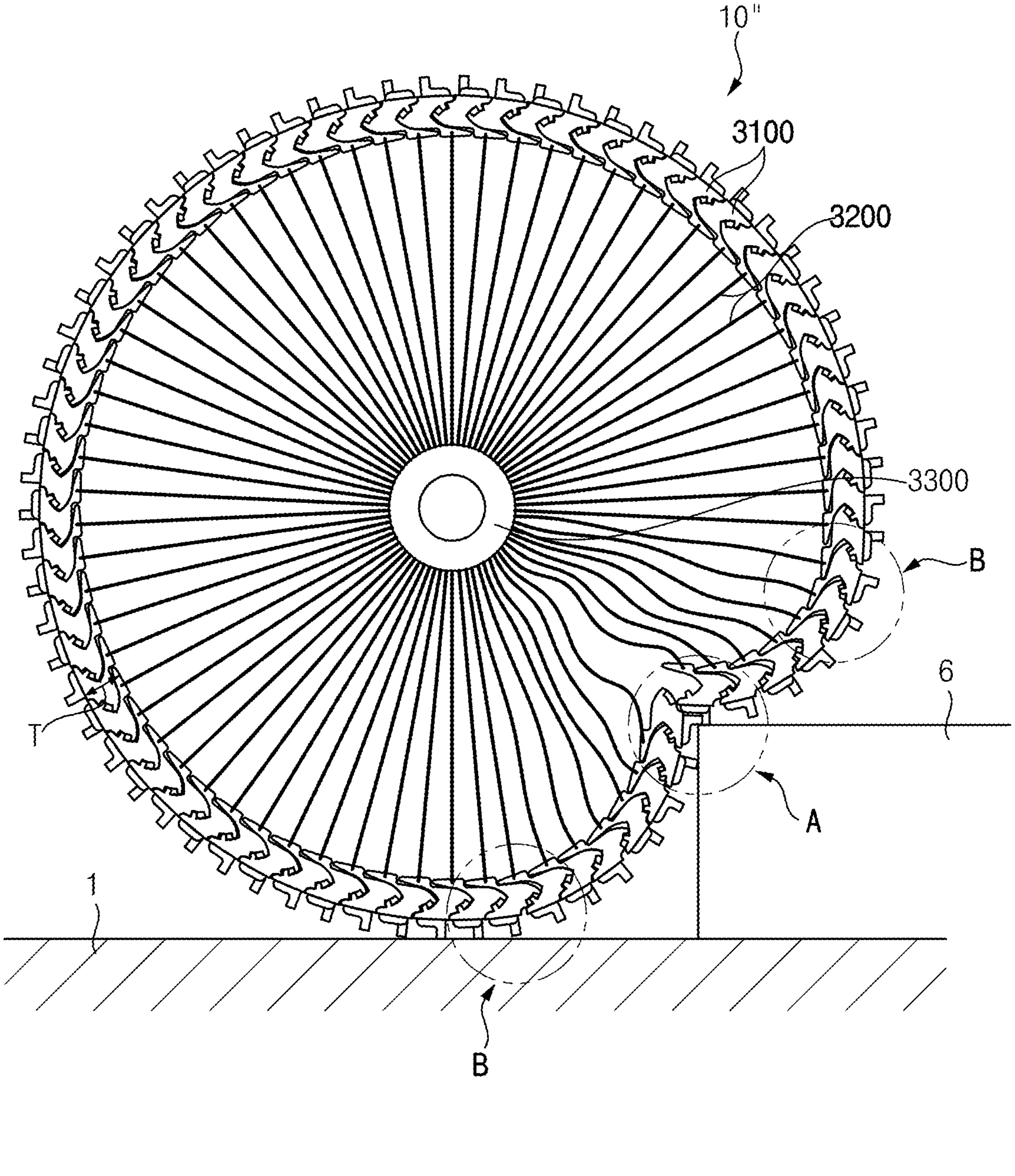
FIG. 31 is a front view illustrating the wheel unit of FIG. 30 overcoming the obstacle.

Then, a wheel unit 10" according to still another example embodiment is explained referring to FIG. 30 and FIG. 31. FIG. 30 is a front view illustrating a wheel unit for overcoming an obstacle passing through the ground according to still another example embodiment of the present invention. FIG. 31 is a front view illustrating the wheel unit of FIG. 30 overcoming the obstacle.

Referring to FIG. 30 and FIG. 31, the wheel unit 10" according to the present example embodiment includes a plurality of unit blocks 3100, a supporting body 3200 and a hub 3300. The wheel unit 10" according to the present example embodiment is substantially same as the wheel unit 10' according to the previous example embodiment except for the shape and the combination structure of the unit block, and thus any repetitive explanation will be omitted.

The unit blocks 3100 is spaced apart from the hub 3300 by a predetermined distance, and is arranged along a circumferential direction. The unit blocks 3100 are close up to or adhered to each other to form a circular shape in a whole, and form the outer shape of the wheel unit 10". The unit blocks 3100 adjacent to each other are relatively rotated and moved with each other. Thus, the unit blocks 3100 adjacent to each other may be close up or adhered to each other, or the close or adhered state of the unit blocks adjacent to each other may be released.

Referring to FIG. 30, when the wheel unit 10" passes through the ground which is flat, the unit blocks 3100 are close up or adhered to each other explained below, and the supporting body 3200 applies the tension to the unit blocks 3100 toward the hub 3300 at the same time. Further, although not shown in the figure, the elastic wire may apply the tension to the unit blocks 3100 toward the hub 3300, and may apply the adhesion force between the unit blocks 3100.

Referring to FIG. 31, when the wheel unit 10" collides with the obstacle 6 such as the stairs on the ground 1, the wheel unit 10" starts to deform at the collision position. At the contact portion A, the shape of the wheel unit 10" is collapsed with reflecting the shape of the obstacle 6, and the combination state of the wheel unit 10' is changed due to the relative rotation and movement between the unit blocks. Here, since the hub 3300 continuously rotates, the wheel unit 10" overcomes the obstacle 6 while the hub 3300 rotates with respect to the contact portion A, even though the shape of the unit blocks 3100 is collapsed.

However, in the present example embodiment, the close or adhered state of the unit blocks 3100 adjacent to each other is released both in the contact portion A and in the proximal portion B, unlike in the previous example embodiments. Even though, the adhered state of the unit blocks 3100 is released, the outer surfaces of the unit blocks are adhered to each other and a predetermined adhesion force is applied, and thus the adhered state of the unit blocks 3100 may be easily restored again.

Figure 32:
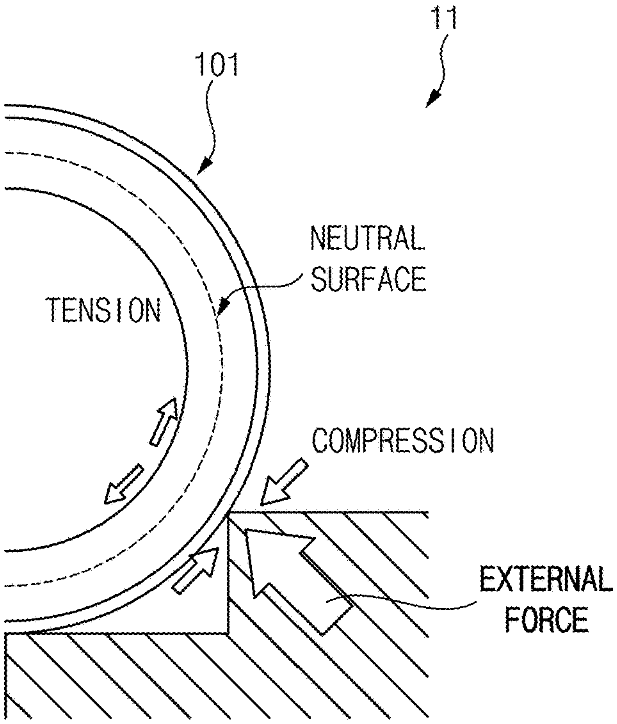
FIG. 32 is a schematic view illustrating a force distribution state when the conventional wheel unit overcomes the obstacle.
Figure 33:
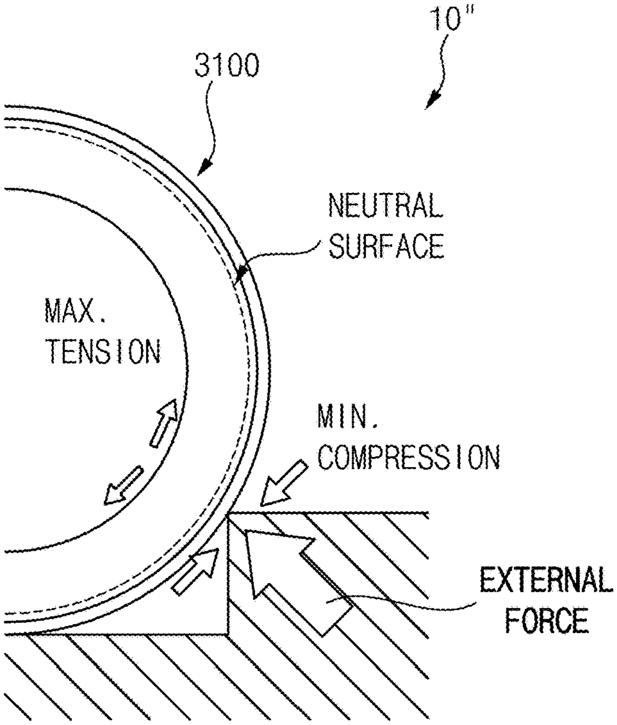
FIG. 33 is a schematic view illustrating a force distribution state when the wheel unit of FIG. 30 overcomes the obstacle.

FIG. 32 is a schematic view illustrating a force distribution state when the conventional wheel unit overcomes the obstacle, and FIG. 33 is a schematic view illustrating a force distribution state when the wheel unit of FIG. 30 overcomes the obstacle. Before explaining the structural deformation of the wheel unit 10" in overcoming the obstacle, the force transfer state of the wheel unit 10" in overcoming the obstacle such as the stairs is explained.

Here, to explain the technical features of the wheel unit 10" according to the present example embodiment, it is assumed that the conventional wheel unit 11 has a structure in which the unit blocks 101 forming the outer shape are fixed to each other in close contact with each other and are not detached from each other. As illustrated in FIG. 32, in the conventional wheel unit 11, the outer surface of the unit block 101 and the inner surface of the unit block 101 do not be segmented and are formed to have a continuous extending curved structure.

Accordingly, when the conventional wheel unit 11 overcomes the obstacle such as the stairs, as an external force is applied to the outer surface of the unit block 101 from the stairs, a compressive force (compression) is generated in the contact portion of the outer surface making contact with the stairs, and thus a tensile force (tension) is generated in the inner surface facing the outer surface. Here, as for the conventional unit block 101, since the outer surface and the inner surface are not segmented and are continuously extended with the curved surface, the compressive force and the tensile force are maintained at similar levels, and thus a neutral surface is formed along a center of the unit block 101. Further, since the inner surface of the unit block 101 is not segmented and is continuously extended, a tensile strain may be implemented within a certain range depending on the material of the inner surface, etc., and the tensile strain over the certain range may not be implemented in the unit block 101.

Thus, in the conventional wheel unit 11 of FIG. 32, a problem of not being able to overcome the stairs such as being bounced off the stairs may be generated when the tensile strain is over the certain range, in overcoming the obstacle such as the stairs.

In contrast, when the unit blocks 3100 are detached from each other and the inner surfaces of the unit blocks 3100 are segmented from each other as in the wheel unit 10" according to the present example embodiment, the tensile strain is not limited due to the segmentation of the inner surfaces of the unit blocks 3100 even though the external force is applied from the stairs, and thus the tensile strain may be increased infinitely (Max. Tensile strain is possible).

Accordingly, the tensile strain applied to the inner surface is not limited in a certain range, the neutral surface of the unit blocks 3100 is formed close to the outer surface, and the tensile strain of the inner surface is implemented relatively much larger, so that the wheel unit may overcome the obstacle such as the stairs very easily.

When the wheel unit 10" makes contact with the stairs, the unit blocks may be freely deformed with the inner surfaces, with respect to the outer surface of the unit blocks 3100 making contact with the stairs. Thus, due to the rotational driving force of the wheel unit 10", the wheel unit 10" rotates with respect to the outer surface of the unit blocks 3100 making contact with the stairs, and the wheel unit 10" deforms like the outer shape of the stairs, so that the stairs may be easily overcome. Accordingly, when the wheel unit 10" makes contact with the obstacle such as the stairs, the unit blocks 3100 may be easily deformed via the segmentation, and there is no limit on the tensile strain. Thus, the obstacle may be easily overcome.

Figure 34:
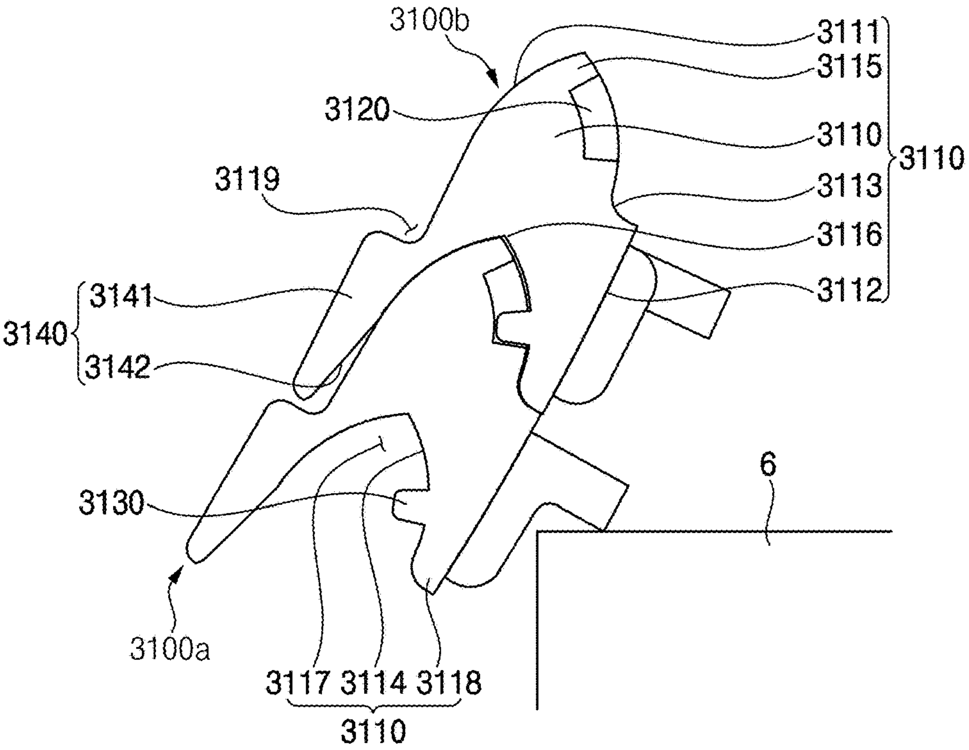
FIG. 34 and FIG. 35 are front views illustrating a change of the unit block at a contact portion A when the wheel unit of FIG. 31 overcomes the obstacle.
Figure 35:
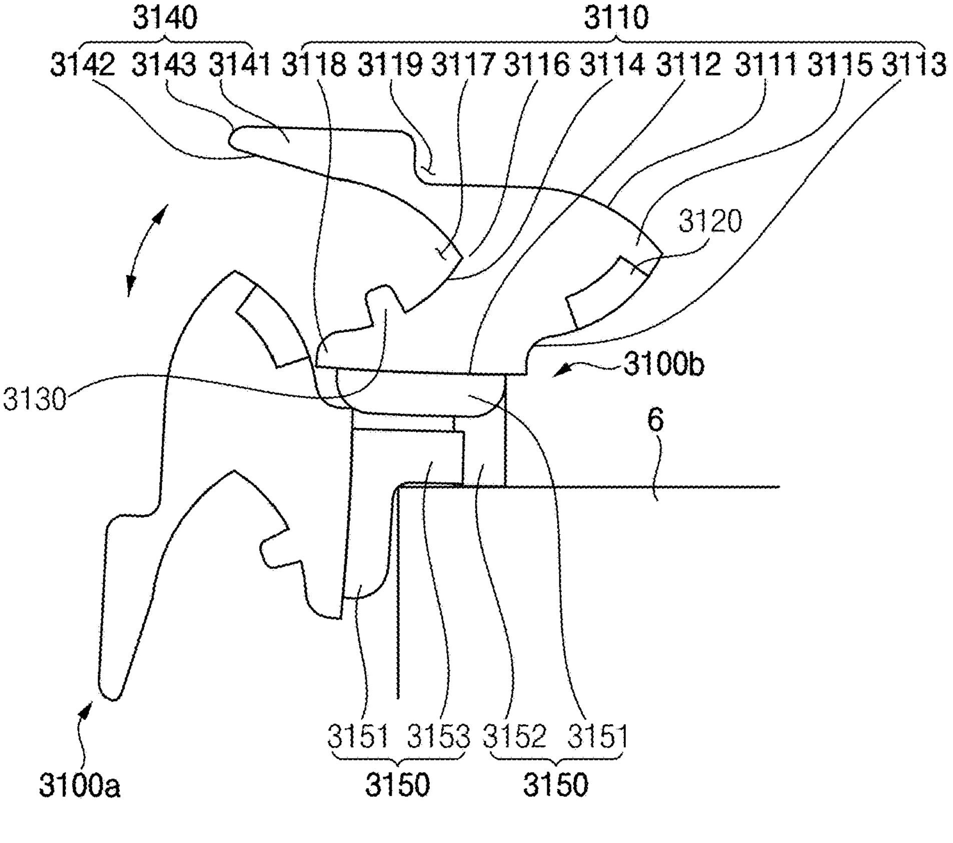

FIG. 34 and FIG. 35 are front views illustrating a change of the unit block at a contact portion A when the wheel unit of FIG. 31 overcomes the obstacle. Before explaining the deformed state of the unit blocks in the contact portion A, the detailed structure of the unit block 3100 and the connections or the segmentation between the unit blocks 3100 adjacent to each other are explained first.

Each of the unit blocks 3100 includes a body 3110, a groove portion 3120, a protrusion portion 3130, a fixing portion 3140 and a supporting portion 3150.

The body 3110 forms a main body of the unit block 3100, and as illustrated in FIG. 34, the body 3110 may have a predetermined width along a vertical direction of FIG. 34. Here, the width of the body 3110 may be variously changed.

The body 3110 includes an upper surface 3111 forming an upper side surface and a lower surface 3112 forming a lower side surface. Here, the lower surface 3112 extends as the flat surface, but the upper surface 3111 extends along the same direction to the lower surface 3112 and then a front end of the upper surface 3111 is curved downward.

The body 3110 may further include a front portion 3115 extended from the upper surface and forming a front of the body 3110, and a rear portion 3116 disposed at a rear side of the front portion 3115 and forming a rear of the body 3110. The front portion 3115 extends from the upper surface 3111 and is protruded, and the rear portion 3116 is concaved different from the front portion 3115. Here, as illustrated in FIG. 34, in the unit blocks adjacent to each other, the front portion 3115 of a first unit block 3100*a* is close up to or adhered to the rear portion 3116 of a second unit block 3100*b* and then is inserted into the rear portion 3116 of the second block 3100*b*. The front portion 3115 of the first unit block 3100*a* is positioned at a rear concave portion 3117 formed by the rear portion 3116 of the second unit block 3100*b* and then is adhered to the rear portion 3116. Here, the protruded shape of the front portion 3115 is formed to have the curvature substantially same as that of the rear portion 3116, so that the front portion 3115 may be inserted into the rear portion 3116.

The body 3110 further includes a front concave portion 3113 extended from a front end of the lower surface 3112, and a rear protrusion 3118 extended from a rear end of the lower surface 3112. The front concave portion 3113 is concaved and extended with a concave shape on an extending surface extending from the front end of the rear surface 3112 to the front portion 3115. Here, the protruded curved surface is formed from the front end of the lower surface 3112 to the front portion 3115 in a whole, but the front concave portion 3113 is concaved. In addition, the rear protrusion 3118 is protruded with a convexly rounded shape and extended on an extending surface extending from the rear end of the lower surface 3112 to the rear portion 3116. Here, the concave surface is formed from the rear end of the lower surface 3112 to the rear portion 3116 in a whole, but the rear protrusion 3118 is protruded. Here, the concave shape of the front concave portion 3113 is formed to have a curvature substantially same as that of the rear protrusion 3118 of the adjacent unit block, and thus the front concave portion 3113 may be adhered to the rear protrusion 3118. As illustrated in FIG. 34, when the unit blocks adjacent to each other is adhered to each other, the rear protrusion 3118 of the second unit block 3100 is adhered to the front concave portion 3113 of the first unit block 3100*a*.

The groove portion 3120 is formed between the front portion 3115 and the front concave portion 3113 with a predetermined length. As illustrated in FIG. 34, the groove portion 3120 is formed as a groove with a predetermined distance along a vertical direction of FIG. 34, and thus the groove portion 3120 forms a stepped portion with a side surface forming the front portion 3115. In addition, the protrusion portion 3130 is protruded by a predetermined length from the rear surface 3114, and is formed at the groove portion 3120 of the adjacent unit block.

As illustrated in FIG. 34, when the unit blocks adjacent to each other are close up or adhered to each other, the protrusion portion 3130 of the second unit block 3100*b* is disposed on the groove portion 3120 of the first unit block 3100*a*. For example, when the first and second unit blocks 3100*a* and 3100*b* adjacent to each other is in the closed up state or the adhered state, the protrusion portion 3130 of the second unit block 3100*b* is disposed at a lower end of the groove portion 3120. In addition, as the relative position between the unit blocks adjacent to each other changes, the position of the protrusion portion 3130 may be changed within the groove portion 3120 having the predetermined length. That is, the protrusion portion 3130 may be slidably moved in the groove portion 3120.

Accordingly, as the protrusion portion 3130 is formed on the groove portion 3120, the adhesion between the unit blocks may be increased. In addition, even though the relative position of the unit blocks is changed, the protrusion 3130 may be in the groove portion 3120 within a predetermined range, and thus the adhesion between the unit blocks may be maintained and the relative position change between the unit blocks may be limited.

The fixing portion 3140 extends from an upper side of the body 3110, and includes a fixing protrusion 3141, a contact surface 3142 and an end portion 3143. The fixing protrusion 3141 extends from a rear side of the upper surface 3111 of the body 3110 and the rear portion 3116. The fixing protrusion 3141 extends to a rear upward direction of the body 3110, to form a predetermined stepped portion 3119 with the rear surface 3111. The contact surface 3142 forms the lower surface of the fixing portion 3140, and the contact surface 3142 is a surface extending continuously from the rear surface 3116. In addition, the end portion 3143 is formed at an end of the contact surface 3142, and is protruded with forming a rear end of the fixing portion 3140.

As illustrated in FIG. 34, when the unit blocks adjacent to each other is close up to or adhered to each other, the contact surface 3142 of the fixing portion 3140 of the second unit block 3100*b* is adhered to the upper surface 3111 of the first unit block 3100*a*. For performing this, the curvature of the curved surface of the contact surface 3142 is substantially same as that of the upper surface 3111.

The end portion 3143 of the second unit block 3100*b* may be located at the stepped portion 3119 formed at the connecting portion between the upper surface 3111 and the fixing portion 3140 at the first unit block 3100*a*. Accordingly, the end portion 3143 is positioned at the stepped portion 3119, so that the relative position change between the unit blocks adjacent to each other may be limited, and this will be explained below.

The supporting portion 3150 is combined with the lower surface 3112, and includes a supporting frame 3151, and a first supporting protrusion 3152 or a second supporting protrusion 3153. Here, as for the plurality of the unit blocks 3100, the first and second supporting protrusions 3152 and 3153 may be formed alternately. If the second unit block 3100*b* includes the first supporting protrusion 3152, the first unit block 3100*a* includes the second supporting protrusion 3153.

For example, the supporting frame 3151 is fixed at the lower surface 3112, and the supporting frame 3151 extends with a flat surface in parallel, since the lower surface 3112 extends with the flat surface. The first supporting protrusion 3152 or the second supporting protrusion 3153 is protruded from the lower surface of the supporting frame 3151 by a predetermine length. Thus, the first supporting protrusion 3152 of the supporting frame 3151, or the second supporting protrusion 3153 of the supporting frame 3151 may have an 'L' shape when viewed from the side. Since the supporting portion 3150 has the 'L' shape when viewed from the side, the supporting or the fixing with the obstacle may be possible when overcoming the obstacle 6 such as the stairs having a perpendicular cross-section, and then the obstacle may be overcome more easily.

Figure 37:
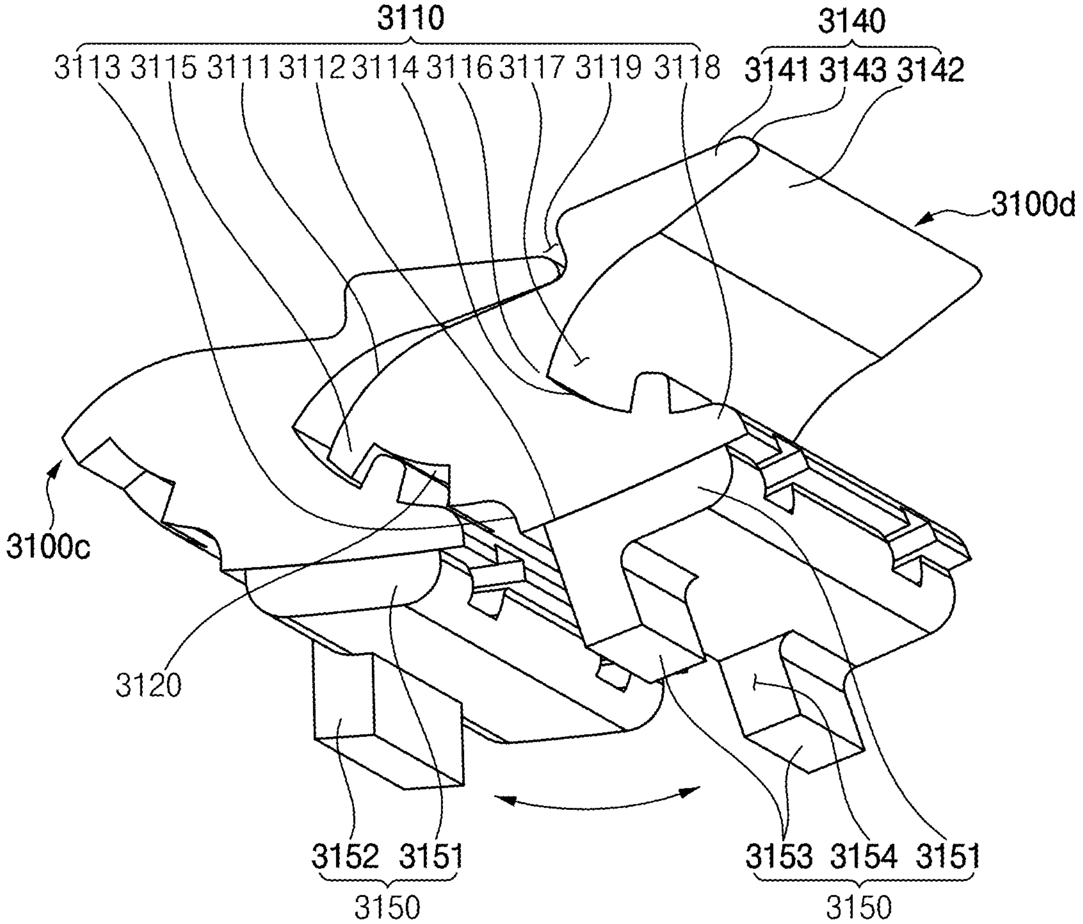
FIG. 37 is a perspective view illustrating the unit block of FIG. 36 at a different view.

Referring to FIG. 37 below, for example, when the supporting portion 3150 of a fourth unit block 3100*d* includes the second supporting protrusion 3153 and the supporting portion 3150 of a third unit block 3100*c* includes the first supporting protrusion 3152, the second supporting protrusion 3153 has a pair of protrusions spaced apart from each other to form an inserting space 3154 at the center between the pair of the protrusions, and the first supporting protrusion 3152 includes a single protrusion at the center in which the inserting space 3154 is formed.

Thus, as illustrated in FIG. 35, when the supporting portions 3150 adjacent to each other overlap with each other in overcoming the obstacle 6, the first supporting protrusion 3152 may be located inside of the inserting space 3154 and the problem in which the relative position of the unit blocks adjacent to each other is limited due to the overlapping of the supporting portions 3150 adjacent to each other may be prevented. Since the positions between the unit blocks adjacent to each other is not restricted by the supporting portions 3150, the obstacle 6 may be effectively overcome regardless of the overlapping of the supporting portions 3150 in overcoming various kinds of obstacles.

Hereinafter, referring to FIG. 34 and FIG. 35 again, the position change between the unit blocks adjacent to each other in overcoming the obstacle 6 is explained.

Referring to FIG. 34, when the wheel unit 10" makes contact with the obstacle 6, the supporting protrusion 3153 of arbitrary unit block 3100*a* firstly makes contact with the upper surface of the obstacle 6. Here, before making contact with the obstacle 6, the unit blocks are maintained to be adhered to each other as explained above. In addition, the end portion 3143 of the fixing portion 3140 of the second unit block 3100*b* is spaced apart from the stepped portion 3119 of the first unit block 3100*a* by a predetermined distance.

As illustrated in FIG. 34, when the wheel unit 10" rotates using the supporting protrusion 3153 which makes contact with the upper surface of the obstacle 6 as a support point, a rotational torque is generated at the unit block 3100*a* with which the supporting protrusion 3153 is combined. Thus, the rotational deformation is generated on the adjacent unit block 3100*b*, and the rotational deformation performs the role of inducing the surface tension to collapse explained above.

When the external force is applied to the direction toward the hub of the wheel unit and the external force is over the critical point at which the tension collapses, the wheel unit may be deformed like the shape of the obstacle but it is hard to apply the external force over the critical point to the wheel unit. Thus, to solve the problem, in the present example embodiment, by applying the torque to the unit block using the supporting protrusion, the surface tension collapse may be performed with the force lower than the external force toward the hub 330. When the surface tension collapses by the above process, as illustrated in FIG. 35, the wheel unit 10" may be deformed to be coincided with the surface shape of the obstacle 6.

As the wheel unit 10" rotates, the position of the unit block making contact with the obstacle 6 is changed so as for the 1' shape of the supporting portion 3150 to be fixed at the edge of the obstacle 6, and the unit block disposed at a front end of the unit block in contact with the obstacle moves forward due to the rotation of the wheel unit 10". Thus, the distance between the supporting portions 3150 of the front unit block and the rear unit block is decreased, and the distance between the fixing portions 3140 thereof is increased.

That is the same mechanism, in which the tensile strain is not limited by the segmental structure and the tensile strain may increase infinitely when the compressive force is applied to the outer surface and the tensile force is applied to the inner surface, if the unit block includes the inner surfaces having the segmentation structure, as explained above referring to FIG. 33. For the unit blocks adjacent to each other, the compressive force is applied to the supporting portions 3150 corresponding to the outer surface and the distance of the supporting portions 3150 adjacent to each other is decreased, but the fixing portions 3140 corresponding to the inner surface are capable of being segmented and the tensile strain is not limited. Thus, the segmented state of the unit blocks as illustrated in FIG. 35 is induced and the relatively larger deformation coincided with the outer shape of the obstacle 6 may be implemented.

Accordingly, as for the unit blocks adjacent to each other, the fixing portion 3140 of the second unit blocks 3100*b* is separated from the upper surface 3111 of the first unit block 3100*a*, the rear portion 3116 of the second unit block 3100*b* is separated from the front portion 3115 of the first unit block 3100*a*, and the protrusion portion 3130 of the second unit block 3100*b* is separated from the groove portion 3120 of the first unit block 3100*a*. Here, the amount of the separation increases as the distance from the supporting portion 3150 increases, and the separation of the fixing portion 3140 of the second unit block 3100*b* from the upper surface 3111 of the first unit block 3100*a* may be largest.

Accordingly, in the contact portion A, since the inner surface of the wheel unit 10" includes the segmentation structure, the tensile strain is not limited due to the segmentation and thus the effect of collapsing the surface tension may be induced. Here, the wheel unit 10" rotates and advances in a whole with the surface tension collapsing in the contact portion A, so that the wheel unit 10" may overcome the obstacle 6 more effectively.

In the present example embodiment, since the supporting force on the edge of the obstacle 6 may be maintained to be relatively higher due to the shape of the supporting portion 3150, the supporting force in the contact portion A with the obstacle 6 is increased and the wheel unit 10" rotates and advances with respect to the contact portion A. Thus, the obstacle 6 may be overcome more easily.

In addition to the separation of the unit blocks 3100 in close contact with each other in the contact portion A, the inner portions of the unit blocks which is located in the proximal portion B, which is the surfaces toward the hub 3300, are compressed and deformed. Here, the proximal portion B may be defined as the location spaced forward by a predetermined distance from the contact portion A, and the location spaced backward by a predetermined distance from the contact portion A. Here, when the inner portions of the unit blocks 3100 are compressed in the proximal portions B, the separation of the irregular position change of the unit blocks 3100 may be minimized due to the shape or the structure of each of the unit blocks 3100.

Figure 36:
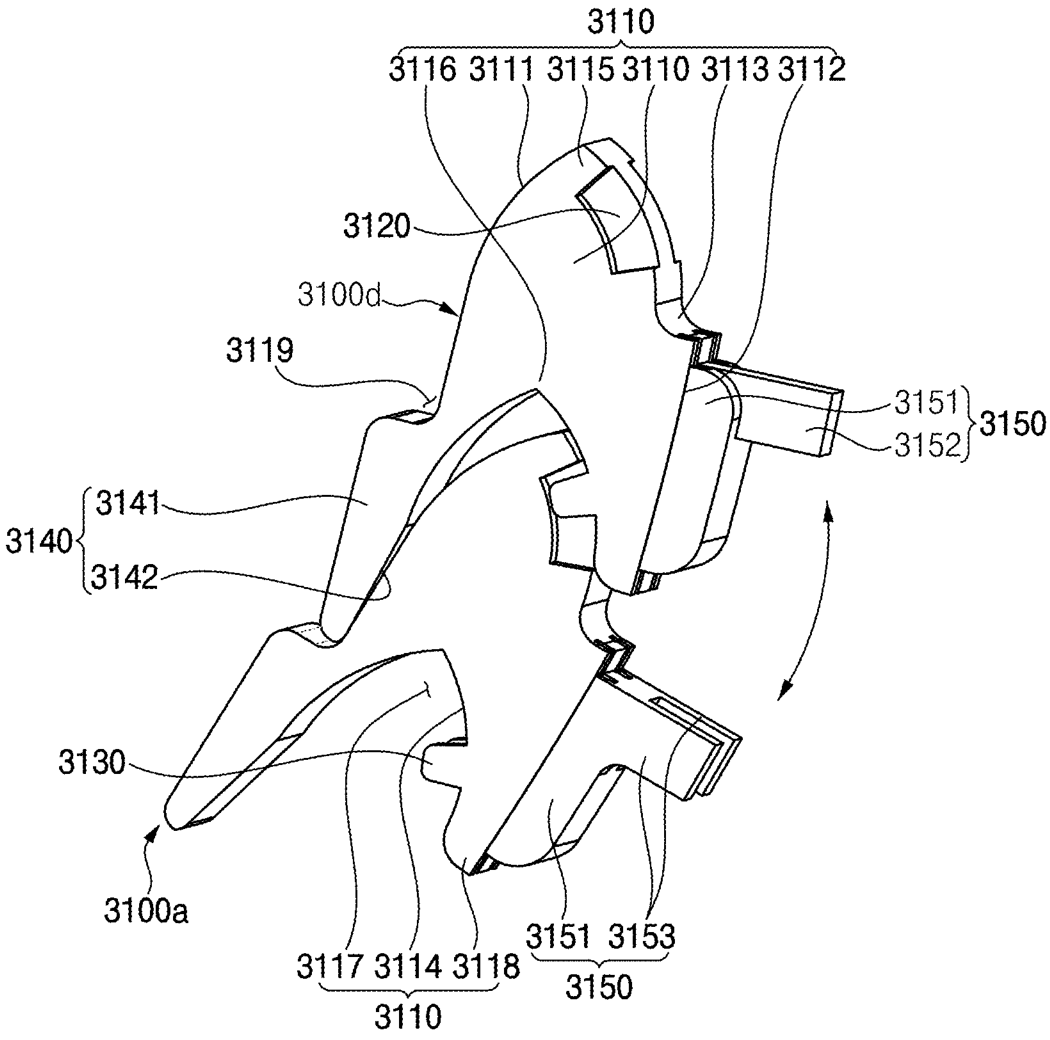
FIG. 36 is a front view illustrating a change of the unit block at a proximal portion B when the wheel unit of FIG. 31 overcomes the obstacle.

Hereinafter, the deformation of the unit blocks in the proximal portion B is explained referring to FIG. 36 and FIG. 37. FIG. 36 is a front view illustrating a change of the unit block at a proximal portion B when the wheel unit of FIG. 31 overcomes the obstacle, and FIG. 37 is a perspective view illustrating the unit block of FIG. 36 at a different view.

Referring to FIG. 36 and FIG. 37, the unit blocks adjacent to each other in the proximal portion B are changed so as for the supporting portions 3150 disposed at the outer side to be away from each other due to the tensile force, and so as for the fixing portions 3140 disposed at the inner side to be close to each other due to the compressive force.

However, in the present example embodiment, the fixing portion 3140 extends to form the stepped portion 3119 from the upper surface 3111, and thus, the end portion 3143 of the fixing portion 3140 of the fourth unit block 3100*d* is located at the stepped portion 3119 of the third unit block 3100*c*. Then, the end portion 3143 of the fourth unit block 3100*d* may be prevented from moving additionally. Thus, even though the inner portions of the third and fourth unit blocks 3100*c* and 3100*d* adjacent to each other are close to each other due to the compressive force, the movement of the end portion 3143 of the fourth unit block 3100*d* is restricted by the stepped portion 3119 of the third unit block 3100*c*, so that close contact with each other beyond a certain level may be prevented and the applied compressive force may be absorbed.

Particularly, as illustrated in FIG. 34, the end portion 3143 and the steppe portion 3119 of the unit blocks adjacent to each other are spaced apart from each other normally, and thus it is possible to secure a predetermined moving distance that may be compressed by the compressive force at the proximal portion B. In addition, even though the compressive force over than the predetermined moving distance is applied, the convex shape of the end portion 3143 may be adhered to the concave shape of the stepped portion 3119 adjacent to the end portion 3143 and then the compressive force may be effectively absorbed to a certain amount. Thus, the unit blocks 3100 may not deviate from their positions or change their relative positions irregularly, and the overall shape of the wheel unit 10" may be maintained constantly.

Accordingly, the unit blocks 3100 may be adhered to each other or be freely segmented, and may be designed to limit the relative position change, so that the overall shape of the wheel unit 10" may be effectively maintained and the obstacle 6 such as the stairs may be easily overcome.

According to the example embodiment explained above, based on the principle that a water droplet maintains its appearance through surface tension, a force similar to the surface tension of the water droplet is simulated through the tension applied by the supporting body and the adhesion force between the unit blocks, so that the wheel unit may maintain its overall shape and may effectively pass through the ground.

By applying the principle that the shape collapses when the force exceeding the deformation critical angle acts on the water droplet, effective overcoming of the obstacle may be possible through the release of the adhesion and the segmentation between the unit blocks inside of the contact portion, when the wheel unit contacts the obstacle.

Here, the collapsed part of the wheel unit may be easily restored through the structure of the unit blocks and the tension applied by the supporting body after passing through the obstacle, so that the original shape of the wheel unit may be maintained again. Accordingly, the wheel unit may smoothly overcome the obstacle and run on the ground.

Each of the unit blocks includes the supporting portions, and the state in which the unit block is supported at the edge of the obstacle is maintained. Thus, the segmentation inside of the unit blocks may be effectively induced. The first and second supporting protrusions are alternately formed to prevent the overlapping of the supporting portions in overcoming the obstacle, and thus the structure may be stably maintained and the obstacle may be stably overcome.

The tensile strain in which the supporting portions of the unit blocks adjacent to each other are away from each other is generated in the proximal portion adjacent to the contact portion. Here, the movement of the fixing portion is limited by the stepped portion adjacent to the fixing portion, and the movement of the protrusion portion may also be limited by the groove portion adjacent to the protrusion portion. Thus, when the tensile strain is generated, the distance between the unit blocks may be limited within a predetermined range, and the stable relative relationship may be maintained. Thus, the structure of the wheel unit may be maintained in the proximal portion, in overcoming the obstacle.

As for the unit blocks adjacent to each other in the contact portion, the inner portions of the unit blocks are freely segmented, and the relative position of the inner portions of the unit blocks adjacent to each other is limited in the proximal portion due to the fixing portion and the protrusion portion even though the tensile strain is generated. Thus, the relative position between the unit blocks is formed naturally, and the stable deformation of the wheel unit may be implemented.

As explained above, the wheel unit 10" according to the present example embodiment may also further include the tension controller configured to control the tension applied by the supporting body 3200. Here, the wheel unit 10" may further include the rotational driving part, the tension control part, the distance maintaining unit, the distance change unit, the rotating unit and the controller as the tension controller, and the first and second hub units disposed adjacent to each other along the axial direction may be configured as the hub 3300. Thus, the distance between the first and second hub unit may be controller to adjust the tension applied by the supporting body 3200.

Figure 38:
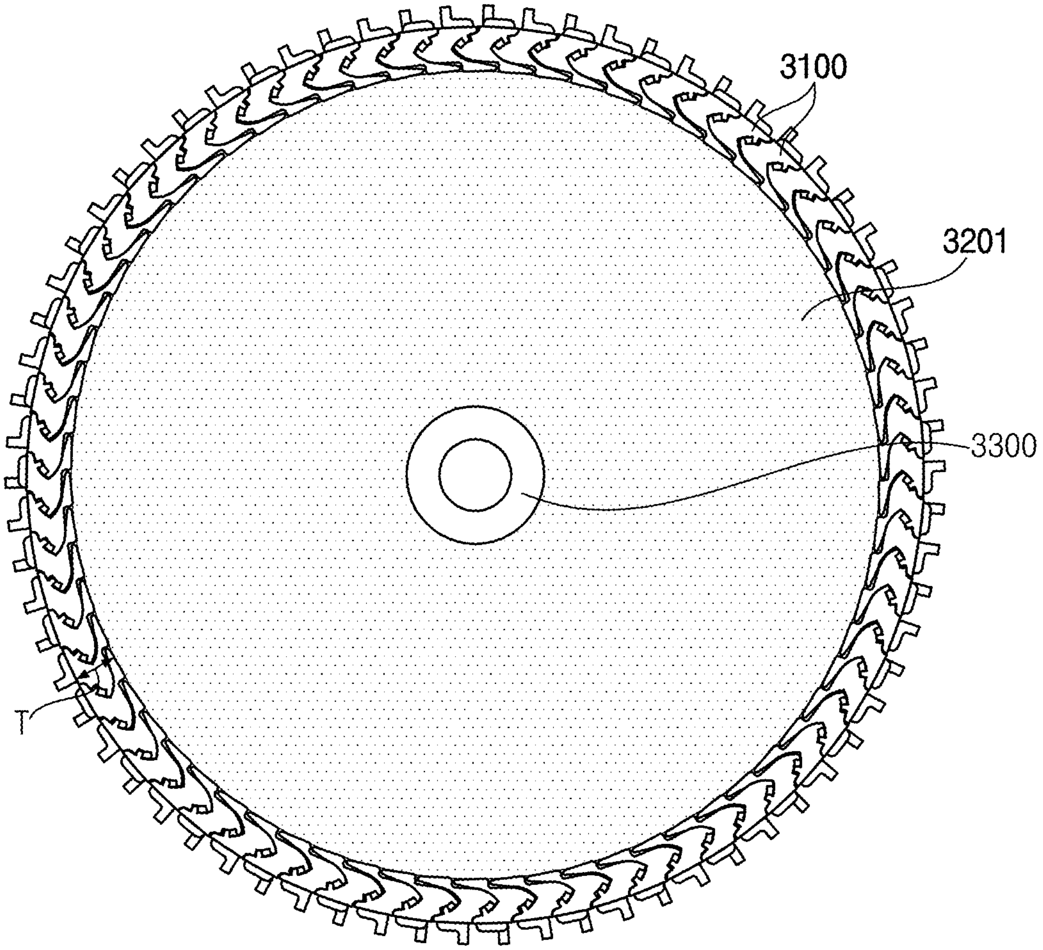
FIG. 38 is a front view illustrating a wheel unit for overcoming an obstacle according to still another example embodiment of the present invention.

FIG. 38 is a front view illustrating a wheel unit for overcoming an obstacle according to still another example embodiment of the present invention. The wheel unit according to the present example embodiment is substantially same as the wheel unit 10" according to the previous example embodiment except for the supporting body, and same reference numerals are used for the same elements and any repetitive explanation will be omitted.

Referring to FIG. 38, in the wheel unit according to the present example embodiment, the supporting body 3201 is filled between the hub 3300 and the plurality of the unit blocks 3100. Here, the supporting body 3201 includes an elastic material having elasticity and is filled between the hub 3300 and the unit blocks 3100, and the material of the supporting body 3201 may be variously changed.

The shape of the wheel unit may be changed according to the various ground conditions, and thus various magnitudes of external force such as the compressive force or the tensile force may be applied to the supporting body 3201. Thus, the supporting body 3201 may be absorbed the external force and be changed, and then may be restored when the external force is removed.

As explained above regarding the supporting body 3200, the supporting body 3201 connects the hub 3300 with the unit blocks 3100 and provides the tension between the hub 3300 and the unit blocks 3100. In the present example embodiment, the supporting body 3201 may be a filling material not the wire. As explained above, the tension controller may adjust the tension applied by the supporting body 3201.

Further, although not shown in the figure, the supporting body 3201 may include the filing material filled between the hub 3300 and the unit blocks 3100 and further include the wire explained above, at the same time.

In addition, although not shown in the figure, a cover entirely covering the wheel unit may be configured and thus the wheel unit may be effectively protected.

Having described exemplary embodiments of the present invention, it is further noted that it is readily apparent to those of reasonable skill in the art that various modifications may be made without departing from the spirit and scope of the invention which is defined by the metes and bounds of the appended claims.

INDUSTRIAL APPLICABILITY

In the wheel unit overcoming the obstacle according to the example embodiments explained above, the deformation structure using the surface tension mechanism of the water droplet is applied. In addition, the wheel unit includes the plurality of unit blocks capable of rotating and moving relatively between the unit blocks adjacent to each other. Thus, the wheel unit may be driven in the ground and may overcome the obstacle such as the stairs, and particularly, the stable deformation may be implemented in overcoming the obstacle.

What is claimed is:

1. A wheel unit comprising:
a hub rotating by receiving a rotating force;
a plurality of unit blocks spaced apart from the hub and forming an outer shape of the wheel unit;
a supporting body configured to connect the hub with the unit blocks, or filled between the hub and the unit blocks; and
a first wire fixed and extended by a fixing portion formed on a side surface of each of the unit blocks, and configured to apply an adhesion force between the unit blocks,
wherein the supporting body is configured to apply a tension to the unit blocks along a direction toward the hub, to close up the unit blocks with each other, when the wheel unit passes through a ground,
wherein the unit blocks adjacent to each other are relatively rotated or moved, when the wheel unit overcomes an obstacle.

2. The wheel unit of claim 1, wherein the unit blocks adjacent to each other making contact with the obstacle are configured to rotate relatively radially outward, and at least some of the unit blocks adjacent to each other not making contact with the obstacle is configured to rotate relatively radially inward, when the wheel unit overcomes the obstacle.

3. The wheel unit of claim 2, wherein the unit blocks adjacent to each other remain close to each other when the unit blocks adjacent to each other rotate relatively radially outward, and a close state of the unit blocks adjacent to each other is released and the distance between the unit blocks adjacent to each other is increased when the unit blocks adjacent to each other rotate relatively radially inward.

4. The wheel unit of claim 3, wherein each of the unit blocks comprises:
a body;
a rotating portion disposed at a first side of the body;
a combining portion disposed at a second side of the body and rotatably combined with the rotating portion of an adjacent unit block; and
a pin combining the combining portion with the rotating portion of the adjacent unit block to be rotated and moved within a predetermined range.

5. The wheel unit of claim 4, wherein the body comprises:
an inner surface heading for the hub;
an outer surface facing radially outwardly away from the hub;
a contact surface formed between the inner and outer surfaces, with a concaved shape;
an end portion extending from the outer surface and protruded from an outer end of the contact surface; and
an inclined protrusion portion extending from the inner surface toward the second side of the body and obliquely protruded along a direction toward the hub.

6. The wheel unit of claim 5, wherein each of the unit blocks further comprises a groove portion formed between the combining portion and the outer surface of the body,
wherein the end portion of the body of a first unit block is inserted into the groove portion of a second unit block, with the combining portion of the second unit block closing up to the contact surface of the body of the first unit block, when the first and second unit blocks adjacent to each other rotate relatively radially outward.

7. The wheel unit of claim 5, wherein the rotating portion comprises a rotating block disposed at the contact surface of the body, and a protrusion portion protruded from the rotating block toward a radially inner side,
wherein a distance between a central point of the combining portion of a first unit block and a central point of the combining portion of a second unit block adjacent to the first unit block increases, and a movement of the protrusion of the rotating portion of the first unit block is restricted by the inclined protrusion portion of the body of the second unit block, when the first and second unit blocks adjacent to each other rotate relatively radially inward.

8. The wheel unit of claim 3, wherein each of the unit blocks comprises:
a body forming a rounded outer surface; and
a connecting portion extending from the body and forming an inserting space into which the body of an adjacent unit block is inserted,
wherein the connecting portion comprises:
a first connecting surface extending from a first side of the body;
a second connecting surface extending from a second side of the body and forming the inserting space with the first connecting surface; and
a contact surface connecting the first surface with the second surface, and having a concaved rounded surface to make contact with an outer surface of the body of the adjacent unit block.

9. The wheel unit of claim 8, wherein each of the unit blocks comprises a groove portion formed concavely between the body and the second connecting surface of the connecting portion,
wherein the second connecting surface of the connecting portion of a first unit block is inserted into the groove portion of a second unit block, with the body of the second unit block adjacent to the first unit block closing up to the contact surface of the connecting portion of the first unit block, when the first and second unit blocks adjacent to each other rotate relatively radially outward.

10. The wheel unit of claim 8, wherein the body of the first unit block is spaced apart and rotated from the contact surface of the combining portion of the second unit block adjacent to the first unit block and thus a distance between a central point of the body of the first unit block and a central point of the body of the second unit block increases, when the first and second unit blocks adjacent to each other rotate relatively radially inward.

11. The wheel unit of claim 2, wherein a close state of the unit blocks adjacent to each other is released and the distance between the unit blocks adjacent to each other is increased when the unit blocks adjacent to each other rotate relatively radially outward and the unit blocks adjacent to each other are configured to rotate relatively radially inward.

12. The wheel unit of claim 11, wherein each of the unit blocks comprises:
a body having a protruded front portion, and a concaved rear portion combined with the protruded front portion of an adjacent unit block;
the fixing portion extending at an upper portion of the body; and
a supporting portion protruding at a lower portion of the body, wherein the supporting portion comprises:
- a supporting frame extending parallel with the lower portion of the body; and
- a supporting protrusion protruded perpendicular to the supporting frame.

13. The wheel unit of claim 12, wherein the supporting protrusion of a first unit block is formed as a first supporting protrusion protruded from a center of the supporting frame, and the supporting protrusion of a second unit block adjacent to the first unit block is formed as a pair of second supporting protrusions protruded from both sides of the supporting frame to form an inserting space into which the first supporting protrusion is inserted.

14. The wheel unit of claim 12, wherein the unit blocks adjacent to each other making contact with the obstacle are configured to rotate relatively radially outward so that the supporting protrusions make contact with the obstacle and the bodies of the unit blocks are spaced apart from each other, when the wheel unit overcomes the obstacle.

15. The wheel unit of claim 12, wherein the fixing portion comprises a contact surface configured to slide along an upper surface of the body of the adjacent unit block and an end portion formed at an end of the contact surface,
- wherein the upper surface of the body and the fixing portion form a stepped portion,
- wherein a movement of the end portion of the fixing portion of a first unit block is restricted by the stepped portion of a second unit block adjacent to the first unit block, when the first and second unit blocks adjacent to each other rotate relatively radially inward.

16. The wheel unit of claim 12, wherein each of the unit blocks comprises:
- a groove portion formed at a front portion of the body by a predetermined length; and
- a protrusion portion protruded from a rear portion of the body,
- wherein a movement of the protrusion portion of a first unit block is restricted by the groove portion of a second unit block adjacent to the first unit block, when the first and second unit blocks adjacent to each other rotate relatively radially inward.

17. The wheel unit of claim 1, wherein the hub comprises a first hub unit and a second hub unit which are spaced apart from each other along an axial direction,
- wherein the supporting body comprises a plurality of second wires connected between the unit blocks and the first and second hub units,
- wherein a tension applied by the second wires is controlled as the distance between the first and second hub units is changed.

18. The wheel unit of claim 17, further comprising:
- a rotational driving part configured to provide the rotating force;
- a rotating unit rotated and connected to the rotational driving part;
- a tension control part configured to provide a sliding force along the axial direction; and
- a distance change unit configured to provide the sliding force to at least one of the first and second hub units, to control a distance between the first and second hub units,
- wherein the first and second hub units are positioned on an outer surface of the rotating unit and are rotated integrally.

19. The wheel unit of claim 17, wherein the distance between the first and second hub units increases and the tension applied by the second wires increases when the wheel unit passes through the ground,
- wherein the distance between the first and second hub units decreases and the tension applied by the second wires decreases when the wheel unit overcomes the obstacle.

* * * * *